(12) United States Patent
Watanabe

(10) Patent No.: US 8,483,942 B2
(45) Date of Patent: Jul. 9, 2013

(54) SYSTEM FOR DETECTING OR ESTIMATING CENTER-OF-GRAVITY, LATERAL ROLLOVER LIMIT OR CARGO WEIGHT

(75) Inventor: Yutaka Watanabe, Tokyo (JP)

(73) Assignee: National University Corporatioin Tokyo University of Marine Science and Technology, Tokyo (JP)

( * ) Notice: Subject to any disclaimer, the term of this patent is extended or adjusted under 35 U.S.C. 154(b) by 752 days.

(21) Appl. No.: 12/516,111

(22) PCT Filed: Nov. 22, 2007

(86) PCT No.: PCT/JP2007/072659
§ 371 (c)(1),
(2), (4) Date: Apr. 15, 2010

(87) PCT Pub. No.: WO2008/062867
PCT Pub. Date: May 29, 2008

(65) Prior Publication Data
US 2010/0198492 A1 Aug. 5, 2010

(30) Foreign Application Priority Data

Nov. 22, 2006 (JP) ................................. 2006-315042
Mar. 8, 2007 (JP) ................................. 2007-058702

(51) Int. Cl.
*G06F 17/10* (2006.01)
(52) U.S. Cl.
USPC ............. 701/124; 141/72; 141/140; 141/343; 410/9; 410/13; 410/16; 410/26; 410/103; 296/26.09; 296/37.6; 296/37.16; 14/69.5; 14/71.1; 224/542; 303/3; 303/7; 303/15

(58) Field of Classification Search
USPC .................... 701/124; 141/72, 140, 343, 480, 141/498, 501, 522, 537; 410/9, 13, 16, 26, 410/103, 130; 296/26.09, 37.6, 37.16; 105/4.1, 105/26.05, 355, 404, 463.1; 14/69.5, 71.1; 224/542; 188/3 H, 3 R, 34, 108, 112 R; 303/3, 303/7, 15
See application file for complete search history.

(56) References Cited

U.S. PATENT DOCUMENTS 4,158,416 A * 6/1979 Podesta ...................... 414/140.1
5,548,517 A * 8/1996 Nance ........................... 701/124
(Continued)

FOREIGN PATENT DOCUMENTS

JP          64-9047          1/1989
JP          05-124543       5/1993
(Continued)

OTHER PUBLICATIONS

Extended European Search Report for European Patent Application No. 07832388.8, dated Aug. 2, 2011.
(Continued)

*Primary Examiner* — McDieunel Marc
(74) *Attorney, Agent, or Firm* — Marshall, Gerstein & Borun LLP

(57) ABSTRACT

A center-of-gravity detection system includes a vehicle capable of carrying cargo and adapted to be towed by a towing vehicle, a shake detector configured to detect shakes in the directions of the self-weight and width of the towed vehicle during travel of the towed vehicle, and an arithmetic unit. The arithmetic unit is configured to derive, based upon physical quantities that correlate with the shakes, the location of the center of gravity, in three-dimensional space, of the towed vehicle.

15 Claims, 21 Drawing Sheets

U.S. PATENT DOCUMENTS

| | | | |
|---|---|---|---|
| 6,018,696 A * | 1/2000 | Matsuoka et al. | 701/524 |
| 6,157,295 A | 12/2000 | Steiner et al. | |
| 6,192,305 B1 | 2/2001 | Schiffmann | |
| 8,173,970 B2 * | 5/2012 | Inbar | 250/390.07 |
| 2003/0085562 A1 * | 5/2003 | Sparling | 280/789 |
| 2003/0182041 A1 * | 9/2003 | Watson | 701/45 |
| 2005/0156806 A1 * | 7/2005 | Ohta et al. | 343/834 |
| 2006/0038381 A1 * | 2/2006 | Gehring et al. | 280/477 |
| 2006/0133786 A1 * | 6/2006 | Teramoto | 396/55 |

FOREIGN PATENT DOCUMENTS

| | | |
|---|---|---|
| JP | 05-213108 | 8/1993 |
| JP | 06-265433 | 9/1994 |
| JP | 10-100773 | 4/1998 |
| JP | 11-083534 | 3/1999 |
| JP | 11-271045 | 5/1999 |
| JP | 2000-028427 | 1/2000 |
| JP | 2000-302063 | 10/2000 |
| JP | 2001-097072 | 4/2001 |
| JP | 2001-260782 | 9/2001 |
| JP | 2002-116080 | 4/2002 |
| JP | 2004-345401 | 12/2004 |
| JP | 2005-313879 | 11/2005 |
| WO | WO-98/25779 A1 | 6/1998 |

OTHER PUBLICATIONS

Takano et al., "Dynamics Control of Large Vehicles for Rollover Prevention", Tokyo University of Agriculture and Technology, IEEE 0-7803-7229, Aug. 1, 2001.

International Search Report for PCT/JP2007/072659, mailed Feb. 12, 2008.

* cited by examiner

SYSTEM FOR DETECTING OR ESTIMATING CENTER-OF-GRAVITY, LATERAL ROLLOVER LIMIT OR CARGO WEIGHT

TECHNICAL FIELD

The present invention relates to center-of-gravity detection systems and lateral rollover limit velocity estimation systems, and cargo weight estimation systems for vehicles capable of carrying cargo and adapted to be towed by towing vehicles. More particularly, this invention relates to technologies for finding the location of the center of gravity in three-dimensional space of a container cargo vehicle towed and transported by a towing vehicle, for finding the lateral rollover limit velocity of such a vehicle on a curved road section of a road by means of the location of the center of gravity in three-dimensional space, and for finding the weight of cargo.

BACKGROUND ART

Generally, container cargo, commercially traded in international imports and exports, is placed, together with the container, on a carriage called a container chassis in the domestic distribution network. The container chassis is towed and transported by a towing vehicle such as a tractor, railroad engine or the like capable of towing the container chassis.

Incidentally, such container cargo is generally transported without having checked its condition of loading in the container and, as a result, various inconveniences caused by container transport vehicles have been heretofore viewed as social issues. For example, situations resulting from the biased loading of cargo in the container (e.g., cargo pile collapse/cargo falling occurring when the container door is opened and unstable travel motions of the container transport vehicle when travelling along a curved road section) are becoming social problems.

On the other hand, various technologies for measuring the condition of loading of the cargo in a vehicle such as four-wheeled truck and various coping techniques for the abnormal loading of cargo have been proposed.

For example, there is proposed a conventional technique which is directed to a braking method for a trailer (which corresponds to the container chassis) having a computerized braking system (brake control system) (see JP-A-2005-313879). In accordance with this conventional technology, vehicle rollover on a narrow curved road section or at an automobile expressway exit may be prevented.

In addition, there is proposed another conventional technique in which the rolling frequency of a truck is measured, thereby to derive the inertia moment in the front/rear longitudinal direction (travel direction), mass, and inclination of the vehicle (see JP-A-2000-28427). In accordance with this conventional technology, the inertia moment, mass, and inclination of the vehicle can be calculated unambiguously and, for example, the possibility of vehicle rollover is predictable in advance.

In addition, there is still another conventional technique that is proposed with a view to preventing the occurrence of rollover of an articulate type dump truck due to the inclination thereof caused by biased loading when the dump body is raised in order to discharge laden earth/sand or the like during stop (see JP-A-2000-302063).

In addition, there is proposed yet another conventional technique in which the weight of cargo loaded on a load deck of a truck is found using pressure-sensitive sensors which are so arranged as to cover the surface of the load deck and the static distribution of load of the truck load deck is found in two-dimensional plane (see JP-A-H05-213108). In accordance with this conventional technology, abnormal loading, such as partial laden weight excess or laden weight imbalance in the truck, is digitally, objectively detected, thereby preventing the occurrence of cargo pile collapse and vehicle rollover.

In addition, there is proposed still yet another conventional technique in which an attitude control system is provided under the load deck of a truck to sense centrifugal force produced when the truck goes around a curved road section and the attitude control system of the load deck is operated to automatically tilt the load deck thereby to overcome the centrifugal force (see JP-A-H05-124543).

Finally, there is proposed yet still another conventional technique in which the distribution of load and the inclination, in horizontal planes in the front/rear and left/right directions, of the load deck or the lateral acceleration during travel along a curved road section is measured, thereby to derive the location of the center of gravity, in the vertical direction, of the cargo loaded on the truck load deck (see JP-A-2001-97072). In accordance with this conventional technology, a specific vehicle, whose load deck is loaded with cargo in a specific condition of loading, was previously subjected to test runs over some different road surfaces (e.g., a straight track, curved track and so on), and values for inclination and lateral acceleration obtained by the test runs were measured to create a matrix database of the locations of the centers of gravity in the vertical direction according to the conditions of loading of the cargo and the differences in road surface condition. Consequently, if such a database is carried in the actual operation of a vehicle, this will make it possible to estimate the location of the center of gravity in the vertical direction by entry of load distribution and inclination values into the matrix database depending upon the condition of loading of the cargo.

DISCLOSURE OF THE INVENTION

Problems that the Invention Intends to Overcome

Serious efforts have been made by the inventor of the present application in order to develop technology capable of fundamentally overcoming social issues (for example, vehicle lateral rollover) which are caused by container transport vehicles due to the biased loading of container cargo whose condition of loading is unknown. During the development process of the technology, the inventor focused on the importance and benefit of the location of the center of gravity in three-dimensional space (hereinafter abbreviated as the "3D (three-dimensional) center-of-gravity location" if necessary) with respect to the container cargo vehicle. That is to say, the 3D center-of-gravity location of the container cargo vehicle serves as valuable data that directly reflects the degree of biasing of the load of the container cargo, and therefore, if such data is found accurately, this will contribute to preventing the cargo from pile collapse/falling when the container door is opened and the container transport vehicle from unstable travel motion along the curved road section.

For example, if the 3D center-of-gravity location of the container cargo vehicle is found accurately, this makes it possible to perform arithmetic to properly estimate the lateral rollover limit velocity of the container cargo vehicle in response to the curvature radius of a curved road section along which the container cargo vehicle travels. Besides, if the 3D center-of-gravity location of the container cargo vehicle is found accurately, this makes it possible to perform arithmetic to properly estimate the weight of container cargo, thereby resulting in making it possible to estimate whether the container cargo is overloaded or not.

Also, it should be noted that throughout the specification, what is meant by the term "container cargo vehicle" is a section of the container transport vehicle, excluding its towing vehicle, in other words the container cargo vehicle means a vehicle that is made up of a container capable of carrying cargo and a container chassis (carriage) on which the container is placed.

And, many studies were wholeheartedly conducted by the inventor of the present application, and, as the result of the studies, the present inventor succeeded in finding a method of deriving, on the basis of the logical theory of dynamics, the 3D center-of-gravity location of a vehicle (for example, the aforesaid container cargo vehicle) capable of carrying cargo and adapted to be towed by a towing vehicle, without having to introduce data that lacks theoretical ground (e.g., correction coefficient or the like). In addition, the inventor of the present application also succeeded in finding, by means of the 3D center-of-gravity location of a vehicle (for example, the aforesaid container cargo vehicle) which is towed by a towing vehicle, a method of deriving the lateral rollover limit velocity of the vehicle. Furthermore, the inventor of the present application also succeeded in finding, by means of the 3D center-of-gravity location of a vehicle (for example, the aforesaid container cargo vehicle) which is towed by a towing vehicle, a method of deriving the weight of cargo. These derivation methods will be explained later in detail.

In addition, as will be readily understood from the hereinafter described formulation, the theories of these derivation methods are independent from each other and completed in themselves. Therefore, these derivation methods have their own utility values, respectively, as a method of deriving the 3D center-of-gravity location of a vehicle, as a method of deriving the lateral rollover limit velocity of a vehicle, and as a method of deriving the weight of cargo.

Also, it should be noted that each of the aforesaid prior art techniques fails to comprehend even the importance of the 3D center-of-gravity location of a vehicle capable of carrying cargo and adapted to be towed by a towing vehicle, and neither of them is unworthy of comparison with the present invention.

In view of the above, the present invention was made and, accordingly, a first aspect of the present invention is intended to provide a center-of-gravity detection system configured to properly derive the 3D center-of-gravity location of a vehicle capable of carrying cargo and adapted to be towed by a towing vehicle (First Problem).

In addition, a second aspect of the present invention is intended to provide a lateral rollover limit velocity estimation system configured to properly derive, by means of the 3D center-of-gravity location of a vehicle capable of carrying cargo and adapted to be towed by a towing vehicle, the lateral rollover limit velocity of the vehicle in response to the curvature radius of a curved road section along which the vehicle travels (Second Problem).

In addition, a third aspect of the present invention is intended to provide a cargo weight estimation system configured to properly derive, by means of the 3D center-of-gravity location of a vehicle capable of carrying cargo and adapted to be towed by a towing vehicle, the weight of the cargo (Third Problem).

Means for Overcoming the Problems

With a view to providing solutions to the first problem, the first aspect of the present invention provides a center-of-gravity detection system which includes a vehicle capable of carrying cargo and adapted to be towed by a towing vehicle, a shake detector configured to detect shakes in the directions of the self-weight and width of the towed vehicle during travel of the towed vehicle, and an arithmetic unit, wherein based upon physical quantities that correlate with the shakes, the arithmetic unit is configured to derive the location of the center of gravity, in three-dimensional space, of the towed vehicle.

One example of such a vehicle is a container cargo vehicle comprising a container capable of carrying the cargo and a container chassis on which the container is placed.

The 3D center-of-gravity location of the container cargo vehicle serves as valuable data that directly reflects the degree of biasing of the load of the container cargo whose condition of loading is unknown, and for example, by means of this, it becomes possible to contribute to preventing the cargo from pile collapse/falling when the container door is opened and the container transport vehicle from unstable travel motion on the curved road section.

Especially, in accordance with the first aspect of the present invention, the 3D center-of-gravity location of the vehicle is derived based upon the logical theory of dynamics, without having to introduce data that lack theoretical ground (e.g., correction coefficient or the like) and, as a result, the reliability of the arithmetic results is extremely high.

Incidentally, there are generally two methods for the formulation of the motion of the center of gravity of an object, that is, in one method it is taken as a problem of the mechanics of mass point while in the other method it is taken as a problem of the mechanics of the rigid body system.

The inventor of the present application took the motion of a vehicle (here, a container cargo vehicle is taken as an example) as a problem of the mechanics of mass point in which the center of gravity of the container cargo vehicle is a mass point. And, this resulted in leading the inventor of the present application to find that the equations of motion that rule the motion of the center of gravity of the container cargo vehicle can be reorganized to a considerably useful mathematical expression in the light of the actual conditions of the container transport operation.

Therefore, the first aspect of the present invention is an invention that was devised based upon the foregoing knowledge. In one example of the center-of-gravity detection system according to the first aspect of the present invention, when the shake in the self-weight direction corresponds to a vertical reciprocation motion in which the center of gravity of the container cargo vehicle is a mass point and the shake in the width direction corresponds to a horizontal simple pendulum motion in which the axle center of the container cargo vehicle is a support point and the center of gravity of the container cargo vehicle is a mass point, the physical quantities include the frequency of the reciprocation motion, the frequency of the simple pendulum motion, and the central angle of the simple pendulum motion, and the arithmetic unit is configured to derive, based upon the frequency of the simple pendulum motion, the location of the center of gravity of the container cargo vehicle with respect to the travel direction of the container and to derive, based upon the frequency of the reciprocation motion, the frequency of the simple pendulum motion, and the central angle of the simple pendulum motion, the location of the center of gravity of the container cargo vehicle with respect to a cross-section surface perpendicular to the travel direction of the container.

That is to say, the aforesaid physical quantities include neither the elastic coefficient of the container transport vehicle nor the weight of the container cargo vehicle. This therefore makes it possible to not only save thousands of man-hours taken to measure elastic coefficient and weight, but also to facilitate the universal application of the present technology to any type of container transport vehicle (that is, any combinations of an indefinite number of towing vehicles, an indefinite number of container chassis, and an indefinite number of containers), regardless of the uncertain factors (e.g., container transport vehicle's manufacturer, model year, degree of aging et cetera).

More specifically, the center-of-gravity detection system of the first aspect of the present invention may be a center-of-gravity detection system in which: there is provided a disc-shaped coupling member configured to connect, at between the proximity of a front section of the container chassis relative to the travel direction thereof and the towing vehicle, the both together in a widthwisely swing-movable manner; the container chassis includes across beam which extends in the width direction of the container and supports the proximity of a rear section of the container relative to the travel direction thereof; the arithmetic unit is configured to convert output data of the shake detector into rolling data representative of a correlation between the frequency and the amplitude of the simple pendulum motion and to obtain, based upon the rolling data, a first frequency of the simple pendulum motion corresponding to the peak amplitude of the simple pendulum motion originated from the cross beam, a second frequency of the simple pendulum motion corresponding to the peak amplitude of the simple pendulum motion originated from the coupling member, and a third frequency of the simple pendulum motion corresponding to the peak amplitude of the simple pendulum motion originated from the center of gravity of the container cargo vehicle; and based upon the first, second, and third frequencies of the simple pendulum motion, the arithmetic unit derives the location of the center of gravity of the container cargo vehicle relative to the travel direction.

In addition, the arithmetic unit may be an arithmetic unit in which: the arithmetic unit is configured to convert output data of the shake detector into rolling data representative of a correlation between the frequency and the amplitude of the simple pendulum motion and to obtain, based upon the rolling data, the frequency of the simple pendulum motion corresponding to the peak amplitude of the simple pendulum motion originated from the center of gravity of the container cargo vehicle; the arithmetic unit is configured to convert output data of the shake detector into pitching data representative of a correlation between the frequency and the amplitude of the reciprocation motion and to obtain, based upon the pitching data, the frequency of the reciprocation motion corresponding to the maximum amplitude of the reciprocation motion; the arithmetic unit is configured to sample temporal data of the amplitude of the simple pendulum motion from output data of the shake detector and to obtain the average value of the temporal data as the central angle of the simple pendulum motion; and based upon the frequency of the simple pendulum motion, the frequency of the reciprocation motion, and the central angle of the simple pendulum motion, the arithmetic unit is configured to derive the location of the center of gravity of the container cargo vehicle relative to the cross-section surface perpendicular to the travel direction of the container.

In addition, the shakes in the vertical (self-weight) and width directions of the container cargo vehicle may be motions resulting from external disturbances imparted, during straight travel of the container cargo vehicle on a road surface, to the container cargo vehicle in response to irregularities of the road surface.

This makes it possible for the center-of-gravity detection system to perform arithmetic to calculate the 3D center-of-gravity location of the container cargo vehicle if the container cargo vehicle is made to discretionarily travel to the general flow of traffic (preferably, straight travel). Therefore, the work of obtaining arithmetic data can be conducted easily, which is preferable because there is no need to obtain data at the time of travel along the curved road section.

Furthermore, it may be arranged such that the shake detector includes an angular velocity sensor which is mounted in the towing vehicle and whose angular velocity sensitive axes are aligned in the self-weight and width directions of the container cargo vehicle.

As a result of the above arrangement, it suffices if only one angular velocity sensor is installed by simple means (such as adhesive joint or bolt fastening (not shown)) in a suitable place in the towing vehicle for performing arithmetic to calculate the 3D center-of-gravity location of the container cargo vehicle. Stated another way, this is preferable because there is no need to take any measures against great numbers of containers and container chassis that are handled in container transport operations.

In addition, in order to overcome the second problem, a second aspect of the present invention provides a lateral rollover limit velocity estimation system including a vehicle capable of carrying cargo and adapted to be towed by a towing vehicle and an arithmetic unit in which system the arithmetic unit is configured to obtain the location of the center of gravity, in three-dimensional space, of the towed vehicle and the curvature radius of a curved road section along which the towed vehicle travels and to derive a lateral rollover limit velocity for the curved road section in response to the obtained curvature radius with the use of the obtained location of the center of gravity.

Additionally, the center-of-gravity detection system according to the first aspect of the present invention may be employed as a concrete method for the arithmetic unit to obtain the center of gravity location, in three-dimensional space, of the vehicle but this is not considered limitative. For example, when the operator himself loads a vehicle with cargo, it is possible for the operator to measure the 3D center-of-gravity location of the vehicle. In this case, the arithmetic unit is able to obtain the 3D center-of-gravity location by entry of the center-of-gravity location made by the operator.

Such a lateral rollover limit velocity is a reference velocity as to whether or not the vehicle is brought into lateral rollover, and this makes it possible to contribute to preventing the vehicle from unstable travel motion on the curved road section.

Incidentally, the inventor of the present application has found that there is the case where rotational motion within plane in the direction of application of the self-weight of the vehicle acts simultaneously with and independently of the rotational motion of the vehicle in the cross-section surface perpendicular to the travel direction of the vehicle when the vehicle travels along the curved road section and each of these motion forces accidentally momentarily coincides with the other in the direction that causes the vehicle to tilt. Hence, for the proper formulation of the abnormal travel condition of a vehicle when travelling on a curved road section, it is essential to obtain the location of the center of gravity of the vehicle in the cross-section surface perpendicular to the travel direction of the vehicle and the location of the center of gravity of the vehicle relative to the travel direction of the vehicle, in other words it is essential to specify the 3D center-of-gravity location of the vehicle, as already described above.

Now, therefore, it may be arranged such that the arithmetic unit is configured to derive the lateral rollover limit velocity on the basis of: a first expression which represents, by means of the center-of-gravity location of the towed vehicle relative to a cross-section surface perpendicular to the travel direction of the towed vehicle, a relationship between the velocity of the towed vehicle and the curvature radius in the event that the towed vehicle is brought into rotation centered on a turning outer wheel of the towed vehicle; and a second expression which represents, by means of the center-of-gravity location of the towed vehicle relative to the travel direction of the towed vehicle, a relationship between the velocity of the towed vehicle and the curvature radius in the event that the towed vehicle is brought into rotation centered on a point of connection between the towing vehicle and the towed vehicle.

As a result of the above arrangement, it becomes possible to derive, based upon the logical theory of dynamics, the lateral rollover limit velocity of the vehicle without having to introduce data that lack theoretical ground (e.g., correction coefficient or the like), and, therefore, the reliability of the arithmetic results is extremely high.

One example of the towed vehicle is a container cargo vehicle comprising a container capable of carrying the cargo and a container chassis on which the container is placed.

It may be arranged such that there is provided a shake detector configured to detect shakes in the directions of the self-weight and width of the towed vehicle during travel of the towed vehicle, and that based upon physical quantities that correlate with the shakes, the arithmetic unit is configured to derive the location of the center of gravity.

This arrangement makes it possible to perform arithmetic to calculate various types of center-of-gravity related data (the details of which are described later) required for the derivation of the lateral rollover limit velocity on the basis of the 3D center-of-gravity location, thereby saving the trouble of measuring these center-of-gravity related data and, in addition, providing data of high accuracy. Furthermore, even in the case where the container cargo is transported as it is (that is, in the case where the condition of loading in the vehicle remains unchecked, for example, as when container cargo, commercially traded in international imports and exports, is transported), it is still possible to obtain the center-of-gravity related data.

In addition, it may be arranged such that there is provided a receiver configured to receive and provide radio intelligence about the curvature radius to the arithmetic unit.

This arrangement allows the arithmetic unit to automatically obtain, through the receiver, radio intelligence about the curvature radius of a curved road section on which the vehicle is scheduled to travel, for example, from a local ITS, thereby saving the trouble of obtaining the curvature radius of the curved road section.

In addition, in order to overcome the third problem, a third aspect of the present invention provides a cargo weight estimation system which includes a vehicle capable of carrying cargo and adapted to be towed by a towing vehicle and an arithmetic unit, wherein the arithmetic unit is configured to obtain the location of the center of gravity, in three-dimensional space, of the towed vehicle loaded with the cargo and the location of center of gravity, in three-dimensional space, of the towed vehicle without the cargo and to derive the weight of the cargo with the use of the obtained two center-of-gravity locations.

In addition, the center-of-gravity detection system according to the first aspect of the present invention may be employed as a concrete method for the arithmetic unit to obtain the 3D center-of-gravity location of the vehicle but this is not considered limitative. For example, when the operator himself loads a vehicle with cargo, it is possible for the operator to measure the aforesaid two center-of-gravity locations. In this case, the arithmetic unit is able to obtain the 3D center-of-gravity locations by entry of the center-of-gravity locations made by the operator.

By obtaining the weight of the cargo, it becomes possible to correctly determine whether or not the vehicle is overloaded. This contributes to preventing the vehicle from unstable travel motion and the cargo from pile collapse/falling.

In addition, one example of the towed vehicle is a container cargo vehicle comprising container capable of carrying the cargo and a container chassis on which the container is placed.

In addition, it may be arranged such that based upon the aforesaid two center-of-gravity locations, the length (in the travel direction of the container cargo vehicle) of the container, and the weight of the container cargo vehicle without the cargo, the arithmetic unit is configured to derive the apparent weight of the cargo with consideration given only to the travel direction.

In addition, it may be arranged such that based upon the two center-of-gravity locations, the length (in the width direction of the container cargo vehicle) of the container, and the weight of the container cargo vehicle without the cargo, the arithmetic unit is configured to derive the apparent weight of the cargo with consideration given only to the width direction.

In addition, it may be arranged such that based upon the two center of gravity locations, the length (in the self-weight direction of the container cargo vehicle) of the container, and the weight of the container cargo vehicle without the cargo, the arithmetic unit is configured to derive the apparent weight of the cargo with consideration given only to the self-weight direction.

And, it may be arranged such that based upon the three directional apparent weights of the cargo, the arithmetic unit is configured to derive the net weight of the cargo.

As a result of the above arrangements, it becomes possible to derive, based upon the logical theory of mass system dynamics, the apparent weight and net weight of the container cargo, without having to introduce data that lack theoretical ground (e.g., correction coefficient or the like), and, therefore, the reliability of the weight arithmetic is extremely high.

In addition, it may be arranged such that: there is provided a shake detector configured to detect shakes in the directions of the self-weight and width of the towed vehicle during travel of the towed vehicle; based upon physical quantities that correlate with the shakes of the towed vehicle loaded with the cargo, the arithmetic unit is configured to derive the location of the center of gravity, in three-dimensional space, of the towed vehicle loaded with the cargo; and based upon physical quantities that correlate with the shakes of the towed vehicle without the cargo, the arithmetic unit is configured to derive the location of the center of gravity, in three-dimensional space, of the towed vehicle without the cargo.

This therefore saves the trouble of measuring these center-of-gravity locations, thereby providing data of high accuracy. Furthermore, even in the case where the container cargo is transported as it is (that is, in the case where the condition of loading in the vehicle remains unchecked, for example, as when container cargo, commercially traded in international imports and exports, is transported), it is possible to obtain the center-of-gravity locations.

These and other objects, features, and advantages of the invention will be made more clear with reference to the following detailed description of each of preferred embodiments in connection with the accompanying drawings.

Advantageous Effects of the Invention

In accordance with the first aspect of the present invention, there is provided a center-of-gravity detection system capable of properly deriving the 3D center-of-gravity location of a vehicle capable of carrying cargo and adapted to be towed by a towing vehicle.

In addition, in accordance with the second aspect of the present invention, there is also provided a lateral rollover limit velocity estimation system capable of properly deriving, by means of the 3D center-of-gravity location of a vehicle which is towed by a towing vehicle, the lateral rollover limit velocity of the vehicle in response to the curvature radius of a curved road section of a road along which the towed vehicle travels.

In addition, in accordance with the third aspect of the present invention, there is also provided a cargo weight estimation system capable of properly deriving, by means of the 3D center-of-gravity location of a vehicle capable of carrying cargo and adapted to be towed by a towing vehicle, the weight of the cargo.

REFERENCE NUMERALS IN THE DRAWINGS

| | |
|---|---|
| 10 | Tractor |
| 11 | Container |
| 12 | Container chassis |
| 13 | Coupler |
| 14 | Shake detector |
| 14a | Angular velocity sensor |
| 14b | A/D converter |
| 114 | Data detection part |
| 114c | Antenna |
| 114d | Receiver |
| 15, 115 | Arithmetic unit |
| 15a, 115a | Arithmetic part |
| 15b, 115b | Storage part |
| 15c, 115c | Operation setting/display part |
| 20 | Front cross beam |
| 21 | Rear cross beam |
| 50 | Trailer truck (container transport vehicle) |
| 100 | Center-of-gravity detection system |
| 100A | Cargo weight estimation system |
| 110 | Lateral rollover limit velocity estimation system |
| 201 | Vertical central line |
| 202 | Axle position line |
| 207 | Horizontal central line |
| 204 | Road surface |
| 204c | Curved road section |
| 205 | Suspension |

-continued

| 206 | Rolling central line |
| 300 | Turning outer wheel's outer edge |
| E | Connection point |

BEST MODE FOR CARRYING OUT THE INVENTION

Hereinafter, first, second, and third preferred embodiments of the present invention will be described with making reference to the drawings.

First Embodiment

Figure 1:
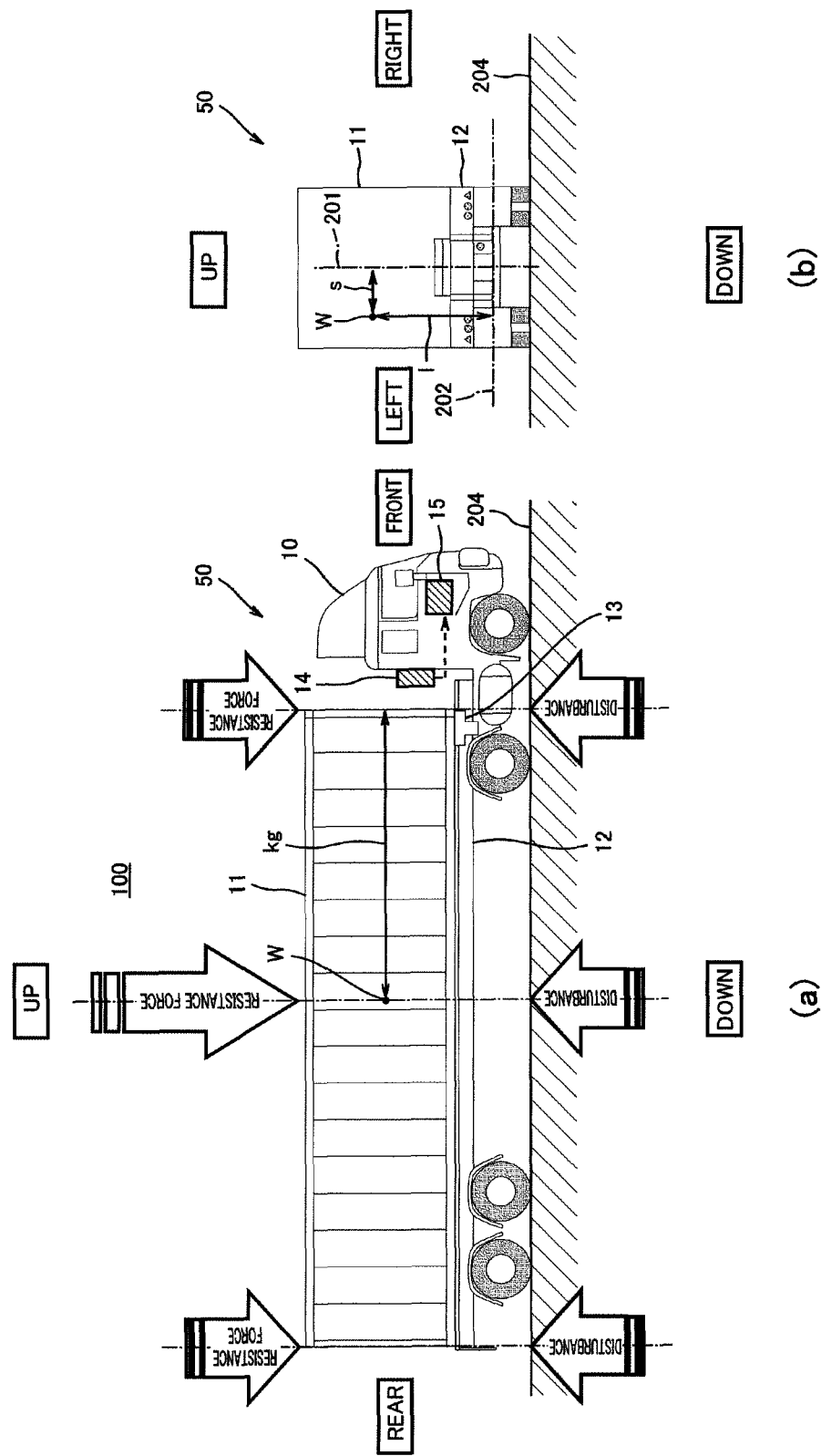
FIG. 1(a) and (b) is an outline illustration showing an example of the configuration of a center-of-gravity detection system according to a first embodiment of the invention.

FIG. 1 is a schematic illustration showing an example of the configuration of a center-of-gravity detection system according to a first embodiment of the present invention. FIG. 1(a) is a view of the center-of-gravity detection system, as viewed from the width direction (from one side) of a container cargo vehicle. FIG. 1(b) is a view of the center-of-gravity detection system, as viewed from the rear side of the container cargo vehicle.

Also note that in the drawings, for the sake of convenience of the following description, the direction in which the self (tare) weight of the container cargo vehicle is applied is referred to as the "vertical direction", the width direction of the container cargo vehicle is referred to as the "horizontal direction", and the travel direction of the container cargo vehicle is referred to as the "front/rear direction".

Referring to FIG. 1(a), there is shown a center-of-gravity detection system 100 which includes a container transport vehicle 50, a shake detector 14 for the detection of shakes in both the vertical and horizontal directions of a container cargo vehicle in motion, and an arithmetic unit 15.

One typical form of the container transport vehicle 50 is a trailer truck which employs a tractor as a towing vehicle. Therefore, in the present embodiment (as same in the hereinafter described second and third embodiments), the construction and operation of the container transport vehicle 50 will be described taking, as an example, trailer truck transportation in which a container chassis loaded with a 40-feet marine container according to worldwide standard specifications is towed by a tractor. However, the hereinafter described technology is applicable not only just to the container transport vehicle 50, but also to various vehicles in different transportation forms such as a railway cargo car and so on.

As shown in FIG. 1(a), the trailer truck 50 has a rectangular container 11 capable of carrying container cargo (not shown), a container chassis 12 serving as a carriage on which the container 11 is placed, and a tractor 10 as a towing vehicle which is coupled to the container chassis 12 so that the container chassis 12 is towed or driven. The tractor 10 has a disc-shaped coupler 13 as a coupling member (to be hereinafter described) for establishing connection to the container chassis 12, by means of which the both are coupled together swingably in the horizontal direction through the coupler 13.

In addition, the detection technology of the present embodiment is theoretically applicable, regardless of the existence or nonexistence of the loading of container cargo in the container 11 (as same in the second embodiment to be hereinafter described), and accordingly the existence or nonexistence of the loading of container cargo in the container 11 is not in question in the present specification.

In addition, it should be noted that the form of the trailer truck 50 depicted in FIG. 1 is just only one example, and the detection technology of the present embodiment is applicable to various types of trailer trucks (as same in the second and third embodiment).

Figure 2:
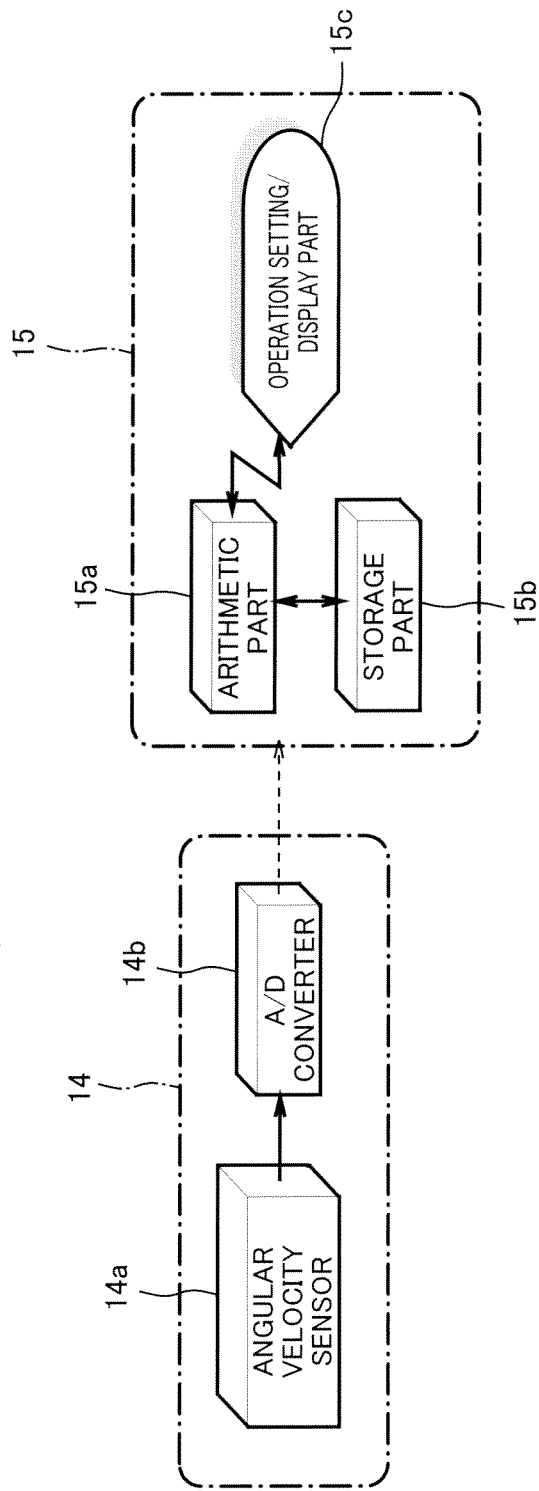
FIG. 2 is a block diagram showing one example of the internal configurations of a shake detector and an arithmetic unit in the center-of-gravity detection system of the first embodiment.

FIG. 2 is a block diagram showing one example of the internal configurations of a shake detector and an arithmetic unit in the center-of-gravity detection system of the present embodiment.

The shake detector 14 is firmly secured in the middle, relative to the horizontal direction, of the trailer truck 50, i.e., in the location causing no impedance to the transport work on the side of the tractor 10 (for example, in the vicinity of the coupler 13). The arithmetic unit 15 is installed in place in the driver's cabin of the tractor 10. And, the both devices are so connected together as to establish data transmission therebetween by wire communication, wireless communication or the like via suitable data input/output ports (not shown).

As shown in FIG. 2, the shake detector 14 includes a biaxial (two-dimensional) angular velocity sensor 14a having angular velocity-sensitive axes aligned so as to sense shake in the vertical and width directions of the container cargo vehicle of the trailer truck 50 during travel, and an A/D (analog/digital) converter 14b for the conversion of an analog signal output from the angular velocity sensor 14a into a digital signal.

In addition, the size of angular velocity signal digitalized by the A/D converter 14b is proportional to the angular velocity of shake in the vertical and width directions of the container cargo vehicle of the trailer truck 50 during travel. For example, the biaxial angular velocity sensor 14a may be implemented by a sensor of the crystal tuning fork type or a sensor of the oscillation type, which is however not considered limitative. As a substitute for the angular velocity sensor 14a, either a triaxial (three-dimensional) angular velocity sensor or a velocity sensor may be employed. In addition, here, the shake detector 14 containing therein the A/D converter 14b is exemplarily shown in consideration of convenience at the time of use of the shake detector 14, but the A/D converter 14b may be in the form of an external A/D converter. Furthermore, the shake detector 14 contains therein various signal processing circuits such as a filter (not shown), an amplifier (not shown), and other like means, but their detailed description is omitted here because they are commonly-used art.

In addition, as shown in FIG. 2, the arithmetic unit 15 includes an arithmetic part 15a comprised of a microprocessor or the like, a storage part 15b comprised of ROM (Read Only Memory), RAM (Random Access Memory), or the like, and an operation setting/display part 15c. As a form of the arithmetic unit 15, there is an information mobile terminal such as a personal computer of the notebook type or the like.

The storage part 15b is connected to the arithmetic part 15a, and stores an arithmetic program for properly deriving the 3D center-of-gravity location of the container cargo vehicle and various input constants (to be hereinafter described) necessary for performing arithmetic to calculate the 3D center-of-gravity location.

The arithmetic part 15a operates according to the arithmetic program pre-stored in the storage part 15b. For example, the arithmetic part 15a is capable of deriving, based upon the digital signal output from the shake detector 14 (the A/D converter 14b), the 3D center-of-gravity location of the container cargo vehicle, as will be described later.

The operation setting/display part 15c includes a console part (for example, a keyboard (not shown)) on which setting buttons for entry of the aforesaid input constants are arrayed, and an information notifying device (for example, such as liquid crystal panel display, loudspeaker (not shown)) that provides information either in displayed or audible manner so that the output data about the 3D center-of-gravity location of the container cargo vehicle output from the arithmetic part 15a can be recognized by the operator (driver or fellow passenger).

Next, with reference to the drawings, a description will be made in detail about a method of deriving the 3D center-of-gravity location of the container cargo vehicle.

Figure 3:
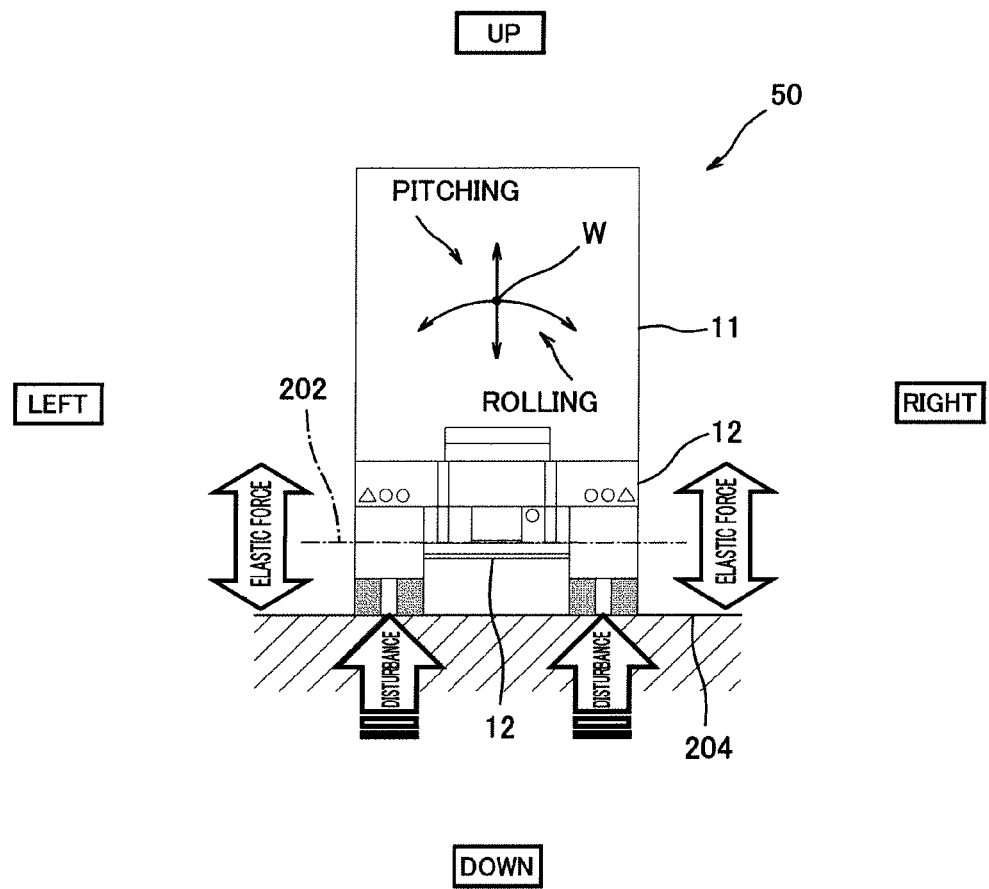
FIG. 3 is a schematic illustration for the purpose of explaining a method of deriving the 3D center-of-gravity location of a container cargo vehicle by means of the center-of-gravity detection system of the first embodiment.
Figure 4:
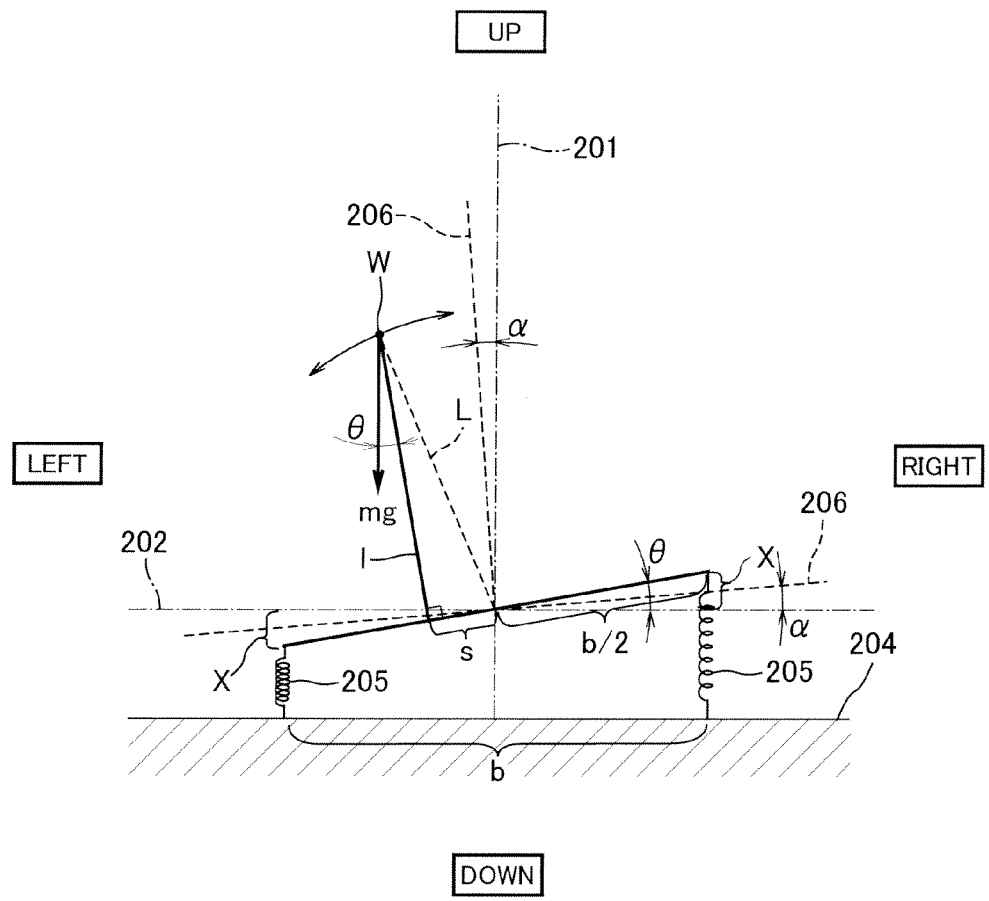
FIG. 4 is a schematic illustration for the purpose of explaining a method of deriving the 3D center-of-gravity location of a container cargo vehicle by means of the center-of-gravity detection system of the first embodiment.
Figure 5:
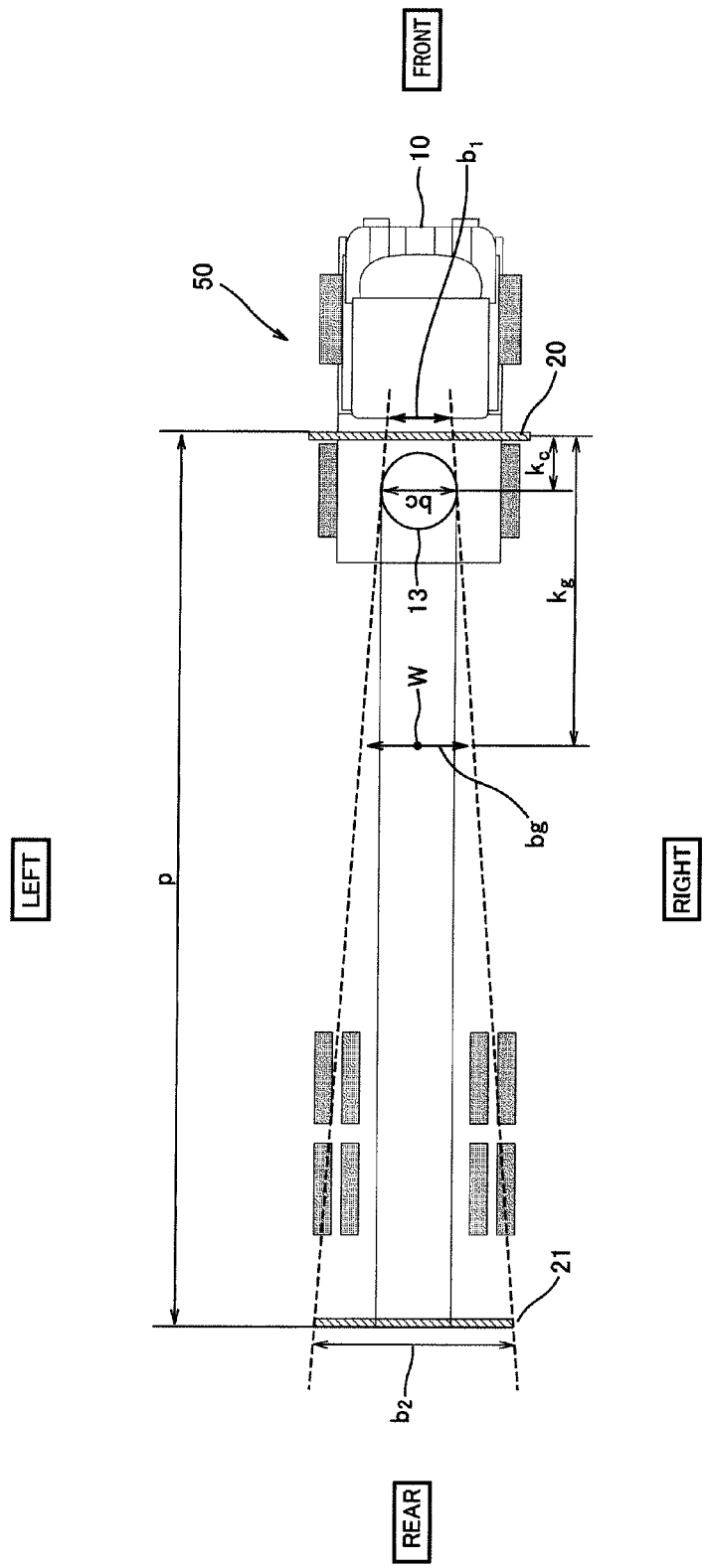
FIG. 5 is a schematic illustration for the purpose of explaining a method of deriving the 3D center-of-gravity location of a container cargo vehicle by means of the center-of-gravity detection system of the first embodiment.

FIGS. 3, 4, and 5 are each a schematic illustration for the purpose of describing the method of deriving the 3D center-of-gravity location of the container cargo vehicle by means of the center-of-gravity detection system of the present embodiment. FIGS. 3 and 4 are views as viewed from the front/rear direction in which the trailer truck travels. FIG. 5 is a view as viewed from the vertical direction in which the self-weight of the trailer truck is applied.

In addition, in FIGS. 3, 4, and 5, the configuration of the center-of-gravity detection system 100 is shown in simplified manner or omitted for the sake of facilitating the understanding of the method of deriving the 3D center-of-gravity location.

In the first place, with the aid of FIGS. 3 and 4, a description will be made about a method of deriving the location of the center of gravity, W, of the container cargo vehicle in a cross-section surface perpendicular to the front/rear direction (travel direction) of the container 11.

As shown in FIG. 3, the container 11, when placed on the container chassis 12, is supported by the buffer elastic force (for example, air pressure and spring force) of suspensions 205 (suspension devices (see FIG. 4)) disposed in the tractor 10 and the container chassis 12, and is in neutral at a constant level of height from a road surface 204. If, in this condition, the trailer truck 50 travels, its tires will keep "treading" on irregularities of the road surface 204, and, as a result, random external disturbances will be transmitted via the suspensions 205 to the vehicle body (the container 11) of the trailer truck 50. By such external disturbance, the trailer truck 50 oscillates based upon the motion having a characteristic period (frequency) dependent on the elastic force of the suspensions 205, the total weight of the container cargo vehicle, and the location of the center of gravity thereof. And, this motion is detected, by the shake detector 14, as a reciprocation motion in the vertical direction of the center of gravity W of the container cargo vehicle (to be correct, the pitching of the tractor 10 to be hereinafter described) and as a horizontal simple pendulum motion of the center of gravity, W, of the container cargo vehicle. Also, in the present specification, the suspension 205 means a member capable of buffering vibration, from the road surface 204, of the vehicle body of the trailer truck 50 and includes other than a spring type buffer coupled to an axle, for example tires arranged at the ends of the axle and filled with air.

The former motion corresponds to a behaviour that is called the "pitching" of the tractor 10. When the container cargo vehicle reciprocates in the vertical direction, the coupler 13, by which the tractor 10 and the container chassis 12 are coupled together, is pushed vertically. Since the position of the coupler 13 resides behind the tractor 10, the front section of the tractor 10 conversely sinks and floats by the coupler 13 being pushed vertically. This phenomenon is the pitching of the tractor 10. That is to say, the reciprocation motion, in the vertical direction, of the container cargo vehicle is transmitted through the coupler 13 to the tractor 10, thereby causing the tractor 10 to undergo pitching.

In addition, the latter motion corresponds to a behaviour that is called the "rolling" of the trailer truck 50.

In the trailer truck 50, usually each of the rear, front, right, and left axles is provided with a respective suspension 205; however, from the fact that these behaviours (vertical reciprocation motion and horizontal simple pendulum motion) occur at the same time, it can be considered reasonable that, in taking account into the dynamic elastic coefficient (the constant of spring), the analysis of the behaviours is conducted by simply assuming that a single respective elastic body (spring) is mounted on each of the right and left axles. The validity of this assumption has been confirmed by a first verification experiment (to be hereinafter described) conducted by using a real car.

In addition, as an additional remark to the above, of the aforesaid prior art techniques, there is an example (JP-A-2000-28427) in which a characteristic quantity, such as the moment of inertia of a vehicle, is decided on the assumption of measuring the elastic coefficient of a suspension, and there is another example (JP-A-2001-97072) that makes, in advance, a database of the strengths of suspensions at the time of test runs. However, these techniques are of no utility for the trailer truck 50, when considering the actual conditions of container transport operations.

That is to say, the elastic coefficient of the suspension 205 varies depending on the manufacturers of the tractor 10 and the container chassis 12, the type of vehicle, the model year, and the degree of aging. Thus, it is practically impossible to specify the manufactures, the vehicle type, the model year, and the degree of aging, in view of the actual conditions of the transport operation of the container 11. In the container transport operation, containers (the container 11) are daily transported by trailer trucks (the trailer truck 50) composed of any combinations (practically speaking, numberless combinations) of an indefinite number of tractors (the tractor 10) and an indefinite number of container chassis (the container chassis 12). Consequently, there are no effective ways of how to pre-specify their manufacturer, type of vehicle, model year, not to mention that it is impossible to specify the degree of aging of both of the vehicles. Furthermore, from the fact that, as in the tractor 10, most types of tractors employ air suspensions, there are cases in which the elastic coefficient of each suspension 205 disposed on a respective axle varies from time to time depending on the loading condition of the container 11 placed on the container chassis 12 to be towed, the condition of the road surface 204, and the travel situation.

In addition, of the aforesaid prior art techniques, there is a technique (for example, JP-A-2005-313879) on the assumption that a large number of detectors are disposed in a chassis on the side of a container (which corresponds to the container chassis in the present specification); however, as can be easily imagined from the fact that the numeric quantity of container chassis dealt with in the container transport operation is huge, there is no way that this means is practical in view of the costs.

Firstly, the period T' of a vertical reciprocation motion of the center of gravity W of the container cargo vehicle (the period corresponding to the pitching period of the tractor 10) is expressed in a formula where the center of gravity W of the container cargo vehicle is a mass point.

As shown in FIG. 3, if it is thought that there are two elastic bodies on either side of the vehicle, then the characteristic period of the reciprocation motion of the container cargo vehicle is expressed by the following expression.

$$T' = 2\pi \sqrt{\frac{m}{2k}}$$

In this expression, T' is the period of the vertical reciprocation motion of the center of gravity W of the container cargo vehicle. k is the elastic coefficient (the constant of spring) of one of the right and left-hand suspensions 205. m is the weight of the container cargo vehicle, and π is the circle ratio (pi).

Next, the period T of a horizontal simple pendulum motion of the center of gravity W of the container cargo vehicle (the period corresponding to the rolling period of the trailer truck 50) is expressed in a formula where the center of gravity W of the container cargo vehicle is a mass point.

As shown in FIG. 4, since the rolling of the container cargo vehicle is a horizontal simple pendulum motion of the center of gravity W of the container cargo vehicle in which motion the axle center (the point of intersection of a vertical central line 201 and an axle position line 202 as shown in FIG. 4) is a point of support, the following mathematical expression is obtained from the balance of rotational moment in the tangential direction of a rolling circle during rolling of the container cargo vehicle.

$$Lf = -kx\frac{b}{2} + mgl\sin\theta + mgs\cos\theta - kx\frac{b}{2}$$
$$= -kxb + mgl\sin\theta + mgs\cos\theta$$

In this mathematical expression, f is the force that is imparted in the tangential direction of the rolling circle (rotating circle) to the center of gravity W of the container cargo vehicle. θ is the rolling angle. L is the length from the axle center to the center of gravity W of the container cargo vehicle. b is the length of a portion that supports the load of the container 11, and is the constant established for each container 11. The lower case letter l is the vertical length from the axle to the center of gravity W of the container cargo vehicle, and is the value that represents the vertical location of the center of gravity W, in the cross-section surface perpendicular to the front/rear direction of the container 11, of the container cargo vehicle, as shown in FIG. 1(*b*). s is the horizontal length from the center of the axle to the center of gravity W of the container cargo vehicle, and is the value that represents the horizontal location of the center of gravity W, in the cross-section surface perpendicular to the front/rear direction of the container 11, of the container cargo vehicle, as shown in FIG. 1(*b*). x is the amount of displacement of each of the right and left-hand suspensions. g is the gravitational acceleration.

That is to say, if l and s are found here, this makes it possible to derive the center of gravity W, in the cross-section surface perpendicular to the front/rear direction (travel direction) of the container 11, of the container cargo vehicle.

Here, since x=(b/2) sin θ, then the aforesaid rotational moment's balance expression can be represented as follows by expression (1).

$$Lf = -k\frac{b^2}{2}\sin\theta + mgl\sin\theta + mgs\cos\theta \quad (1)$$
$$= -mg\left(\frac{kb^2}{2mg}\sin\theta - l\sin\theta - s\cos\theta\right)$$
$$= -mg\left\{\left(\frac{kb^2}{2mg} - l\right)\sin\theta - s\cos\theta\right\}$$

In addition, expression (1) is expanded as given in expression (2) by the composition of trigonometric functions in parenthesis. In expression (2), the angle of the sine function (θ+Φ) obtained by the trigonometric function composition is represented as the rolling angle θ'.

$$Lf = -mg\sqrt{\left(\frac{kb^2}{2mg} - l\right)^2 + (-s)^2}\sin\theta' \quad (2)$$
$$\tan\theta' = \frac{-s}{\frac{kb^2}{2mg} - l}$$
$$\therefore f = -\frac{mg}{L}\sqrt{\left(\frac{kb^2}{2mg} - l\right)^2 + (-s)^2}\sin\theta'$$

Now, if the horizontal location of the center of gravity W of the container cargo vehicle resides on the vertical central line 201, then the central angle α of the rolling (simple pendulum motion) of the center of gravity W becomes zero. In the present specification, the central angle α indicates the angle formed by the vertical central line 201 and a rolling central line 206, as shown in FIG. 4.

On the other hand, if the aforesaid location is deviated either right or left (that is, s≠0), then the central angle α of the rolling has a constant value other than zero. If, in this condition, the trailer truck 50 is brought to a stop, it tilts and neutralises while the central angle α is maintained. Therefore, by replacing θ in expression (1) with the central angle α of the rolling of the center of gravity W (in other words, the angle of inclination of the center of gravity W during stop), this makes the following expression (3) true on the assumption of either the case where the center of gravity W passes through the center of the rolling or the case where the trailer truck 50 stops.

$$Lf = 0 \quad (3)$$
$$0 = \left(\frac{kb^2}{2mg} - l\right)\sin\alpha - s\cos\alpha$$
$$\therefore s = \left(\frac{kb^2}{2mg} - l\right)\tan\alpha$$

In this expression, α is, as described above, is the central angle of the rolling of the center of gravity W of the container cargo vehicle, and is the angle formed by the vertical central line 201 and the rolling central line 206.

Therefore, if substituted in expression (2) for reorganization, expression (3) becomes the following expression.

$$f = -\frac{mg}{L}\sqrt{\left(\frac{kb^2}{2mg} - l\right)^2 + \left\{\left(\frac{kb^2}{2mg} - l\right)\tan\alpha\right\}^2}\sin\theta'$$
$$= -\frac{mg}{L}\left(\frac{kb^2}{2mg} - l\right)\sqrt{1 + \tan^2\alpha}\sin\theta'$$
$$= -\frac{mg}{L}\left(\frac{kb^2}{2mg} - l\right)\sqrt{\frac{\cos^2\alpha + \sin^2\alpha}{\cos^2\alpha}}\sin\theta'$$
$$= -\frac{mg}{L}\left(\frac{kb^2}{2mg} - l\right)\frac{1}{\cos\alpha}\sin\theta'$$
$$= -\frac{1}{L\cos\alpha}\left(\frac{kb^2}{2} - mgl\right)\sin\theta'$$

Actually, it is assumed that the aforesaid rolling angle θ' is a very small value of a few of degrees of angle at most. Therefore, f in the expression can be written as given in the following expression from the characteristics of the trigonometric function when θ' has a low enough value (that is, from the relationship of sin θ'≅θ').

$$\therefore f = -\frac{1}{L\cos\alpha}\left(\frac{kb^2}{2} - mgl\right)\theta'$$

This expression form, since it is equivalent to the equation of the circulation motion of a pendulum where L is the radius, is rewritten as follows.

$$mL\frac{d^2\theta'}{dt^2} = -\frac{1}{L\cos\alpha}\left(\frac{kb^2}{2} - mgl\right)\theta'$$

$$\frac{d^2\theta'}{dt^2} = -\frac{1}{L^2\cos\alpha}\left(\frac{kb^2}{2m} - gl\right)\theta'$$

Here, if the phase of θ' is ω, it follows that:

$$\frac{d^2\theta'}{dt^2} = -\omega^2\theta'$$

$$\therefore \omega = \frac{1}{L\sqrt{\cos\alpha}}\sqrt{\frac{kb^2}{2m} - gl}$$

In addition, the rolling period of the trailer truck 50 is T, and since T=2 π/ω, the following rewriting is obtained.

$$T = \frac{2\pi}{\frac{1}{L\sqrt{\cos\alpha}}\sqrt{\frac{kb^2}{2m} - gl}}$$

And, since $L=\sqrt{(l^2+s^2)}$, the following expression is finally obtained for the rolling period T.

$$\therefore T = \frac{2\pi\sqrt{(l^2+s^2)\cos\alpha}}{\sqrt{\frac{kb^2}{2m} - gl}}$$

In this way, T' (the period of the vertical reciprocation motion of the center of gravity W of the container cargo vehicle) and T (the period of the horizontal simple pendulum motion of the center of gravity W of the container cargo vehicle) are derived.

Incidentally, the angular velocity detected by the shake detector 14 (the angular velocity sensor 14a) is generally the angular frequency (hereinafter abbreviated as the "frequency") that corresponds to the angle/time, and this frequency is represented by the reciprocal of the period (1/period). Therefore, if the pitching frequency of the tractor 10 that corresponds to T' (the period of the vertical reciprocation motion of the center of gravity W) is denoted as v' and, in addition, the rolling frequency thereof that corresponds to T (the period of the horizontal simple pendulum motion of the center of gravity W) is denoted as v, then the aforesaid expressions can be reorganized to the following expressions, respectively.

$$v' = \frac{1}{T'} = \frac{1}{2\pi}\sqrt{\frac{2k}{m}} \tag{4}$$

$$v = \frac{1}{T} = \frac{\sqrt{\frac{kb^2}{2m} - gl}}{2\pi\sqrt{(l^2+s^2)\cos\alpha}} \tag{5}$$

Here, as can be understood from comparison between expressions (3), (4), and (5), if the central angle α, the frequency v, and the frequency v' are known values (in other words, in the case where the arithmetic unit 15 succeeds in specifying these values, α, v, and v' with the aid of the shake detector 14), the number of unknown values is three, namely, l, s, and k/m, and these unknown values can be analytically solved.

First, expressions (4) and (5) are expanded to the following expressions (6) and (7), respectively.

$$\frac{k}{m} = 2\pi^2 v'^2 \tag{6}$$

$$2\pi v\sqrt{(l^2+s^2)\cos\alpha} = \sqrt{\frac{kb^2}{2m} - gl}$$

$$4\pi^2 v^2(l^2+s^2)\cos\alpha = \frac{kb^2}{2m} - gl \tag{7}$$

Here, if expression (6) is substituted in expression (7), this gives the following expression (8).

$$4\pi^2 v^2(l^2+s^2)\cos\alpha = b^2\pi^2 v'^2 - gl$$

$$\therefore l^2 + s^2 = \frac{b^2\pi^2 v'^2 - gl}{4\pi^2 v^2 \cos\alpha} \tag{8}$$

Likewise, if expression (6) is substituted in expression (3), this gives the following expression (9).

$$\therefore s = \left(\frac{\pi^2 v'^2 b^2}{g} - l\right)\tan\alpha \tag{9}$$

In addition, here, if expression (9) is substituted in expression (8) to write a quadratic equation by l, this provides a rewrite as given in the following expression (10).

$$(1+\tan^2\alpha)l^2 + \left(\frac{g}{4\pi^2 v^2 \cos\alpha} - \frac{2\pi^2 v'^2 b^2}{g}\tan^2\alpha\right)l + \frac{\pi^4 v'^4 b^4}{g^2}\tan^2\alpha - \frac{b^2 v'^2}{4v^2 \cos\alpha} = 0 \tag{10}$$

Here, if the secondary coefficient, the primary coefficient, and the constant term of 1 are specified, this results in the finding of l, and if it is substituted in expression (9), this also results in the fining of s.

In this way, these expressions (8), (9), and (10) prove that it leads to the question of a simple simultaneous equation in which only l and s (the values each representative of the location of the center of gravity W, in the cross-section surface perpendicular to the front/rear direction of the container 11, of the container cargo vehicle) are unknown. In this simultaneous equation, internalization is made such that k (the elastic coefficient of the suspension 205) and m (the weight of the container cargo vehicle) are not input values. That is to say, k (the elastic coefficient of the suspension 205) and m (the weight of the container cargo vehicle) are removed, in the process of formulating the above-described simultaneous equation, from these expressions. And, this makes it possible to save thousands of man-hours taken for measuring the elastic coefficient k and the weight m and its significance is extremely great when contemplating the situation that containers 11 are daily transported by trailer trucks 50 composed of any combinations of an indefinite number of tractors 10 and an indefinite number of container chassis 12.

Next, with reference to FIGS. 1(a) and 5, a description will be made about a method of deriving the location of the center of gravity W, in the front/rear direction (travel direction), of the container cargo vehicle.

As has been described above, the location of the center of gravity W, in the cross-section surface perpendicular to the front/rear direction of the container 11, of the container cargo vehicle can be derived by solving the simultaneous equation of expressions (9) and (10) for l and s: however, the 3D center-of-gravity location of the container cargo vehicle still remains unspecified. That is, in addition to these values l and s, it is required that the center of gravity W in the front/rear direction (travel direction) of the container cargo vehicle be found.

The location of the center of gravity W in the front/rear direction of the container cargo vehicle can be derived as follows.

As shown in FIG. 5, in the trailer truck 50, the container 11 placed on the container chassis 12 is supported by a rear and a front cross beam 21 and 20 of the container chassis 12. These front and rear cross beams 20 and 21 extend in the horizontal direction (width direction) of the container 11, and are firmly secured to longitudinal beams (not shown) existing in the front/rear direction. As a result of this arrangement, the load of the container 11 is dispersed, through the rear and front cross beams 21 and 20 and the longitudinal beams, to the tractor 10 coupled to the front section of the container chassis 12 and the suspensions 205 in the rear section of the container chassis 12.

Now, in the trailer truck 50 in motion while carrying the container 11, in the center of action, in the front/rear direction, of external disturbances caused by irregularities of the road surface 204, the strengths (amplitude) of rolling resulting from the external disturbances differs, as shown in FIG. 1(a). For example, as shown in FIG. 1(a), if the center of action of the external disturbance leaves the location of the center of gravity, the load of the trailer truck 50 against the external disturbance diminishes and, as a result, the rolling amplitude increases. Conversely, if the center of action of the external disturbance approaches the location of the center of gravity, the great load of the trailer truck 50 functions as a resistive force and, as a result, the rolling amplitude diminishes. Therefore, since the location of the center of gravity W in the front/rear direction resides between the front cross beam 20 and the rear cross beam 21, the center of action of the external disturbance, where the phenomenon of rolling significantly appears in the direction in which the roiling amplitude increases, is the positions of the front and rear cross beams 20 and 21 of the container chassis 12 corresponding to the front and rear sections of the container 11, respectively.

Here, the front section of the container chassis 12 and the tractor 10 are coupled together by a disc-shaped coupling member called a coupler 13 and having a shorter length than the front cross beam 20 of the container chassis 12. The diameter of the coupler 13 is usually less than half the length of the front cross beam 20 of the container chassis. Therefore, the horizontal length of a support of the section that connects the tractor 10 to the container chassis 12 carrying the container 11 is not the length of the front cross beam 20 of the container chassis 12 but is the diameter $b_c$ of the coupler 13.

Additionally, here, the diameter $b_c$ of the coupler 13 to which the container chassis 12 is coupled is an essential particular for deriving the 3D center-of-gravity location; however, for the case of the lateral rollover limit velocity of the container cargo vehicle in a second embodiment of the invention, the state of single point coupling between the tractor 10 and the container chassis 12 (see a connection point E shown in FIG. 13) by the couple 13 has a great significance. That is to say, both the member that forms the diameter $b_c$ and the member that forms the connection point E are the coupler 13, but these members differs from each other in their technical significance. The technical significance of the connection point E will be described in detail.

If, in this condition, expression (5) is taken into consideration, the rolling frequency v depends upon the values l and s each representative of the location of the center of gravity W of the container cargo vehicle and the length b of the section supporting the container 11, provided that k/m is a constant value. As described above, the length b differs between at the front section and at the rear section of the container chassis 12 and, therefore, it is conceivable that the maximum peak amplitude (convex peak's vertex) resides at two locations where the rolling phenomenon significantly appears in the direction in which the amplitude of rolling increases.

That is to say, the maximum peak amplitude includes one that is originated from the coupler 13 as a coupling member for connection between the front section of the container chassis 12 and the tractor 10 and another that is originated from the rear cross beam 21 positioned in the rear section of the container chassis 12. And, from the consideration of expression (5), the frequency corresponding to the latter maximum peak amplitude is larger than that of the former one.

In addition, between these frequencies, there is a minimum peak amplitude (concave peak's valley) at which the rolling phenomenon is impeded from appearing in the direction in which the amplitude of roiling decreases. This minimum peak amplitude is a peak originated from the center of gravity W in the front/rear direction of the container cargo vehicle.

Next, based upon the above-described principle, the derivation of the location of center of gravity W in the front/rear direction of the container cargo vehicle is expressed in a formula.

The relationship between the rolling frequency v and the horizontal length h of the section that supports the container 11 is represented from expression (5) as follows.

$$v = \frac{\sqrt{\frac{kb^2}{2m} - gl}}{2\pi\sqrt{(l^2 + s^2)\cos\alpha}}$$

$$v^2 = \frac{\frac{kb^2}{2m} - gl}{4\pi^2(l^2 + s^2)\cos\alpha}$$

$$\frac{kb^2}{2m} = v^2 4\pi^2(l^2 + s^2)\cos\alpha + gl$$

$$b^2 = \frac{8m\pi^2(l^2 + s^2)\cos\alpha}{k}v^2 + \frac{2mgl}{k}$$

$$b = \sqrt{\frac{8m\pi^2(l^2 + s^2)\cos\alpha}{k}v^2 + \frac{2mgl}{k}}$$

Here, if the term other than rolling frequency v and the horizontal length b are combined, as a constant term, into C and $C_0$, this provides a simplified representation as given in the following expression (11).

$$\therefore b = \sqrt{Cv^2 + C_0} \quad (11)$$

Therefore, if both the rolling frequency v when external disturbance acts on the front section of the container 11 and the rolling frequency v when external disturbance acts on the rear section of the container 11, and the substantial horizontal length of the section which supports the container 11 at both the locations are obtained, it becomes possible to find C and $C_0$, and, therefore, expression (11) becomes an equation capable of deriving the horizontal length b for any rolling frequency v.

Here, if the combination of the horizontal length b and the rolling frequency v corresponding to the front section of the container 11 and the combination of the horizontal length b and the rolling frequency v corresponding to the rear section of the container 11 are denoted as $(b_1, v_1)$ and $(b_2, v_2)$, respectively, the following combinations are given.

$$\begin{cases} b_1 = \sqrt{Cv_1^2 + C_0} \\ b_2 = \sqrt{Cv_2^2 + C_0} \end{cases}$$

And, this simultaneous equation is solved to obtain the following expression (12).

$$\therefore b = \sqrt{\frac{b_1^2 - b_2^2}{v_1^2 - v_2^2}v^2 + \frac{b_2^2 v_1^2 - b_1^2 v_2^2}{v_1^2 - v_2^2}} \quad (12)$$

In this expression (12), $b_2$ is the substantial horizontal length of the member which supports the container 11 at the location of the rear section of the container 11, and is the value that is determined as a constant. On the other hand, $b_1$ is the substantial horizontal length of the member which supports the container 11 in the location of the front section of the container 11, and is the value that is geometrically determined as a constant from $b_c$ (the diameter of the coupler 13 of the tractor 10). $v_1$ is the frequency of rolling generated when external disturbance acts in a perpendicular direction from the road surface 204 in the front section of the container 11. $v_2$ is the frequency of rolling generated when external disturbance acts in a perpendicular direction from the road surface 204 in the rear section of the container 11.

Next, $b_g$ (the substantial horizontal length of the member which supports the container 11 in the location of the center of gravity W in the front/rear direction of the container cargo vehicle) is specified.

This length $b_g$ is found from expression (13) when the frequencies $(v_1, v_2, v_g)$ are all known (that is, when the arithmetic unit 15 succeeds in specifying, with the aid of the shake detector 14, the frequencies $(v_g, v_f, v_s)$). In addition, vg is the frequency of rolling when external disturbance acts in a perpendicular direction from the road surface 204 in the location of the center of gravity W.

$$b_g = \sqrt{\frac{b_1^2 - b_2^2}{v_1^2 - v_2^2}v_g^2 + \frac{b_2^2 v_1^2 - b_1^2 v_2^2}{v_1^2 - v_2^2}} \quad (13)$$

Here, as can be understood from FIG. 5, the geometrical relationship between $b_1$ (the substantial horizontal length of the member which supports the container 11 in the location of the front section of the container 11), $b_c$ (the diameter of the coupler 13 of the tractor 10), $b_g$ (the substantial horizontal length of the member which supports the container 11 in the location of the center of gravity W), $k_c$ (the length from the front section of the container 11 to the center of the coupler 13), $k_g$ (the length from the front section of the container 11 to the location of the center of gravity W), and p (the front/rear-directional length of the container 11) can be represented in the form of a linear ratio. Therefore, this relationship is formulated to obtain the following expression (14).

$$k_g = \frac{p - k_c}{b_2 - b_c}(b_g - b_c) + k_c \quad (14)$$

By substitution of bg (the substantial horizontal length of the member which supports the container 11 in the location of the center of gravity W in the front/rear direction of the container cargo vehicle) obtained by expression (13) in expression (14), $k_g$ (the length from the front section of the container 11 to the location of the center of gravity W) is derived.

Furthermore, the values l and s each representative of the location of the center of gravity W, in the cross-section surface perpendicular to the front/rear direction of the container 11, of the container cargo vehicle, and corresponding to the length $k_g$ can be derived by use of the length $b_g$ as b in expression (10), in conjunction with expression (9).

From the theory of dynamics discussed above, the center-of-gravity detection system 100 of the present embodiment is able to obtain all of the three numerical values l, s, and $k_g$ each representing the location of the center of gravity W, in three-dimensional space, of the container cargo vehicle.

Next, with reference to the drawings, a description will made about one example of the operation of detecting the 3D center-of-gravity location of the container cargo vehicle by means of the center-of-gravity detection system 100 of the present embodiment.

Figure 6:
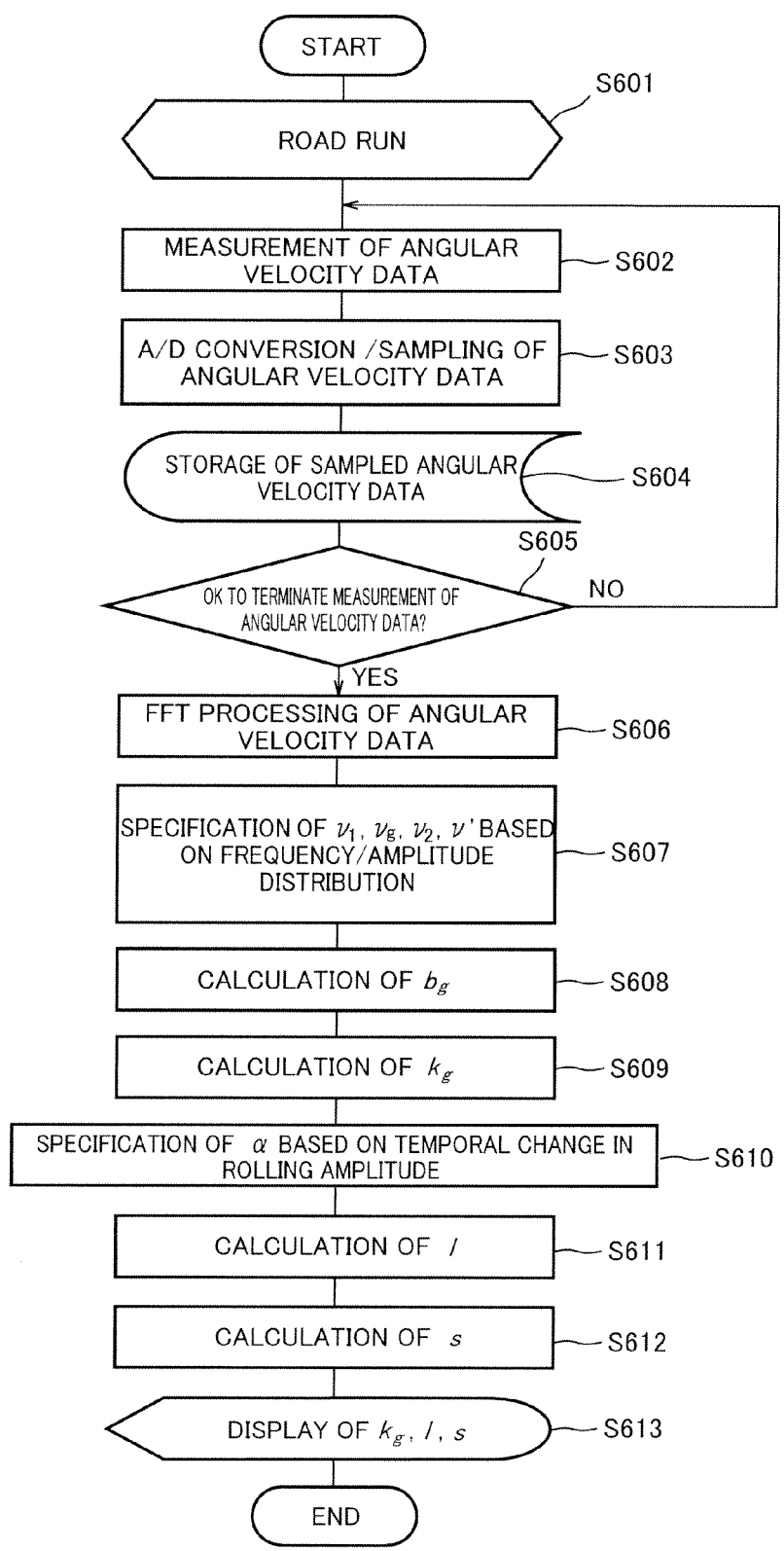
FIG. 6 is a flow chart showing a routine of detecting the 3D center-of-gravity location by means of the center-of-gravity detection system of the first embodiment.

FIG. 6 is a flow chart representing a routine of detecting the 3D center-of-gravity location by means of the center-of-gravity detection system of the present embodiment. Upon depression of the power supply switch of the operation setting/display part 15c of the arithmetic unit 15, a plurality of menus are displayed on the display screen (not shown) of the operation setting/display part 15c. And, by suitable manipulation of buttons of the operation setting/display part 15c, it becomes possible to start the operation of detecting the 3D center-of-gravity location during travel of the trailer truck 50. In addition, in executing this detection operation in the following way, instructions that the operator (for example, the driver of the tractor 10 or a fellow passenger) is required to make are displayed in the form of a message on the display screen of the operation setting/display part 15c. Upon selection of the operation of detecting the 3D center-of-gravity location, the arithmetic part 15a of the arithmetic unit 15 retrieves, from the storage part 15b, an arithmetic program for 3D center-of-gravity location detection and prestored suitable constants, and the arithmetic program executes the following processing while controlling the arithmetic part 15a, the storage part 15b, and the operation setting/display part 15c.

In addition, the constants include, for example, p (the front/rear-directional length of the container 11), $b_c$ (the diameter of the coupler 13 of the tractor 10), $k_c$ (the length from the front section of the container 11 to the center of the coupler 13), $b_2$ (the substantial horizontal length of the member which supports the container 11 in the location of the rear section of the container 11), g (the gravitational acceleration), and π (the circle ratio (pi)).

For the case of a 40-feet marine container according standard specifications, the constants p, $b_c$, $k_c$, and $b_2$ are often standard values and, therefore, it is preferred that these constants p, $b_c$, $k_c$, and $b_2$ be prestored in the storage part 15b to save the operations of confirming and inputting the constants.

In addition, it may be possible to employ such a control method that the operator inputs the constants p, $b_c$, $k_c$, and $b_2$ into the storage part 15b through the operation setting/display part 15c of the arithmetic unit 15 every time the operation of detecting the 3D center-of-gravity location is executed.

In the first place, as a preliminary operation for the detection of the 3D center-of-gravity location of the container cargo vehicle, the tractor 10 towing, along with the container chassis 12, the container 11 carrying the cargo is made to travel on the road surface 204 (step S601). There is no significant trouble to the degree of data accuracy even if the trailer truck 50 accidentally passes through a curve section of an intersection during measurement of the angular velocity data by means of the shake detector 14; however, it is preferred the trailer truck 50 be made to travel in a straight line to the flow of normal traffic in the light of properly estimating a (the central angle of rolling of the center of gravity W of the container cargo vehicle).

And, due to moderate irregularities of the road surface 204, random external disturbances are transmitted through the suspensions 205 to the vehicle body (the container 11) of the trailer truck 50, which allows the shake detector 14 to detect shakes both in the direction of the self-weight and in the direction of the width of the container cargo vehicle.

As an additional remark to the above, of the aforesaid prior art technologies, there is an example (for example, JP-A-2005-313879, JP-A-H05-124543 or JP-A-2001-97072) in which data during travel of the truck along a curved road section (for example, centrifugal force and lateral acceleration) are intentionally detected; however, such a technique may end up causing the truck during travel along a curve (during data acquisition) to undergo unstable travel motion (truck lateral rollover, at worst), and there is still a question as to whether or not its practical use is really possible.

When the operation of detecting the 3D center-of-gravity location is commenced by the manipulation of buttons of the operation setting/display part 15c by the operator (for example, the driver of the tractor 10 or a fellow passenger), data about the angular velocities of pitching corresponding to the vertical reciprocation motion of the center of gravity W and rolling (horizontal simple pendulum motion) of the center of gravity W are measured as analog signals by means of the angular velocity sensor 14a of the shake detector 14 (step S602). And, the analog angular velocity data are sampled, by the arithmetic unit 15 (the arithmetic part 15a), as digital signals through the A/D converter 14b of the shake detector 14, for every predetermined sampling period of time (for example, every 0.01 seconds) prestored in the storage part 15b (step S603), and the digital angular velocity data thus sampled are stored, together with time-series data, in the storage part 15b (step S604). In addition, an example of the detection of the angular velocity data by means of the angular velocity sensor 14a is described here; however, it can be assumed that, in the situation when the vehicle is travelling in a straight line, the state of rolling is sin θ=θ and, therefore, it may be possible to employ, in place of an angular velocity sensor, a velocity sensor to detect velocity data.

Next, the arithmetic part 15a makes a decision whether or not to terminate the measurement of angular velocity data by the angular velocity sensor 14a (step S605). If the arithmetic part 15a decides that the angular velocity data measurement may be terminated (in the case of "Yes" in step S605), then the detection routine moves to the subsequent processing steps (step S606 onward). On the other hand, if the arithmetic part 15a does not decide that the measurement of the angular velocity data may be terminated (in the case of "No" in step 6605), then the processing of the aforesaid steps S602-604 is continued.

The decision of whether or not the measurement may be terminated can be made based upon a predetermined length of measurement time that is derived from a required total number of samples prestored in the storage part 15b and the aforesaid sample time. For example, the results of a first verification experiment (to be hereinafter described) shows that if the number of samples, at which the statistical error of sampling becomes considerably diminished, is 4096 (since FFT is an analysis intended for the number of integer multipliers of 2, $2^{12}$ is shown here as an example number of samples) and, in addition, if the sample time is 0.01 seconds, then the minimum required measurement time is: 4096×0.01 S≅40 S. Therefore, in this case, the arithmetic part 15a makes a decision that the measurement of angular velocity data may be brought to a stop after an elapse of 40 seconds or more since the time when the angular velocity sensor 14a started measuring angular velocity data. In addition, if a usage form, in which the 3D center-of-gravity location of the container 11 is to be updated in real time during travel of the trailer truck 50, is assumed, preferably the time of measurement should be kept as short as possible, but if too short, this means a less number of samples, thereby resulting in increase in the statistical error. The results of the hereinafter described first verification experiment show that statistical error-reduced, stable data are obtained if the measurement of data is conducted for two minutes as a length of time serving as a guide.

Additionally, as a substitute for such a decision operation, the arithmetic part 15a may make a decision whether or not to terminate the measurement of angular velocity data based on the presence or absence of the manipulation of a measurement terminating button of the operation setting/display part 15c by the operator.

In addition, the measurement of angular velocity data conducted in such a short period of time serves as a basis for the elimination of these numerical values k and m in the formulation of the foregoing simultaneous equation, based on the precondition that k (the elastic coefficient of the suspension 205) and m (the weight of the container cargo vehicle) are invariable in the period of the angular velocity data measurement.

To sum up, if the time taken for angular velocity data measurement is long, this may cause the case where the precondition that the numerical values k and m are invariable in the period of the angular velocity data measurement may be no longer satisfied due to substantial changes in external disturbance such as the state of irregularity of the road surface and the condition of weather (for example, wind velocity).

When the measurement of angular velocity data by the angular velocity sensor 14a is completed, the arithmetic part 15a performs fast Fourier transform (FFT) on time-series angular velocity data stored in the storage part 15b, thereby to convert the angular velocity data into data of the amplitude with respect to the frequency (step S606).

Thus, from the distribution representing a correlation between the frequency of rolling and the amplitude of rolling (hereinafter, abbreviated as the "rolling frequency/amplitude distribution"), the frequencies $v_1$, $v_g$, $v_2$ are specified based upon the aforesaid theory of dynamics (step S607). Additionally, from the distribution representing a correlation between the frequency of pitching and the amplitude of pitching (hereinafter, abbreviated as the "pitching frequency/amplitude distribution"), the frequency v' is specified based upon the aforesaid theory of dynamics (step S607).

That is to say, it suffices if the lowest two of the values of the frequency of rolling (the first two values in ascending order) corresponding to rolling's maximum peak amplitudes (vertexes) are selected and, in addition, a frequency value corresponding to a minimum peak amplitude (valley) located between the maximum peak amplitudes (in the present embodiment, one that is located almost midway therebetween) is selected. By doing this, the three frequency values thus selected correspond respectively to the frequency $v_1$, to the frequency $v_g$, and to the frequency $v_2$ in ascending order of value. On the other hand, it suffices if a frequency value corresponding to the maximum amplitude of pitching is selected as the frequency v'.

Since many proposals have already been made for such a mathematical frequency extraction method, a detailed description thereof is omitted here. However, it is preferable to employ an extraction method capable of frequency extraction in a short period of time when a usage form, in which the 3D center-of-gravity location of the container cargo vehicle is updated in real time during travel of the trailer truck 50, is assumed.

Next, the arithmetic part 15a retrieves the constants $b_c$ and $b_2$ prestored in the storage part 15b, and uses the frequencies $v_1$, $v_g$, $v_2$ obtained in step S607 to perform arithmetic to calculate the substantial horizontal length $b_g$ of the member which supports the container 11 in the location of the center of gravity W from expression (13) (step S608).

$$b_g = \sqrt{\frac{b_1^2 - b_2^2}{v_1^2 - v_2^2} v_g^2 + \frac{b_2^2 v_1^2 - b_1^2 v_2^2}{v_1^2 - v_2^2}} \quad (13)$$

In expression (13), $b_2$ is the substantial horizontal length of the member which supports the container 11 in the location of the rear section of the container 11. $b_2$ is the value that is determined as a constant. On the other hand, $b_1$ is the substantial horizontal length of the member which supports the container 11 in the location of the front section of the container 11. $b_1$ is the value that is geometrically determined based on a constant from $b_c$ (the diameter of the coupler 13 of the tractor 10). $v_1$ is the frequency of rolling generated when external disturbance acts in a perpendicular direction from the road surface 204 in the front section of the container 11. $v_2$ is the frequency of rolling generated when external disturbance acts in a perpendicular direction from the road surface 204 in the rear section of the container 11. In addition, $v_g$ is the frequency of rolling when external disturbance acts in a perpendicular direction from the road surface 204 in the location of the center of gravity W.

Subsequently, the arithmetic part 15a retrieves the constants p, $k_c$, $b_c$ prestored in the storage part 15b, and uses the length $b_g$ obtained in step S608 to perform arithmetic to calculate the length, $k_g$, from the front section of the container 11 to the location of the center of gravity W from expression (14) (step S609).

$$k_g = \frac{p - k_c}{b_2 - b_c}(b_g - b_c) + k_c \quad (14)$$

In expression (14), p is the front/rear-directional length of the container 11. $k_c$ is the length from the front section of the container 11 to the center of the coupler 13. $b_c$ is the diameter of the coupler 13 of the tractor 10.

Next, the arithmetic part 15a retrieves time-series angular velocity data stored in the storage part 15b. In this way, the central angle α of rolling of the center of gravity W of the container cargo vehicle corresponding to the time average value of temporal change in the amplitude of rolling is specified from the distribution representing the change with time in the amplitude (angle) of rolling (hereinafter abbreviated as the "temporal change in the amplitude of rolling") (step S610).

And, the arithmetic part 15a retrieves the constants g and π prestored in the storage part 15b and uses the frequencies $v_g$ and v' obtained in step S607, the central angle α obtained in step S610, and the length $b_g$ obtained in step S608 to perform arithmetic to calculate, from expression (10') corresponding to expression (10) (that is, v in expression (10) is denoted as $v_g$ in expression (10') and b in expression (10) is denoted as $b_g$ in expression (10')), the vertical length/from the axle to the center of gravity W of the container cargo vehicle in the perpendicular cross-section surface at the position of $k_g$ (step S611).

$$(1 + \tan^2\alpha)l^2 + \left(\frac{g}{4\pi^2 v_g^2 \cos\alpha} - \frac{2\pi^2 v'^2 b_g^2}{g}\tan^2\alpha\right)l + \frac{\pi^4 v'^4 b_g^4}{g^2}\tan^2\alpha - \frac{b_g^2 v'^2}{4v_g^2 \cos\alpha} = 0 \quad (10')$$

In expression (10'), g is the gravitational acceleration. π is the circle ration (pi). α is the central angle of rolling of the center of gravity W of the container cargo vehicle. v' is the pitching frequency. $v_g$ is the frequency of rolling when external disturbance acts in a perpendicular direction from the road surface 204 in the location of the center of gravity W. $b_g$ is the substantial horizontal length of the member which supports the container 11.

Next, the arithmetic part 15a retrieves the constants g and π prestored in the storage part 15b and uses the frequency v' obtained in step S607, the central angle α obtained in step S610, the length $b_g$ obtained in step S608, and the length l obtained in step S611 to perform arithmetic to calculate, from expression (9') corresponding to expression (9) (that is, b in expression (9) is denoted as $b_g$ in expression (9')), the horizontal length s from the center of the axle to the center of gravity W of the container cargo vehicle in the perpendicular cross-section surface at the position of $k_g$ (step S612).

$$s = \left(\frac{\pi^2 v'^2 b_g^2}{g} - l\right)\tan\alpha \qquad (9')$$

In expression (9'), g is the gravitational acceleration. π is the circle ratio (pi). α is the central angle of rolling of the center of gravity W of the container cargo vehicle. v' is the pitching frequency. $b_g$ is the substantial horizontal length of the member which supports the container 11. l is the vertical length from the axle to the center of gravity W of the container cargo vehicle in the perpendicular cross-section at the position of $k_g$.

Thereafter, the length $k_g$ obtained in step S609, the length l obtained in step S611, and the length s obtained in step S612 are displayed on the display screen of the operation setting/display part 15c by the arithmetic part 15a (step S613), and a series of 3D center-of-gravity location detection routines is brought into completion.

As described above, the center-of-gravity detection system 100 of the present embodiment includes: the trailer truck 50 having the container 11 capable of carrying cargo, the container chassis 12 on which the container 11 is placed, and the tractor 10 for towing the container chassis 12; the biaxial angular velocity sensor 14a for the detection of shakes in the self-weight and width directions of the container cargo vehicle during straight travel of the trailer truck 50; and the arithmetic unit 15. The arithmetic unit 15 is configured so as to derive, based upon the physical quantities that correlate with the shakes (to be exact, the frequency of rolling and the central angle of rolling), the center of gravity, in three-dimensional space, of the container cargo vehicle.

The 3D center-of-gravity location of the container cargo vehicle is valuable data that directly reflects the degree of biasing of the load of container cargo whose condition of loading is unknown and, therefore, this makes it possible to contribute to preventing the cargo from pile collapse/falling when the container door is opened, and the container transport vehicle from unstable travel motion on the curved road section.

Especially, in accordance with the center-of-gravity detection system 100, the 3D center-of-gravity location of the container cargo vehicle is derived based upon the logical theory of dynamics, without having to introduce data that lack theoretical ground (e.g., correction coefficient or the like) and, as a result, the reliability thereof is extremely high. And, this is confirmed by the results of the first verification experiment conducted by using an actual car (to be hereinafter described).

Furthermore, the center-of-gravity detection system 100 of the present embodiment provides various advantageous effects as described below.

Neither the elastic coefficient k of the suspension 205 nor the weight m of the container cargo vehicle has to be taken into consideration when performing arithmetic to calculate the 3D center-of-gravity location of the container cargo vehicle by means of the center-of-gravity detection system 100. This therefore makes it possible to not only save thousands of man-hours taken to measure the elastic coefficient k of the suspension 205 and the weight in of the container cargo vehicle, but also to facilitate the universal application of the present technology to the trailer truck 50 of any type (that is, any combinations of an indefinite number of tractors 10, an indefinite number of container chassis 12, and an indefinite number of containers 11), regardless of the uncertain factors (e.g., the trailer truck's 50 manufacturer, model year, degree of aging et cetera).

In addition, if the trailer truck 50 is made to travel randomly or preferably forthright to the flow of general traffic, this enables the center-of-gravity detection system 100 to perform arithmetic to calculate the 3D center-of-gravity location of the container cargo vehicle. Therefore, the work of obtaining data for arithmetic calculation can be conducted easily. This is preferable because, unlike the aforesaid conventional technologies (for example, JP-A-2005-313879, JP-A-H05-124543 or JP-A-2001-97072) there is no need to obtain data at the time of travel along the curved road section.

In addition, it suffices if only one biaxial angular velocity sensor 14a is installed by simple means (such as adhesive joint or bolt fastening (not shown)) in a suitable place in the tractor 10 for arithmetic calculation of the 3D center-of-gravity location of the container cargo vehicle by means of the center-of-gravity detection system 100. Stated another way, this is preferable because there is no need to take any measures against great numbers of containers 11 and container chassis 12 that are handled in the container transport operation.

Example 1

With a view to backing up the validity of the method of deriving the 3D center-of-gravity location of the container cargo vehicle by means of the center-of-gravity detection system 100 of the first embodiment, a first verification experiment (center-of-gravity measurement) by use of an actual vehicle was conducted on a public road in Port Island at Port of Kobe on Apr. 12, 2006. In addition, the present verification experiment was carried out such that, in order that the present technology may not become public knowledge, the theoretical expressions of the present technology were stored as a program in a "black box" manner in the internal memory of a personal computer.

The procedure of the present verification experiment is as follows. In the first place, a standard 40-feet container was loaded with dummy cargo for experimental use of about 9.5 tons (about $9.5 \times 10^3$ kg). In regard to the condition of loading of the dummy cargo, the length $k_g$ from the container front section to the location of the center of gravity, the vertical length l from the axle to the center of gravity of the container cargo vehicle in the perpendicular cross-section surface at the position of $k_g$, and the horizontal length s from the center of the axle to the center of gravity of the container cargo vehicle in the perpendicular cross-section surface at the position of $k_g$ are adjusted as follows.

$k_g$=6.10 m
l=1.91 m
s=0 m

As one means for determining the degree of accuracy of the arithmetic calculation of the 3D center-of-gravity location by the center-of-gravity detection system 100 and its theoretical validity, here s=0. That is to say, almost all of the general roads slightly incline from the center to the end thereof. Therefore, even if the dummy cargo is placed in the location of the horizontal center of the container, such a road inclination should cause the location of the center of gravity of the container cargo vehicle during travel on the general road to deviate slightly from the horizontal center of the container. Therefore, the detection of such a slight inclination in the present verification experiment is an indirect proof that that the center-of-gravity detection system 100 has excellent accuracy for the arithmetic calculation of the 3D center-of-gravity location.

In addition, although not described here in detail, experiments were repeatedly carried out while making changes in the condition of loading of the dummy cargo, and even when the location of the center of gravity of the dummy cargo was deviated horizontally (that is, when s≠0), it was confirmed that the 3D center-of-gravity location was still detectable with high reliability.

Next, the dummy cargo is loaded, together with the container, on the container chassis and the container chassis is towed by a tractor. In Port Island at Port of Kobe, the tractor traveled to the flow of traffic for a couple of minutes on a straight course of a general road among other container transport vehicle. And, during this travel, angular-velocity digital signals output from the angular velocity sensor disposed in the tractor were sampled by the personal computer, and the sampled digital signals were sequentially stored, together with time-series data, in the internal memory of the personal computer. Such sampling was performed at intervals of 0.01 seconds.

Next, the rolling frequency/amplitude distribution, the pitching frequency/amplitude distribution, and the temporal change in the rolling amplitude are displayed on the computer screen by means of angular velocity digital signals after fast Fourier transform (FFT) performed by the personal computer.

Figure 7:
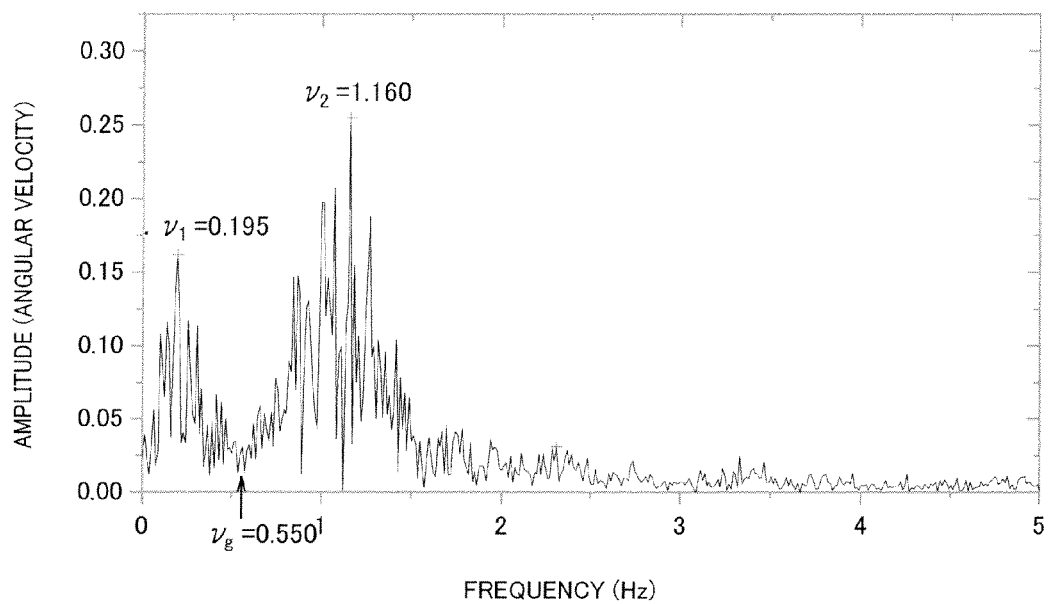
FIG. 7 is a diagram graphically showing one example of the rolling frequency/amplitude distribution wherein the horizontal axis represents the frequency (Hz) and the vertical axis represents the amplitude (angular velocity).
Figure 8:
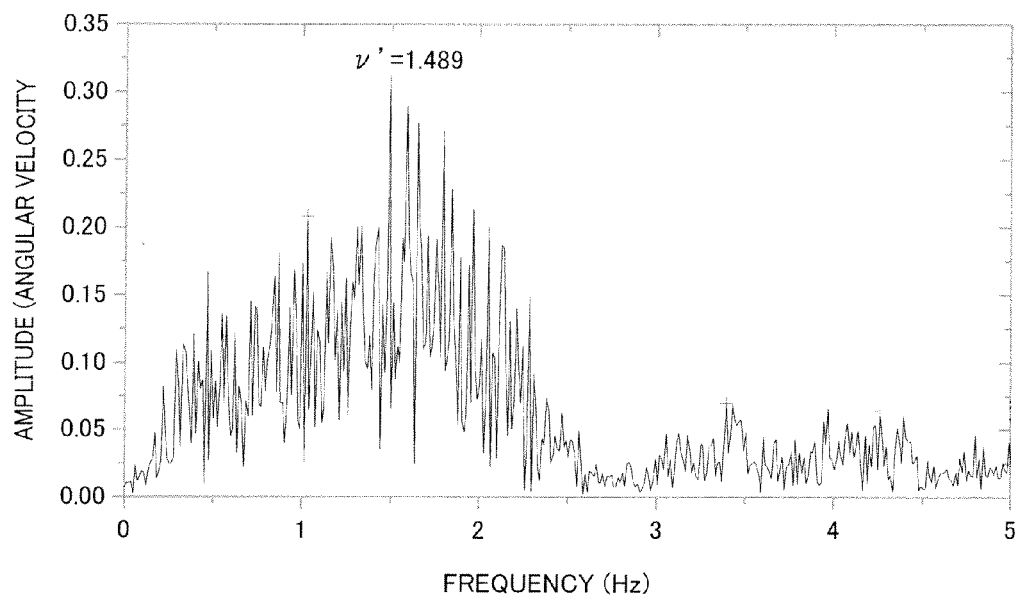
FIG. 8 is a diagram graphically showing one example of the pitching frequency/amplitude distribution wherein the horizontal axis represents the frequency (Hz) and the vertical axis represents the amplitude (angular velocity).
Figure 9:
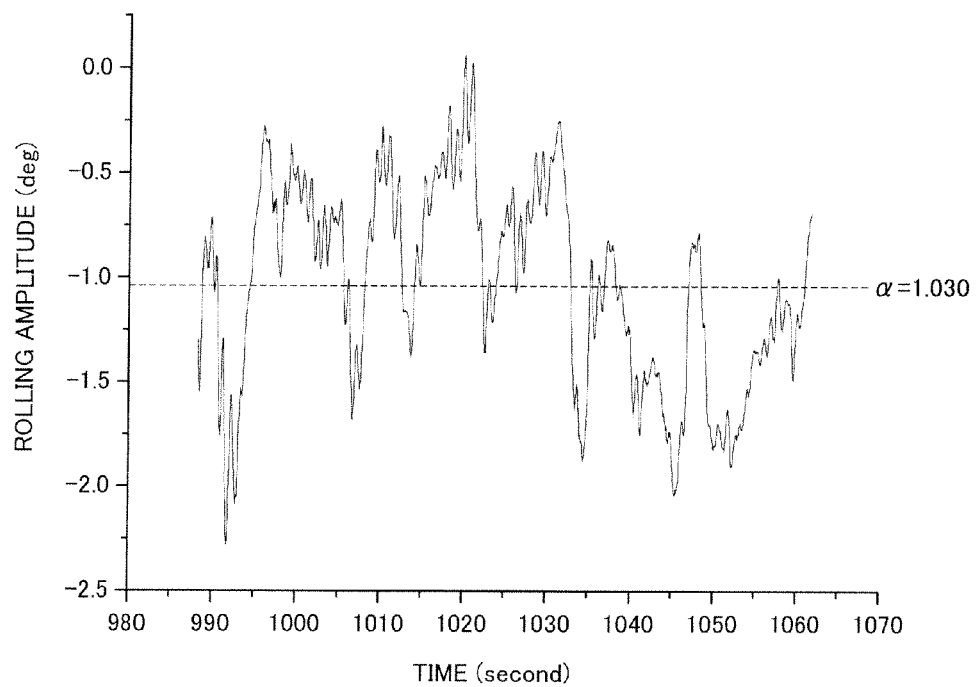
FIG. 9 is a diagram graphically showing one example of the temporal change in the rolling amplitude wherein the horizontal axis represents the time (second) and the vertical axis represents the rolling angle.

Referring to FIG. 7, there is shown a diagram representing one example of the rolling frequency/amplitude distribution wherein the horizontal axis represents the frequency (Hz) and the vertical axis represents the amplitude (angular velocity). FIG. 8 is a diagram showing one example of the pitching frequency/amplitude distribution wherein the horizontal axis represents the frequency (Hz) and the vertical axis represents the amplitude (angular velocity). FIG. 9 is a diagram showing one example of the temporal change in the rolling amplitude wherein the horizontal axis represents the time (second) and the vertical axis represents the rolling amplitude.

As shown in FIGS. 7 and 8, the personal computer uses a suitable mathematical extraction method to extract, as frequencies corresponding to the peak amplitudes, $v_1$ (the frequency of rolling generated when external disturbance acts in the perpendicular direction from the road surface in the front section of the container), $v_2$ (the frequency of rolling generated when external disturbance acts in the perpendicular direction from the road surface in the rear section of the container), $v_g$ (the frequency of rolling generated when external disturbance acts in the perpendicular direction from the road surface in the location of the center of gravity), and v' (the frequency corresponding to the maximum amplitude of pitching), as shown below. Additionally, as shown in FIG. 9, the personal computer computes α (the central angle of rolling of the center of gravity), as shown below.

$v_1$=0.195 Hz
$v_g$=0.550 Hz
$v_2$=1.160 Hz
v'=1.489 Hz
α=1.030 deg

Subsequently, the personal computer uses the constants inherent to the container, the tractor, and the container chassis, thereby to perform arithmetic to estimate, from the theoretical equations stored in the internal memory, $k_g$ (the length from the container front section to the location of the center of gravity), l (the vertical length from the axle to the center-of-gravity of the container cargo vehicle in the perpendicular cross-section surface at the position of $k_g$), and s (the horizontal length from the center of the axle to the center-of-gravity of the container cargo vehicle in the perpendicular cross-section surface at the position of $k_g$). The results of the arithmetic estimation are arranged in the following Table 1 for comparison with values obtained by actual measurement of the dummy cargo.

In addition, the foregoing constants include p (the front/rear-directional length of the container), $b_c$ (the diameter of the coupler of the tractor), $k_c$ (the length from the front section of the container to the center of the coupler), and $b_2$ (the substantial horizontal length of the member which supports the container in the location of the rear section of the container). The following are concrete numeric values for the constants.

p=12.192 m
$b_c$=0.915 m
$b_2$=2.438 m
$k_c$=0.076 m

TABLE 1

COMPARISON BETWEEN MEASURED VALUES AND ESTIMATED ARITHMETIC VALUES OF PRESENT EMBODIMENT

| VALUES REPRESENTING 3D CENTER-OF-GRAVITY | [l] | [s] | [$k_g$] |
|---|---|---|---|
| MEASURED VALUES | 1.91 m | 0 m | 6.10 m |
| ESTIMATED ARITHMETIC VALUES OF PRESENT EMBODIMENT | 1.90 m | 0.07 m | 6.17 m |

As can be understood by comparison between the estimated arithmetic values and the actual measurement values as shown in Table 1, the estimated arithmetic values of the present example almost perfectly agree with the actual measurement values within the range of the measurement error of their corresponding actual measurement values. Now, therefore, the validity of the method of deriving the 3D center-of-gravity location of the container cargo vehicle by means of the center-of-gravity detection system 100 of the first embodiment is backed up by the present verification experiment.

The measurement error of the actual measurement values includes, for example, read errors occurring when measuring the dimensions of the dummy cargo and the location of loading in the container with a measuring tool. If so, it is conceivable that the estimated arithmetic values of the present example obtained based upon the exact theory of dynamics are less subjected to the possibility of being mixed with errors rather than the actual measurement values, and, therefore it is assumed that the estimated arithmetic values seem more truly representative of the center-of-gravity location when compared to the actual measurement values.

In addition, as one reason for why s (the horizontal length from the center of the axle to the center of gravity of the container cargo vehicle) is calculated to be at 7 cm, the aforesaid slight inclination of the general road can be supposed. This indirectly proves that the center-of-gravity detection system 100 has a high degree of arithmetic accuracy and, therefore, even if there is a road surface inclination, it is expected that the present technology can be applicable as it is without having to make any correction.

Second Embodiment

Figure 10:
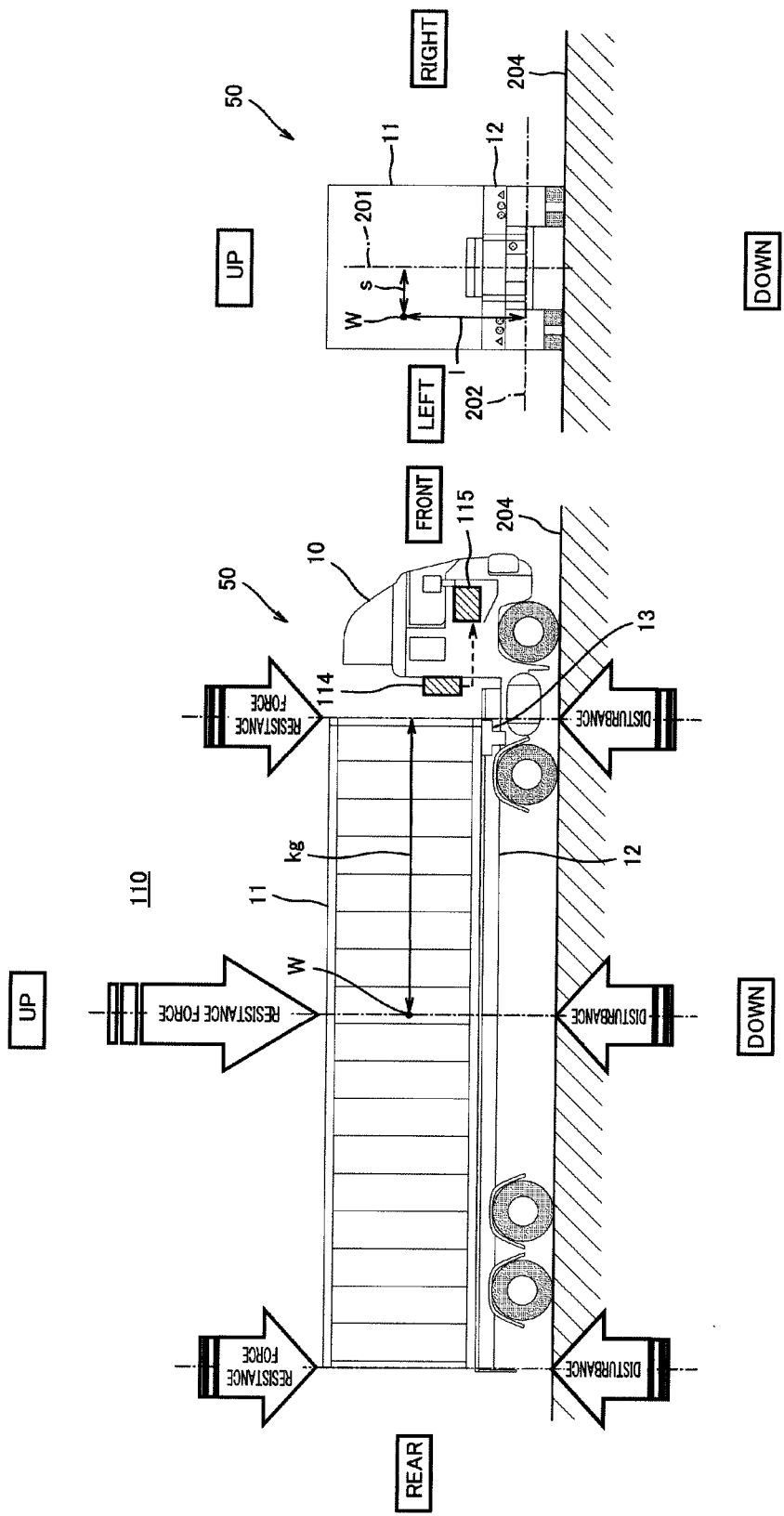
FIG. 10(a) and (b) is an outline illustration showing an example of the configuration of a lateral rollover limit velocity estimation system according to a second embodiment of the invention.

FIG. 10 is an outline illustration showing an example of the configuration of a lateral rollover limit velocity estimation system according to a second embodiment of the invention. FIG. 10(*a*) is a view of the estimation system as viewed from the width direction (sideways) of the container cargo vehicle. FIG. 10(*b*) is a view of the estimation system as viewed from the rear side of the container cargo vehicle.

Also note that in the drawings, for the sake of convenience of the following description, the direction in which the self-weight of the container cargo vehicle is applied is referred to as the "vertical direction", the width direction of the container cargo vehicle is referred to as the "horizontal direction", and the travel direction of the container cargo vehicle is referred to as the "front/rear direction".

In addition, with respect to the lateral rollover limit velocity estimation system 110 according to the present embodiment, components corresponding to those of the center-of-gravity detection system 100 of the first embodiment are given the same reference numerals. Accordingly, the description that overlaps with the contents of the center-of-gravity detection system 100 described in the first embodiment is omitted for convenience.

Referring to FIG. 10, the lateral rollover limit velocity estimation system 110 is provided with a trailer truck 50, a data detection part 114, and an arithmetic unit 115.

Figure 11:
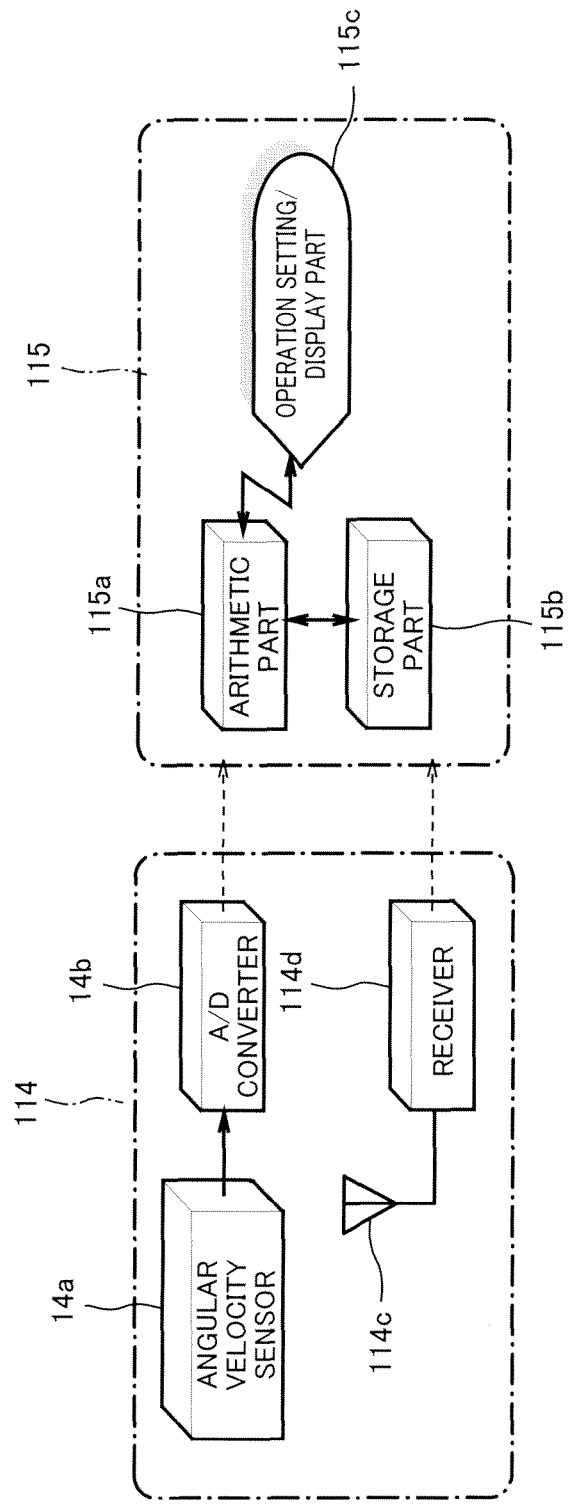
FIG. 11 is a block diagram showing one example of the internal configurations of a data detection part and an arithmetic unit in the lateral rollover limit velocity estimation system of the second embodiment.

FIG. 11 is a block diagram showing one example of the internal configurations of the data detection part and the arithmetic unit in the lateral rollover limit velocity estimation system according to the present embodiment.

The data detection part 114 is firmly secured in the middle, relative to the horizontal direction, of the trailer truck 50 in the location that causes no impedance to the transport work on the side of the tractor 10 (for example, in the vicinity of the coupler 13 shown in FIG. 10). The arithmetic unit 115 is disposed in place within the driver's cabin of the tractor 10. And, the both are connected together such that data is transmittable therebetween by wire communication, wireless communication or the like via suitable data input/output ports (not shown).

The data detection part 114 contains therein the same devices as the components of the shake detector 14 described in the first embodiment. That is, the data detection part 114 includes, as shown in FIG. 11, a biaxial (two-dimensional) angular velocity sensor 14*a* having angular velocity sensitive axes so aligned as to sense shakes in the vertical and width directions of the container cargo vehicle of the trailer truck 50 during travel, and an A/D (analog/digital) converter 14*b* for the conversion of analog signal output from the angular velocity sensor 14*a* into digital signal.

In addition, the data detection part 114 also includes a receiver 114*d* for receiving various traffic radio intelligence from a local ITS (Intelligent Transport System (advanced transport system)) through an antenna 114*c* and feeding the traffic information to the arithmetic unit 115. The traffic radio intelligence in the present embodiment includes information about the road surface 204 on which the trailer truck 50 is scheduled to travel (for example, radio intelligence about the curvature radius of a curved road section 204*c*).

As shown in FIG. 11, the arithmetic unit 115 has an arithmetic part 115*a* which is comprised of a microprocessor or the like, a storage part 115*b* which is comprised of ROM (Read Only Memory), RAM (Random Access Memory) or the like, and an operation setting/display part 115*c*. As a form of the arithmetic unit 115, there is an information mobile terminal such as a personal computer of the notebook type.

The storage part 115*b* stores, in addition to the arithmetic program for properly deriving the 3D center-of-gravity location of the container cargo vehicle and the various input constants required for that arithmetic described in the first embodiment, another arithmetic program for properly deriving the lateral rollover limit velocity of the container cargo vehicle and various input constants (to be hereinafter described) required for that arithmetic.

Similarly to the contents described in the first embodiment, the arithmetic part 115*a* operates according to the program, prestored in the storage part 115*b*, for use in sensing the 3D center-of-gravity location, and is able to derive, based upon the digital signal output from the angular velocity sensor 14*a* (the A/D converter 14*b*), the 3D center-of-gravity location of the container cargo vehicle; however, its detailed description is omitted here.

In addition, as will be hereinafter described, the arithmetic part 115*a* operates according to the arithmetic program, prestored in the storage part 115*b*, for use in predicting the lateral rollover limit velocity, and is able to derive, for example, by means of the aforesaid 3D center-of-gravity location, the lateral rollover limit velocity of the container cargo vehicle in response to the curvature radius of the curved road section 204*c* along which the container cargo vehicle travels. Furthermore, the arithmetic part 115*a* is able to sequentially obtain, from the receiver 114*d*, radio intelligence about the curvature radius of the curve road section 204*c* along which the trailer truck 50 is scheduled to travel.

The operation setting/display part 115*c* includes a console part (for example, a keyboard (not shown)) on which setting buttons for the aforesaid input constants are arrayed, and an information notifying device (for example, a liquid crystal panel display, a loudspeaker et cetera (not shown)) that provides information either in displayed or audible manner so that the output data about the lateral rollover limit velocity of the container cargo vehicle output from the arithmetic part 115*a* can be recognized by the operator. That is, the arithmetic part 115*a* is configured such that the aforesaid lateral rollover limit velocity is pre-notified to the operator (the driver or a fellow passenger) with the aid of the operation setting/display part 115*c*.

Next, with making reference to the drawings, a detailed description will be made about a method of deriving the lateral rollover limit velocity of the container cargo vehicle.

Figure 12:
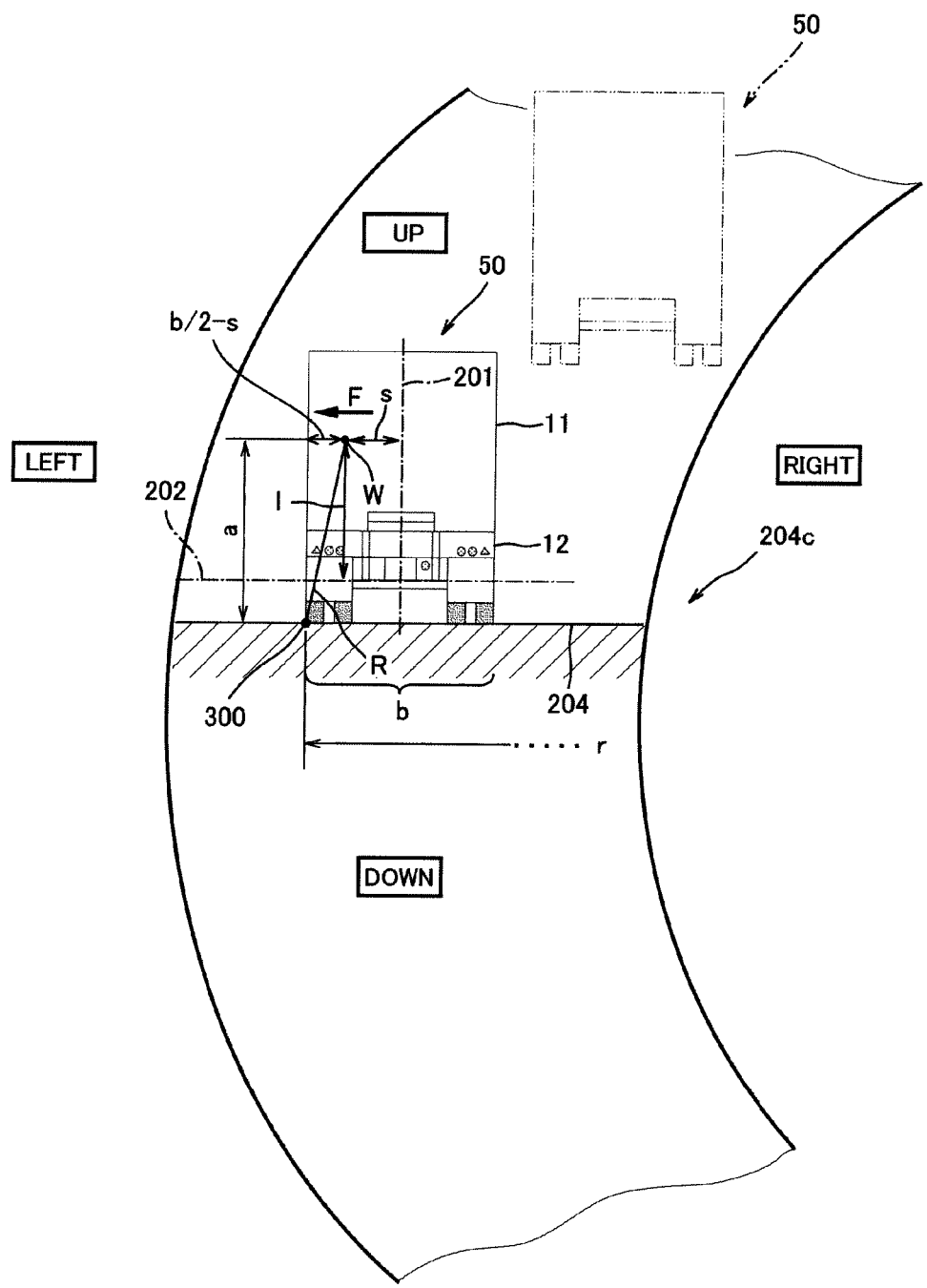
FIG. 12 is a schematic illustration for the purpose of explaining a method of deriving the lateral rollover limit velocity of a container cargo vehicle by means of the lateral rollover limit velocity estimation system of the second embodiment.

Each of FIGS. 12 and 13 is a schematic illustration for the purpose of explaining a method of deriving the lateral rollover limit velocity of the container cargo vehicle by means of the lateral rollover limit velocity estimation system of the present embodiment. FIG. 12 is a view of the trailer truck (container cargo vehicle) as viewed from the rear thereof, when the trailer truck makes a right-hand turn along the curved road section. That is, the wheel on the left-hand side of the trailer truck 50 corresponds to a turning outer wheel while the wheel on the right-hand side of the trailer truck 50 corresponds to a turning inner wheel.

Figure 13A:
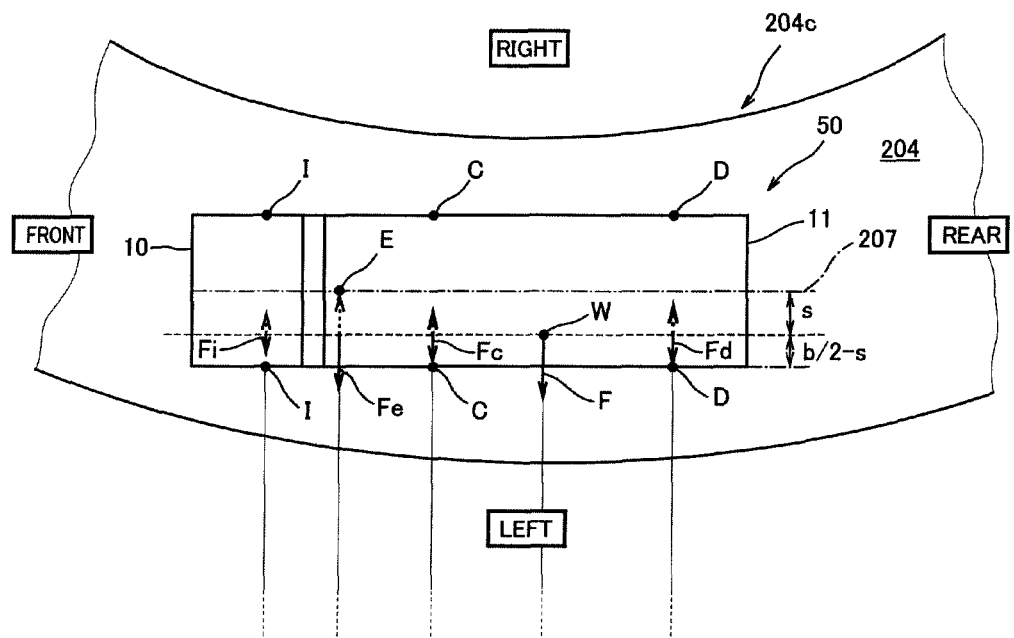
FIG. 13(a) and (b) is a schematic illustration for the purpose of explaining a method of deriving the lateral rollover limit velocity of a container cargo vehicle by means of the lateral rollover limit velocity estimation system of the second embodiment.
Figure 13B:
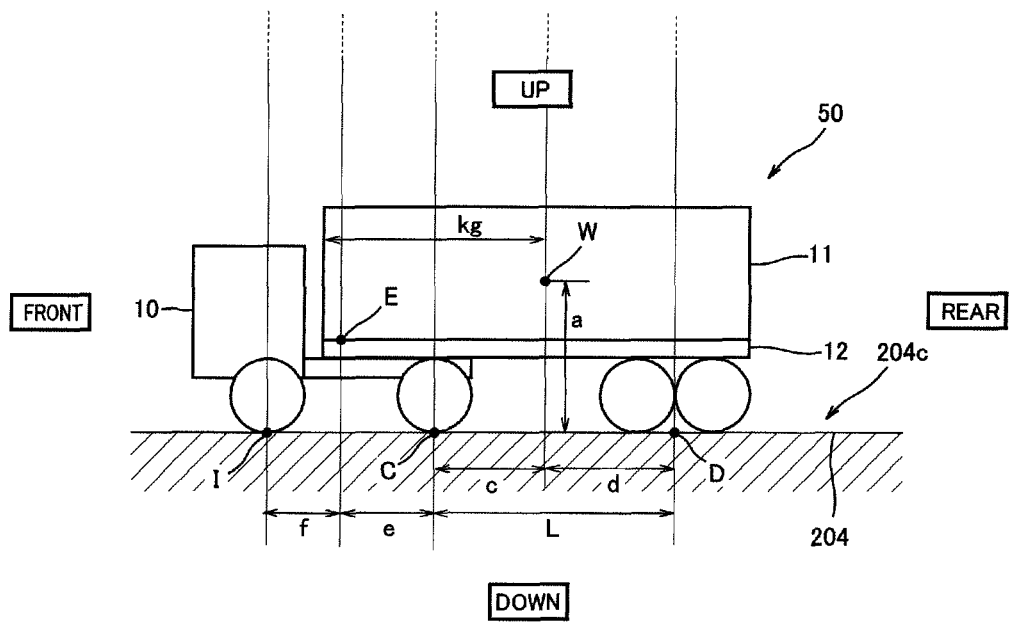

In addition, FIG. 13(a) is a view of the trailer truck as viewed from the vertical direction in which the self-weight of the trailer truck is applied, when the trailer truck makes a right-hand turn along the curved road section. FIG. 13(b) is a view as viewed from the horizontal direction corresponding to the width direction of the trailer truck.

In FIGS. 12 and 13, with respect to the configuration of the lateral rollover limit velocity estimation system 110, it is shown in a simplified manner or omitted for the sake of facilitating the understanding of the method of deriving the lateral rollover limit velocity.

Referring first to FIG. 12, the conditions for velocity in the event that the container cargo vehicle inclines (or undergoes lateral rollover at worst) in the cross-section surface perpendicular to the front/rear direction (travel direction) of the container cargo vehicle will be explained.

If, when the trailer truck 50 takes a curve along the curved road section 204c, the force F (centrifugal force F) applied sideways to the center of gravity W of the container cargo vehicle exceeds a certain value in the connection with the gravity force of the container cargo vehicle, it is then conceivable that the trailer truck 50 inclines, centered on an outer edge 300 relative to the width direction of the turning outer wheel of the trailer truck 50, along the circumference of a circle having a radius of R (the distance from the outer edge 300 to the center of gravity W).

From the moment balance between the centrifugal force F applied to the container cargo vehicle and the gravity force of the container cargo vehicle, the following inequality (1) for the case where the trailer truck 50 starts making circular motion or rotating (the radius of which is the distance R) centered on the aforesaid outer edge 300, is obtained.

$$Fa - mg\left(\frac{b}{2} - s\right) > 0 \quad (1)$$

$$\therefore \frac{mv^2}{r}a - mg\left(\frac{b}{2} - s\right) > 0$$

In inequality (1), m is the weight of the container cargo vehicle and g is the gravitational acceleration. In addition, b is the width dimension of the container cargo vehicle, and is the value equivalent to the length of the section which supports the load of the container 11 as described in the first embodiment. The width dimension b is a characteristic value of the container cargo vehicle (the characteristic numeric value specified per container cargo vehicle; same as below).

In addition, V is the travel velocity of the trailer truck 50 (container cargo vehicle), r is the curvature radius of the curved road section 204c, a is the height from the road surface 204 of the curved road section 204c to the center of gravity W, and s is the horizontal length from the vertical central line 201 to the center of gravity W of the container cargo vehicle.

In accordance with the aforesaid inequality (1), the velocity at which the container cargo vehicle is brought into rotation centered on the outer edge 300 of the turning outer wheel of the container cargo vehicle can be found in the connection with the curvature radius r of the curved road section 204c, by means of the center-of-gravity location of the container cargo vehicle relative to the cross-section surface perpendicular to the travel direction of the container cargo vehicle.

If both l (the vertical length from the axle position line 202 to the center of gravity W of the container cargo vehicle) and s (the horizontal length from the vertical central line 201 to the center of gravity W of the container cargo vehicle) is already known based upon the method of deriving the 3D center-of-gravity location of the container cargo vehicle described in the first embodiment, it is then possible to geometrically easily derive, based upon the characteristic values of the container cargo vehicle (e.g., wheel width, axle height et cetera), a (the height from the road surface 204 to the center of gravity W corresponding to the perpendicular component of the distance R).

Next, with reference to FIG. 13, a description will be made about the conditions of velocity in which the container cargo vehicle is brought into rotation in the cross-section surface perpendicular to the direction of the self-weight of the container cargo vehicle (hereinafter, referred to as "horizontal plane" for the sake of convenience).

If, when the trailer truck 50 makes a turn along the curved road section 204c, the centrifugal force F is applied evenly to the trailer truck 50 along the horizontal central line 207 of the trailer truck 50, the trailer truck 50 only skids within the horizontal plane of the curved road section 204c even when the road surface 204 of the cured road section 204c is in a slippery state. It is conceivable that the consequence in this case finally results in the problem of course-out of the trailer truck 50 from the curved road section 204c.

However, if the centrifugal force F that is applied, along the horizontal central line 207 of the trailer truck 50, to the trailer truck 50 becomes out of balance due to any factor (for example, the difference in braking effectiveness or the difference in state between the rear and front tires), the pattern of travel motion of the trailer truck 50 in horizontal plane becomes complicated.

As the result of our dedicated studies, the inventor of the present application has found, in addition to the induction that the tractor 10 and the container cargo vehicle (container chassis 12) form a bent (jackknife), the following: in the event of such a travel motion, there is the case where rotational motion in horizontal plane acts simultaneously with and independently of the aforesaid rotational motion of the container cargo vehicle in the cross-section surface perpendicular to the travel direction of the container cargo vehicle and each of these motion forces accidentally momentarily coincides with the other in the direction that causes the container cargo vehicle to tilt.

The formulation of such rotational motion in horizontal plane will be described step by step with reference to FIG. 13.

In the first place, the meanings of respective sings set forth in FIG. 13 will be described.

In FIG. 13, W is the center of gravity of the container cargo vehicle. In addition, the upper case letter I is the point of contact of the front wheel of the tractor 10 to the road surface 204. That is, the contact point I is located on the road surface 204 immediately under the axle center of the front wheel of the tractor 10.

The upper case letter C is the point of contact of the rear wheel of the tractor 10 to the road surface 204. That is, the contact point C is located on the road surface 204 immediately under the axle center of the rear wheel of the tractor 10.

D is the point of contact of the middle, relative to the front/rear direction, of the wheels of the container chassis 12 to the road surface 204. That is, the contact point D is located on the road surface 204 immediately under the middle, relative to the front/rear direction, of the wheels arranged in two rows in the front/rear direction. In addition, here, there is illustrated an exemplary configuration in which the wheels of the container chassis 12 are arranged in two rows in the front/rear direction, which should not be considered limitative. The wheels of the container chassis 12 may be arranged either in a single row in the front/rear direction or in three or more rows in the front/rear direction. Even in such cases, the contact point D may be determined based upon the middle, relative to the front/rear direction, of the wheels arranged in the front/rear direction (the axle center in the case where the wheels are arranged in a single row).

E is the point of connection between the tractor 10 and the container chassis 12 (container cargo vehicle) and, as described above, corresponds to the point-like connection position of the coupler 13 shown in FIGS. 1 and 10. a is the height from the road surface 204 of the curved road section 204c to the center of gravity W. s is the horizontal length from the horizontal central line 207 (the vertical central line 201 in FIG. 12) to the center of gravity W in horizontal plane of the container cargo vehicle. b is the width dimension of the container cargo vehicle.

In addition, the lower case latter c is the length extending in the front/rear direction from the contact point C to the center of gravity W. d is the length extending in the front/rear direction from the contact point D to the center of gravity W. e is the length extending in the front/rear direction from the connection point E to the contact point C. f is the length extending in the front/rear direction from the contact point I to the connection point E. L is the length extending in the front/rear direction from the contact point C to the contact point D (in other words, the sum of the distance between the contact point C and the center of gravity W and the distance between the center of gravity W and the contact point C, i.e., length c+length d). Of these front/rear directional lengths, the lengths e, are characteristic values of the container cargo vehicle.

If the length kg from the front section of the container 11 to the center of gravity W is already known based on the method of deriving the 3D center-of-gravity location of the container cargo vehicle discussed in the first embodiment, it then becomes possible that the length c (extending in the front/rear direction from the contact point C to the center of gravity W) and the length d (extending in the front/rear direction from the contact point D to the center of gravity W) can be easily geometrically derived based upon the characteristic values of the container cargo vehicle (e.g., the position of wheels and the like).

In addition, FIG. 13(a) shows that the centrifugal force F that is applied to the center of gravity W of the container cargo vehicle is divided into the component of a centrifugal force Fi that is applied to the contact point I, the component of a centrifugal force Fc that is applied to the contact point C, the component of a centrifugal force Fd that is applied to the contact point D, and the component of a centrifugal force Fe that is applied to the connection point E. In addition, resistance forces (reaction forces) from the road surface 204 and the coupler 13 (not shown in FIG. 13) at the connection point E against these centrifugal forces Fi, Fc, Fd, Fe are also shown by dotted arrows.

The centrifugal force F is $F=mV^2/r$ (where m is the weight of the container cargo vehicle, r is the curvature radius of the curved road section 204c, and V is the travel velocity of the container cargo vehicle), and if the centrifugal force F is in balance with the reaction force at the contact point D in the container chassis 12 and with the sum of the reaction forces at the contact points I and C transmitted through the connection point E to the tractor 10, there is generated no moment at all that causes the trailer truck 50 to rotate in horizontal plane.

However, conversely, if such a balance becomes disrupted, this produces a rotational element that causes the container cargo vehicle to make circular motion in horizontal plane about the connection point E which is a movable part of the trailer truck 50. As a result of this, there is the case where the tangential direction of the trajectory of that circular motion in the center of gravity W of the container cargo vehicle accidentally and momentarily coincides with the direction of force that causes the container cargo vehicle to tilt, in the cross-section surface perpendicular to the travel direction of the container cargo vehicle. To sum up, it is conceivable that there is the case where the rotational motion of the container cargo vehicle in horizontal plane and the rotational motion of the container cargo vehicle in the cross-section surface perpendicular to the travel direction of the container cargo vehicle superimposedly act in the direction that causes the container cargo vehicle to tilt. Therefore, the conclusion is that, in order to properly predict the lateral rollover event of the container cargo vehicle, it is essential to take into consideration the rotational motion of the container cargo vehicle in horizontal plane.

Stated another way, it is conceivable that the proper formulation of the lateral rollover of the container cargo vehicle requires, other than the formulation of the rotational motion of the container cargo vehicle by means of the location of the center of gravity W relative to the cross-section surface perpendicular to the travel direction of the container cargo vehicle (see inequality (1)), the formulation of the rotational motion of the container cargo vehicle by means of the center of gravity W relative to the travel direction of the container cargo vehicle, as will be described later. And, against the foregoing prior art technologies that fail to recognize any importance of the sensing of the 3D center-of-gravity location of the container cargo vehicle, this is a critical point of difference that characterizes the principle of solving the problems by means of the lateral rollover limit velocity estimation system 110 according to the present embodiment.

In FIG. 13, when taking into consideration the balance between the force that is imparted to the trailer truck 50 and its moment, the following relationship holds if the centrifugal force applied to the container chassis 12 (container cargo vehicle) of the trailer truck 50 and its reaction force are in balance with each other.

$$F = F_d + F_e$$

$$F_d : F_e = (c+e) : d$$

Therefore, if these expressions are expanded, the centrifugal force Fd is expressed as follows.

$$F_d = F - F_e$$

$$F_e = F_d \frac{d}{(c+e)}$$

$$F_d = F - F_d \frac{d}{(c+e)}$$

$$F_d \left(1 + \frac{d}{(c+e)}\right) = F$$

$$F_d \left(\frac{c+d+e}{c+e}\right) = F$$

$$\therefore F_d = F \left(\frac{c+e}{L+e}\right)$$

In addition, the centrifugal force Fe is expressed as follows.

$$F_e = F - F_d$$
$$F_e = F - F\left(\frac{c+e}{L+e}\right)$$
$$= F\left(\frac{L+e-c-e}{L+e}\right)$$
$$\therefore F_e = F\left(\frac{d}{L+e}\right)$$

Next, the following relationship holds if the centrifugal force applied to the tractor 10 of the trailer truck 50 and its reaction force are in balance with each other.

$$F_e = F_c + F_i$$

$$F_c : F_i = f : e$$

Therefore, the centrifugal force Fi is expressed as follows.

$$F_e = F_c + F_i$$
$$= F\left(\frac{d}{L+e}\right)$$
$$F_c = F_i \frac{f}{e}$$
$$F_i = F\left(\frac{d}{L+e}\right) - F_c$$
$$F_i = F\left(\frac{d}{L+e}\right) - F_i \frac{f}{e}$$
$$F_i + F_i \frac{f}{e} = F\left(\frac{d}{L+e}\right)$$
$$F_i\left(\frac{f+e}{e}\right) = F\left(\frac{d}{L+e}\right)$$
$$\therefore F_i = F\left\{\frac{de}{(L+e)(f+e)}\right\}$$

In addition, the centrifugal force Fc is expressed as follows.

$$F_c = F_e - F_i$$
$$= F\left(\frac{d}{L+e}\right) - F\left\{\frac{de}{(L+e)(f+e)}\right\}$$
$$= F\left\{\frac{d(f+e)-de}{(L+e)(f+e)}\right\}$$
$$\therefore F_c = F\left\{\frac{df}{(L+e)(f+e)}\right\}$$

Now, the centrifugal forces Fd, Fe, Fi, and Fc, i.e., the components of the centrifugal force F that is applied to the center of gravity W of the container cargo vehicle, are all formulated by the location of the center of gravity W relative to the centrifugal force F and the travel direction of the container cargo vehicle.

Next, the case where there is generated a moment that causes the trailer truck 50 to rotate within horizontal plane will be considered.

In the stage of the above-described formulation, the centrifugal force Fd, the centrifugal force Fe, the centrifugal force Fi, and the centrifugal force Fc are found out from the moment balance of the trailer truck 50. That is to say, it is assumed that the moment balance of the trailer truck 50 holds at the stage in which the trailer truck 50 is not in rotation in horizontal plane, and, in this case, each of the centrifugal forces Fd, Fe, Fi, Fc is of course in balance with its respective reaction force.

Next, at the stage in which the trailer truck 50 starts rotating in horizontal plane, the moment balance of the trailer truck 50 becomes disrupted, and it is required to correctly find out the cause for such moment disruption. Suppose that the length of the trailer truck 50 expands and contracts and, theoretically, there is the possibility that the moment balance of the trailer truck 50 may become disrupted even if each of the centrifugal forces Fd, Fe, Fi, Fc does not vary in magnitude. However, based upon common sense knowledge, the length of each part of the trailer truck 50 remains unchanged. Therefore, the condition in which the magnitude of each of the centrifugal forces Fd, Fe, Fi, Fc varies from that when the moment balance holds is the only remaining cause for the moment balance disruption of the trailer truck 50.

When the balance of force as the cause of generation of such moment becomes disrupted, the connection point E which is a movable part of the trailer truck 50 serves as an axis of rotation in horizontal plane of the trailer truck 50. Therefore, if either one of the following inequalities holds, this gives rise to an element that causes the trailer truck 50 to rotate in horizontal plane.

$$F_c + F_d - F_i > 0$$

$$F_c + F_d - F_i < 0$$

That is, if Fc+Fd−Fi>0, it is then conceivable that the container cargo vehicle rotates in horizontal plane in the direction which induces the container cargo vehicle to laterally overturn. On the other hand, if Fc+Fd−Fi<0, it is then conceivable that the container cargo vehicle rotates in horizontal plane in the direction that induces a jackknife-like motion between the tractor 10 and the container cargo vehicle (the container chassis 12). Therefore, if the following inequality in absolute value form is satisfied, then the container cargo vehicle will rotate in horizontal plane.

$$|F_c + F_d - F_i| > 0$$

If the components of the centrifugal forces Fc, Fd, Fi are substituted in this inequality in absolute value form, then the following inequality (2) is obtained.

$$\left|F\left\{\frac{df}{(L+e)(f+e)}\right\} + F\left(\frac{c+e}{L+e}\right) - F\left\{\frac{df}{(L+e)(f+e)}\right\}\right| > 0 \qquad (2)$$
$$F\left|\left\{\frac{df}{(L+e)(f+e)}\right\} + \left(\frac{c+e}{L+e}\right) - \left\{\frac{df}{(L+e)(f+e)}\right\}\right| > 0$$
$$F\left|\frac{f}{f+e} + \frac{e(c-d+e)}{(L+e)(f+e)}\right| > 0$$
$$\therefore \frac{mV^2}{r} \frac{1}{f+e}\left|f + \frac{e(c-d+e)}{L+e}\right| > 0$$

In the inequality (2), m is the weight of the container cargo vehicle. V is the travel velocity of the container cargo vehicle. r is the curvature radius of the curved road section 204c.

According to inequality (2), the velocity at which the container cargo vehicle is brought into rotation centered on the point of connection between the tractor 10 and the container cargo vehicle is found in connection with the curvature radius r of the curved road section 204c by means of the center-of-gravity location of the container cargo vehicle relative to the horizontal direction of the container cargo vehicle.

Next, a description will be made about a method of deriving the travel velocity of the container cargo vehicle at which it is predicted that the container cargo vehicle will come to laterally overturn.

The condition in which the container cargo vehicle is most likely to laterally overturn during travel along the curved road section 204c occurs when the rotational motion of the container cargo vehicle in the cross-section surface perpendicular to the travel direction of the container cargo vehicle (inequality (1)) and the rotational motion of the container cargo vehicle in horizontal plane (inequality (2)) act at the same time.

The travel velocity of the container cargo vehicle in that case is obtained by solving the following simultaneous inequality composed of inequality (1) and inequality (2) by the travel velocity V of the container cargo vehicle.

$$\begin{cases} \frac{mv^2}{r}a - mg\left(\frac{b}{2}-s\right) > 0 \\ \frac{mv^2}{r}\frac{1}{f+e}\left|f + \frac{e(c-d+e)}{L+e}\right| > 0 \end{cases}$$

The sum of both the aforesaid expressions is found and transferred for expansion as follows.

$$\frac{mv^2}{r}a + \frac{mv^2}{r}\frac{1}{f+e}\left|f + \frac{e(c-d+e)}{L+e}\right| > mg\left(\frac{b}{2}-s\right) \quad (3)$$

$$V^2\left\{a + \frac{1}{f+e}\left|f + \frac{e(c-d+e)}{L+e}\right|\right\} > g\left(\frac{b}{2}-s\right)r$$

$$\therefore V > \sqrt{\frac{g\left(\frac{b}{2}-s\right)r}{\left\{a + \frac{1}{f+e}\left|f + \frac{e(c-d+e)}{L+e}\right|\right\}}}$$

In this inequality (3), g is the gravitational acceleration. b is the width dimension of the container cargo vehicle. r is the curvature radius of the curved road section 204c. a is the height from the road surface 204 of the curved road section 204c to the center of gravity W. s is the horizontal length from the horizontal central line 207 (the vertical central line 201) to the center of gravity W of the container cargo vehicle. c is the front/rear-directional length from the contact point C to the center of gravity W. d is the front/rear-directional length from the contact point D to the center of gravity W. e is the front/rear-directional length from the connection point E to the contact point C. f is the front/rear-directional length from the contact point I to the connection point E. L is the front/rear-directional length from the contact point C to the contact point D.

The inequality (3) is the expression for finding the lateral rollover velocity range of the container cargo vehicle in which it is predicted that the container cargo vehicle will come to laterally overturn. Now, therefore, if at least the 3D center-of-gravity location of the container cargo vehicle is already known, this makes it possible to properly estimate the range of velocities (of the travel velocity V of the container cargo vehicle) in which inequality (3) holds, i.e., the range of lateral rollover velocities of the container cargo vehicle.

Incidentally, suppose that the travel velocity V of the container cargo vehicle in the left side of inequality (3) increases to exceed a limit (critical) velocity at which it is predicted that the container cargo vehicle starts tilting. Such a limit velocity is referred to as the lateral rollover limit velocity V1 in the present specification. That is, the lateral rollover limit velocity V1 of the container cargo vehicle is given by the following equality (4) as a result of connection of the right and left sides of inequality (3) by an equal sign.

$$\therefore V1 = \sqrt{\frac{g\left(\frac{b}{2}-s\right)r}{\left\{a + \frac{1}{f+e}\left|f + \frac{e(c-d+e)}{L+e}\right|\right\}}} \quad (4)$$

When the container cargo vehicle is about to reach the curved road section 204c having the curvature radius of r at the lateral rollover limit velocity V1, the container cargo vehicle may start tilting by slight external disturbance, and there is concern that the container cargo vehicle will undergo lateral rollover at worst. Therefore, the lateral rollover limit velocity V1 serves as a reference velocity for whether or not the container cargo vehicle is brought into lateral rollover, and is the valuable data necessary for properly deciding abnormality in the velocity of the container cargo vehicle on the curves road section 204s.

Next, with reference to the drawings, a description will be made about an example of the operation of estimating the lateral rollover limit velocity of the container cargo vehicle by means of the lateral rollover limit velocity estimation system 110 of the present embodiment.

Figure 14:
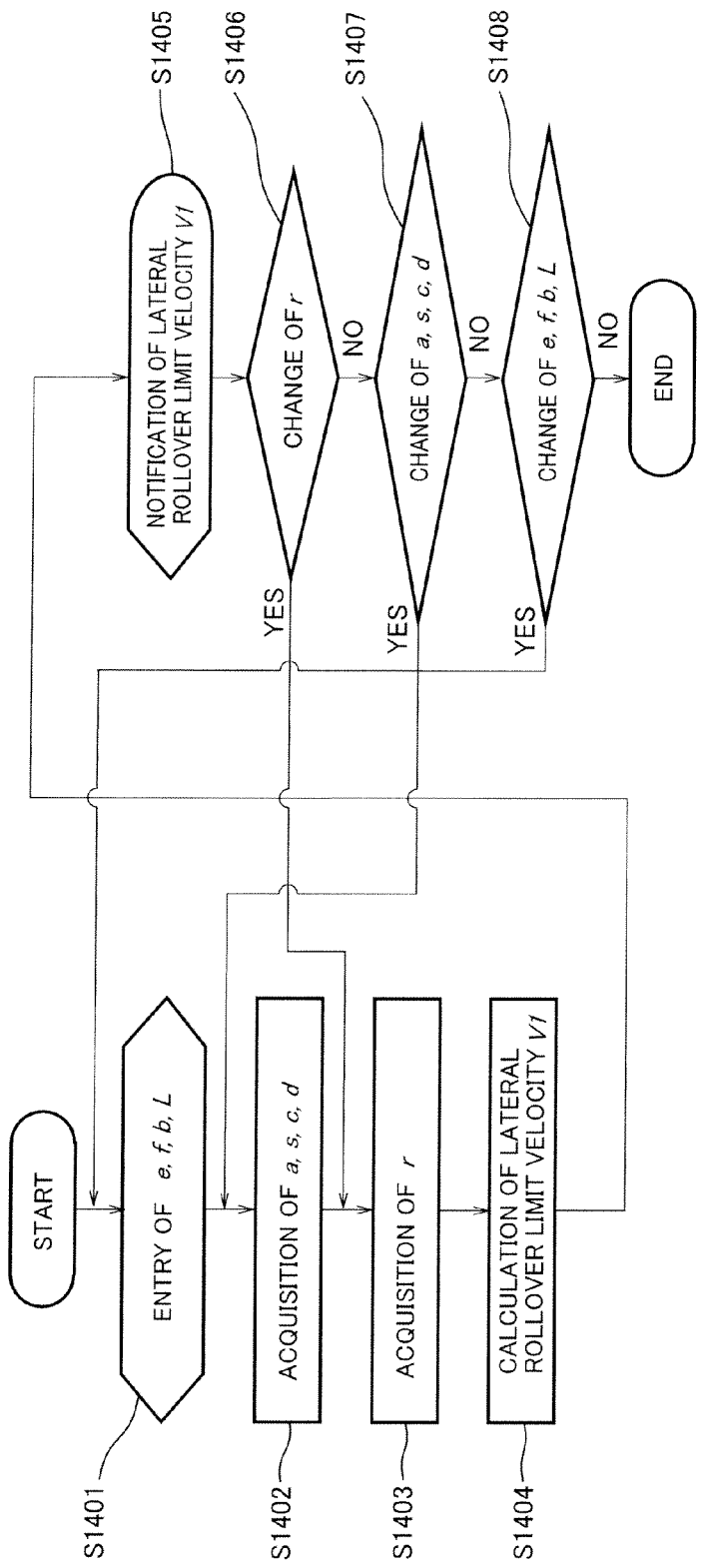
FIG. 14 is a flow chart showing an operation of estimating the lateral rollover limit velocity of a container cargo vehicle by means of the lateral rollover limit velocity estimation system of the second embodiment.

FIG. 14 is a flow chart showing the operation of estimating the lateral rollover limit velocity of the container cargo vehicle by means of the lateral rollover limit velocity estimation system of the present embodiment.

Upon depression of the power supply switch of the operation setting/display part 115c of the arithmetic unit 115, a plurality of menus are displayed on the display screen (not shown) of the operation setting/display part 115c. And, by suitable manipulation of buttons of the operation setting/display part 115c, it becomes possible to start the following operation of estimating the lateral rollover limit velocity V1 of the container cargo vehicle during travel of the trailer truck 50. In executing the present estimation operation in the following way, the contents of instructions that the operator (for example, the driver of the tractor 10 or a fellow passenger) is required to make are displayed as a message on the display screen of the operation setting/display part 115c. Upon selection of an operation of performing arithmetic to calculate the lateral rollover limit velocity V1 of the container cargo vehicle, the arithmetic part 115a of the arithmetic unit 115 retrieves from the storage part 115b an arithmetic program for lateral rollover limit velocity estimation and suitable pre-stored constants, and the arithmetic program executes the following processing while controlling the arithmetic part 115a, the storage part 115b, and the operation setting/display part 115c.

These constants thus retrieved include g (the gravitational acceleration), b (the width dimension of the container cargo vehicle), e (the front/rear-directional length from the connection point E to the contact point C), f (the front/rear-directional length from the contact point I to the connection point E), and L (the front/rear-directional length from the contact point C to the contact point D).

Since any one of the above-described constants other than the gravitational acceleration g is the characteristic value of the trailer truck 50, such constants are entered into the storage part 115b for each model of the trailer truck 50, as in the operation to be hereinafter described. In addition, once the constants are input to the storage part 115b, they can be used as they are without reentry of them, unless there is made a change in the model of the trailer truck 50.

In the first place, the operator (driver or fellow passenger) specifies the aforesaid constants e, f, b, L with reference to suitable materials such as the vehicle inspection certificate or manufacture specification document of the trailer truck 50. And, by manipulation of the operation setting/display part 115c by the operator, these constants e, f, b, L are entered into the storage part 115b of the arithmetic unit 115 (step S1401). The gravitational acceleration g as a constant is prestored in the storage part 115b because it is a universal value. In this way, the arithmetic part 115a obtains the constants e, f, b, L, g.

Next, the arithmetic part 115a obtains data related to the center of gravity of the container cargo vehicle by means of any one of the following methods. That is to say, the arithmetic part 115a obtains a (the height from the road surface 204 of the curved road section 204c to the center of gravity W), s (the horizontal length from the horizontal central line 207 (the vertical central line 201) to the center of gravity W of the container cargo vehicle), c (the front/rear-directional length from the contact point C to the center of gravity W), and d (the front/rear-directional length from the contact point D to the center of gravity W) (step S1402).

As a first method, it may be arranged such that, for example, when the cargo is transported without having checked its condition of loading in the container 11, the arithmetic part 115a operates according to the arithmetic program, prestored in the storage part 115b, for detection of the 3D center-of-gravity location and then obtains, based upon the digital signal output from the angular velocity sensor 14a (A/D converter 14b) described in the first embodiment, the 3D center-of-gravity location of the container cargo vehicle. By doing this, the arithmetic part 115a is able to perform arithmetic to calculate, from the data about the 3D center-of-gravity location, the center-of-gravity related data a, s, c, d by means of simple geometrical calculations. This is preferable because it allows the arithmetic part 115a to automatically obtain data of high accuracy from the 3D center-of-gravity location of the container cargo vehicle derived based upon the logical theory of dynamics. The method of deriving the 3D center-of-gravity location of the container cargo vehicle has been already described in detail in the first embodiment, and, therefore, its description is omitted here.

As a second method, it may be arranged such that, in the case where the operator of the trailer truck 50 loads the container 11 with container cargo (as when transporting general cargo in the domestic distribution), the operator makes actual measurements of the center-of-gravity related data a, s, c, d. By doing this, the arithmetic part 115a is able to obtain the center-of-gravity related data a, s, c, d by the operator entering the center-of-gravity related data a, s, c, d by means of the operation setting/display part 115c. However, there is the possibility that the accuracy of the 3D center-of-gravity location of the container cargo vehicle in the second method may be lower than that in the first method because of the measurement error of the center-of-gravity related data a, s, c, d.

Next, the arithmetic part 115a obtains r (the curvature radius of the curved road section 204c) by means of any one of the following methods (step S1403).

As a first method, it may be arranged such that the arithmetic part 115a uses the receiver 114d to automatically obtain, from a local ITS, radio intelligence about the curvature radius r of the curved road section 204c along which the trailer truck 50 is scheduled to travel.

As a second method, it may be arranged such that, based upon the travel plan of the trailer truck 50, the curvature radius of the curved road section 204c along which the trailer truck 50 is scheduled to travel is checked in advance. By doing this, the arithmetic part 115a is allowed to obtain the value r by the operator inputting the curvature radius r through the operation setting/display part 115c.

As a third method, it may be arranged such that the arithmetic part 115a divides, per given numeric value, the range of numeric values supposed to be the curvature radius of the curved road section 204c (for example, the range of from the numeric value for sharp curve at the intersection to the numeric value for gentle curve) and obtains it continuously.

Next, the arithmetic part 115a retrieves the constants e, f, b, L, g stored in the storage part 115b, and then performs arithmetic to calculate, based upon the center-of-gravity related data a, s, c, d related to the 3D center-of-gravity location of the container cargo vehicle (obtained in step S1402) and the curvature radius r (obtained in step S1403), the lateral rollover limit velocity V1 (estimated value) of the container cargo vehicle in response to the curvature radius r from the following equality (4) (step S1404).

$$\therefore V1 = \sqrt{\frac{g\left(\frac{b}{2}-s\right)r}{\left\{a+\frac{1}{f+e}\left|f+\frac{e(c-d+e)}{L+e}\right|\right\}}} \qquad (4)$$

In this equality (4), g is the gravitational acceleration. b is the width dimension of the container cargo vehicle. r is the curvature radius of the curved road section 204c. a is the height from the road surface 204 of the curved road section 204c to the center of gravity W. s is the horizontal length from the horizontal central line 207 (the vertical central line 201) to the center of gravity W of the container cargo vehicle. c is the front/rear-directional length from the contact point C to the center of gravity W. d is the front/rear-directional length from the contact point D to the center of gravity W. e is the front/rear-directional length from the connection point E to the contact point C. f is the front/rear-directional length from the contact point I to the connection point E. L is the front/rear-directional length from the contact point C to the contact point D.

And, by the arithmetic part 115, the lateral rollover limit velocity V1 obtained in step S1404 is either displayed on the display screen of the operation setting/display part 15c of the arithmetic unit 115 or vocalized by the loud speaker of the operation setting/display part 15c so that the operator is notified to that effect (step S1405).

For example, it may be arranged such that, while sequentially obtaining, from a local ITS, radio intelligence about the curvature radius r of the curved road section 204c on which the trailer truck 50 is planned to travel through the receiver 114b, the arithmetic part 115a uses the operation setting/display part 15c to issue to the operator a notification such that "Negotiate a curve at a travel velocity of V1 or less when taking a left-hand turn at the next intersection", "Keep the travel velocity at V1 or less" et cetera.

Here, the arithmetic part 115a makes a decision whether or not to change the curvature radius r of the curved road section 204c (step S1406). In the case of making a change in the curvature radius r of the curved road section 204c (in the case of "Yes" in step S1406), the processing of steps S1403 through S1405 iterates.

On the other hand, in the case of making no change in the curvature radius r of the curved road section 204c (in the case of "No" in step S1406), the procedure proceeds to a decision step, and the arithmetic part 115a makes a decision whether or not to change any one of the aforesaid center-of-gravity related data a, s, c, d (step S1407). In the case of changing at least any one of the center-of-gravity related data a, s, c, d (in the case of "Yes" in step S1407), the processing of steps S1402 through S1406 iterates.

On the other hand, in the case where none of the center-of-gravity related data a, s, c, d is subjected to change (in the case of "No" in step S1407), the procedure proceeds to the next decision step, and the arithmetic part 115a makes a decision whether or not to make a change in the aforesaid constants e, f, b, L which are characteristic values of the trailer truck 50 (step S1408). In the case of changing at least any one of the constants e, f, b, L (in the case of "Yes" in step S1408), the processing of steps S1401 through S1407 iterates.

On the other hand, in the case where none of the constants e, f, b, L is subjected to change (in the case of "No" in step S1408), the lateral rollover limit velocity estimation system 110 terminates a series of estimation routines of the lateral rollover limit velocity V1 of the container cargo vehicle.

As described above, the lateral rollover limit velocity estimation system 110 of the present embodiment includes the trailer truck 50 having the container 11 capable of carrying cargo, the container chassis 12 on which the container 11 is placed, and the tractor 10 for towing the container chassis 12, and the arithmetic unit 115.

And, the lateral rollover limit velocity estimation system 110 is configured such that the arithmetic unit 115 obtains the center-of-gravity location, in three-dimensional space, of the container cargo vehicle and the curvature radius r of the curved road section 204c along which the container cargo vehicle is scheduled to travel, thereby properly deriving, by use of the 3D space center-of-gravity location, the lateral rollover limit velocity V1 at the curved road section 204c of the container cargo vehicle in response to the curvature radius r of the curved road section 204c.

The lateral rollover limit velocity V1 serves as a reference velocity for whether or not the container cargo vehicle is brought into lateral rollover. This contributes to preventing the trailer truck 50 from unstable travel motion on the curved road section 204c.

More specifically, the arithmetic unit 115 is able to derive the lateral rollover limit velocity V1 on the basis of: inequality (1) that represents, by use of the location of the center of gravity relative to the cross-section surface perpendicular to the travel direction of the container cargo vehicle, a relationship between V (the vehicle velocity at which the container cargo vehicle is brought into rotation centered on the outer edge 300 in the width direction of the turning outer wheel of the container cargo vehicle) and r (the curvature radius), and inequality (2) that represents, by use of the location of the center of gravity relative to the travel direction of the container cargo vehicle, a relationship between V (the vehicle velocity at which the container cargo vehicle is brought into rotation centered on the connection point E between the tractor 10 and the container cargo vehicle) and r (the curvature radius).

This therefore makes it possible to derive, based upon the logical theory of dynamics, the lateral rollover limit velocity V1 of the container cargo vehicle without having to introduce data that lack theoretical ground (e.g., correction coefficient or the like) and the reliability of the arithmetic result thereof is extremely high. And, this is backed up by the results of the second verification experiment (to be hereinafter described) conducted using an actual car.

In addition, according to the lateral rollover limit velocity estimation system 110 of the present embodiment, these various center-of-gravity related data a, s, c, d (i.e., the input values of inequalities (1) and (2)) may be derived using the 3D center-of-gravity location of the container cargo vehicle by means of the center-of-gravity detection system 100 of the first embodiment. In this case, not only the trouble of measuring the center-of-gravity related data a, s, c, d is saved but also it becomes possible to obtain the center-of-gravity related data a, s, c, d of high accuracy, as verified in the first embodiment. Furthermore, even when the cargo is transported without having checked its condition of loading in the container 11, (for example, commercial transaction container cargo that is internationally exported or imported), it is still possible to obtain the center-of-gravity related data a, s, c, d.

In addition, in accordance with the lateral rollover limit velocity estimation system 110 of the present embodiment, the arithmetic part 115a uses the receiver 114d to automatically obtain, from a local ITS, radio intelligence about the curvature radius r of the curved road section 204c along which the trailer truck 50 is scheduled to travel. This therefore saves the trouble of obtaining the curvature radius r of the curved road section 204c.

Example 2

With a view to backing up the validity of the method of deriving the lateral rollover limit velocity V1 of the container cargo vehicle by means of the lateral rollover limit velocity estimation system 110 of the second embodiment, a second verification experiment (lateral rollover experiment) using an actual vehicle was conducted in Maya Wharf in Port Island at Port of Kobe on Apr. 13, 2005. The present verification experiment was carried out such that, in order that the present technology may not become public knowledge, the theoretical expressions of the present technology were stored as a program in a "black box" manner in the internal memory of a personal computer.

The procedure of the present verification experiment is as follows. In the first place, characteristic values of a trailer truck for use in the verification experiment were obtained. These characteristic values include b (the width dimension of the container cargo vehicle), e (the front/rear-directional length from the connection point E to the contact point C), f (the front/rear-directional length from the contact point I to the connection point E), and L (the front/rear-directional length from the contact point C to the contact point D).

Next, data related to the center of gravity of the verification experiment container cargo vehicle with suitable dummy cargo loaded thereon were obtained. The center-of-gravity related data include a (the height from the road surface 204 of the curved road section 204c to the center of gravity), s (the horizontal length from the horizontal central line 207 (the vertical central line 201) to the center of gravity of the container cargo vehicle), c (the front/rear-directional length from the contact point C to the center of gravity), and d (the front/rear-directional length from the contact point D to the center of gravity).

Next, while controlling the travel velocity of the trailer truck for verification experimental use, the trailer truck traveled along a curved line and was turned over on its side. The present verification experiment caught the attention of participants and observers, as an epoch-making experiment in which a real trailer truck (actual vehicle) was overturned by operation by a human driver.

Next, from the prior measurements conducted before the lateral rollover of the trailer truck and the subsequent examination after the lateral rollover in the site of the present verification experiment, the curvature radius of a path (i.e., the path of a turning outer wheel on the lateral rollover side) along which the trailer truck for verification experimental use passed at the time of the lateral rollover was estimated. The result showed that the curvature radius in question was about 35 meters.

Next, from the log of a tachometer installed in the trailer truck for verification experiment use in the present verification experiment, the vehicle velocity of the trailer truck for verification experimental use in the present verification experiment at the time of the lateral rollover was estimated.

Figure 15:
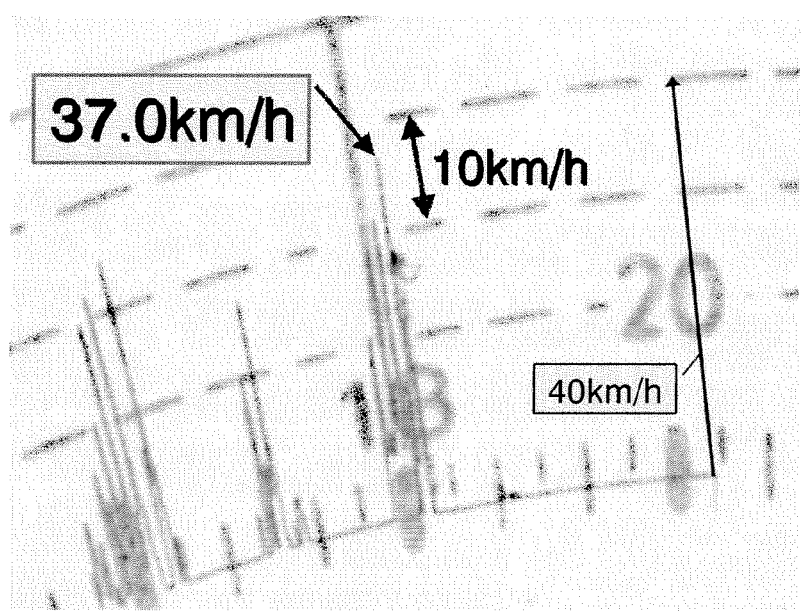
FIG. 15 is a copy of a photograph showing the recording screen of a tachometer of a verification experiment trailer truck in a second verification experiment.

FIG. 15 is a copy of a photograph showing the recording screen of the tachometer of the trailer truck for verification experimental use in the present verification experiment.

As can be easily understood from FIG. 15, the velocity at which the trailer truck for verification experimental use was conceivably brought into lateral rollover can be judged to be at about 37 Km/h (37 kilometers per hour).

Next, b, e, f, L (the constants which are characteristic values of the trailer truck for verification experimental use) and a, s, c, d (the center-of-gravity related data of the container cargo vehicle for verification experimental use) were used to find, based upon the following equality (4), the lateral rollover threshold speed V1 of the verification experiment container cargo vehicle corresponding to the curvature radius r.

$$\therefore V1 = \sqrt{\frac{g\left(\frac{b}{2} - s\right)r}{\left\{a + \frac{1}{f+e}\left|f + \frac{e(c-d+e)}{L+e}\right|\right\}}} \quad (4)$$

Figure 16:
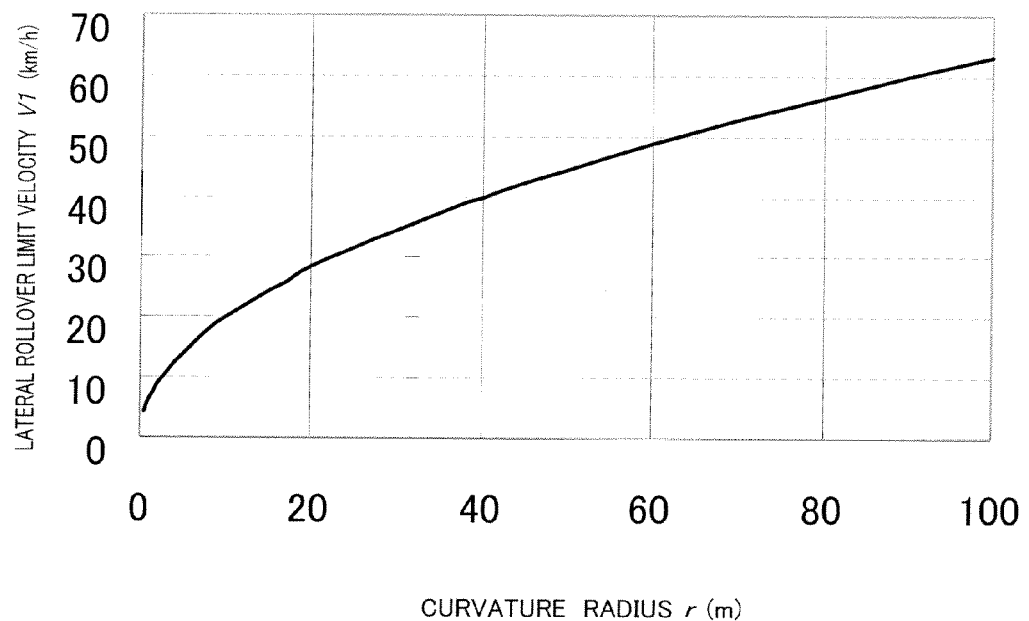
FIG. 16 is a graphical diagram, in which the horizontal axis represents the curvature radius and the vertical axis represents the lateral rollover limit velocity of a container cargo vehicle for verification experiment, for showing a relationship therebetween.

FIG. 16 is a graphical diagram showing a relationship between the curvature radius and the lateral rollover limit velocity of the container cargo vehicle wherein the horizontal axis represents the former while the vertical axis represents the latter. In addition, here, a solid line in FIG. 16 representative of the relationship between the curvature radius r and the lateral rollover limit velocity V1 of the container cargo vehicle is called a "curvature radius-lateral rollover limit velocity correlation line" for the sake of convenience.

Referring to FIG. 16, the reading shows that the value of the vertical axis of the curvature radius-lateral rollover limit velocity correlation line corresponding to where the curvature radius r of the horizontal axis is 35 meters is about 37 Km/h. This shows that the value of the lateral rollover limit velocity V1 of the container cargo vehicle for verification experimental use obtained by the lateral rollover limit velocity estimation system 110 almost perfectly coincides with the value obtained by the tachometer at which the trailer truck for verification experimental use was conceivably turned over on its side. As a result, the validity of the method of deriving the lateral rollover limit velocity V1 of the container cargo vehicle by means of the lateral rollover limit velocity estimation system 110 of the second embodiment was backed up by the present verification experiment.

From the curvature radius-lateral rollover limit velocity correlation line, it becomes possible to properly estimate the range of the lateral rollover velocities of the trailer truck (container cargo vehicle) on the curved road section in response to the curvature radius r. For example, the curvature radius-lateral rollover limit velocity correlation line shows that, in the case where the trailer truck for verification experimental use travels along a curved road section whose curvature radius is 35 meters (this sort of curved road section is one that the vehicle driver routinely encounters in the general road), it can be judged that the possibility that the trailer truck for verification experimental use is brought into lateral rollover is high if the travel velocity of the trailer truck for verification experimental use exceeds 37 Km/h (which is the value that falls within the range of fairly standard regulation speeds). That is to say, even when the trailer truck travels to the flow of traffic at a speed below the regulation travel speed, there is the case where the speed may be in excess of the lateral rollover limit velocity V1 of the container cargo vehicle depending on the loading condition of container cargo in the container. And, this fact gives evidence of the importance and benefit of the detection of the 3D center-of-gravity location of the container cargo vehicle described above.

Third Embodiment

Figures 17A, 17B:
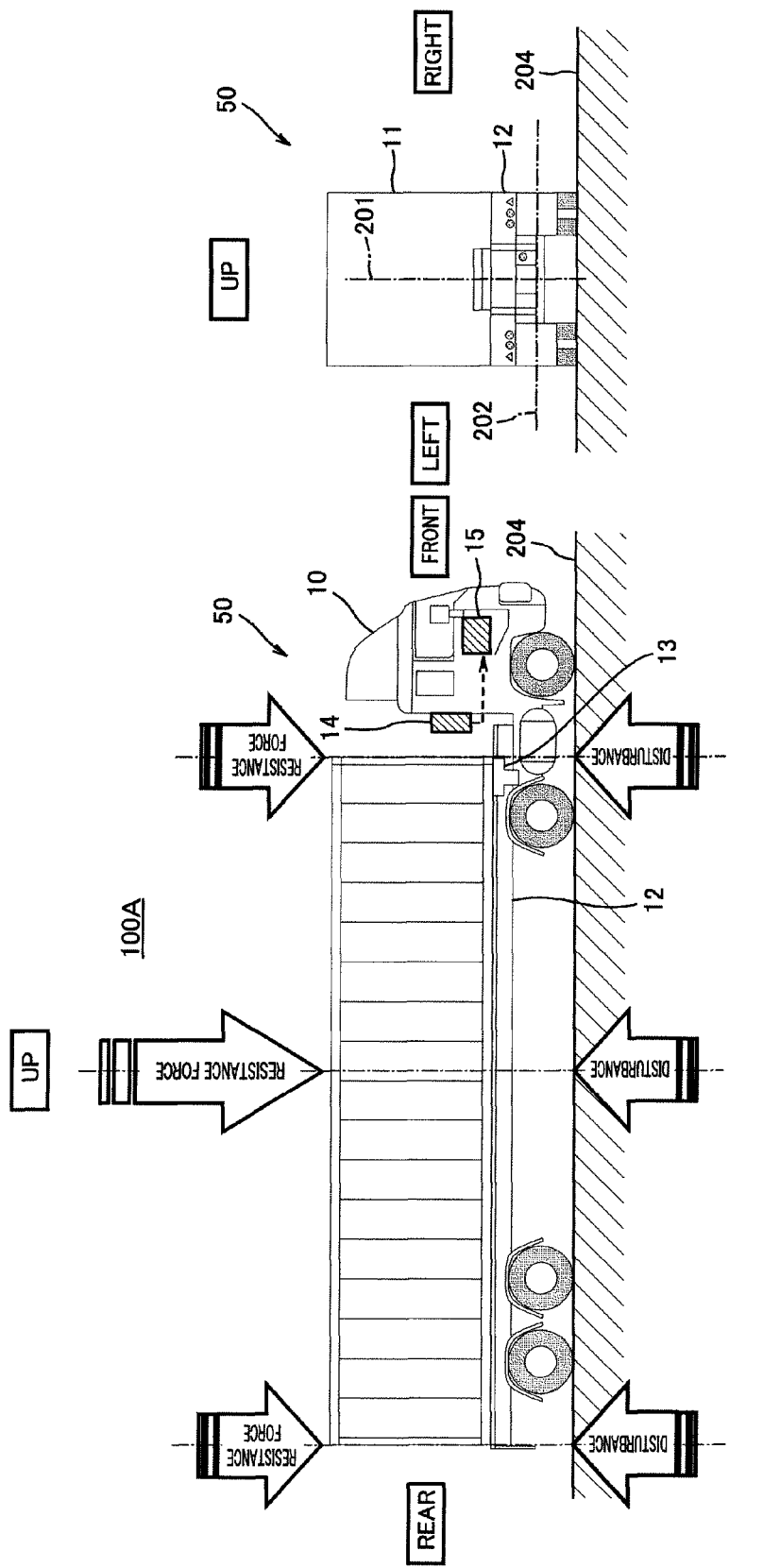
FIG. 17(a) and (b) is an outline illustration showing an example of the configuration of a cargo weight estimation system according to a third embodiment of the present invention.

FIG. 17 is an outline illustration depicting an example of the configuration of a cargo weight estimation system according to a third embodiment of the present invention. FIG. 17(a) is a view of the cargo weight estimation system as viewed from the width direction (sideways) of the container cargo vehicle. FIG. 17(b) is a view of the cargo weight estimation system as viewed from the rear side of the container cargo vehicle. In the drawings, the direction in which the self-weight of the container cargo vehicle is applied is referred to as the "vertical direction", the width direction of the container cargo vehicle is referred to as the "horizontal direction", and the travel direction of the container cargo vehicle is referred to as the "front/rear direction".

In addition, the cargo weight estimation system 100A is identical in hardware configuration with the center-of-gravity detection system 100 of the first embodiment. Therefore, the same reference numerals are used in FIG. 7 to denote components of the cargo weight estimation system 100A which correspond to those of the center-of-gravity detection system1 100, and a detailed description of the configuration of the cargo weight estimation system 100A is omitted accordingly. That is to say, the cargo weight estimation system 100A of the present embodiment is distinguished from the center-of-gravity detection system 100 of the first embodiment in that the storage part 15b of the arithmetic unit 15 (see FIG. 2) of the present embodiment stores an arithmetic program (whose details will be hereinafter described) for properly deriving the weight of the container cargo loaded in the container 11, whereas such an arithmetic program is not stored in the storage part 15b of the center-of-gravity detection system 100 of the first embodiment; however, the center-of-gravity detection system 100 can be used as it is from the standpoint of hardware.

Next, with making reference to the drawings, a method of deriving the weight of the container cargo loaded in the container 11 will be described in detail.

As will be described hereinafter, the present derivation method is characterized in that it makes use of the 3D center-of-gravity location of a container cargo vehicle as an input value, and geometrically derives, based upon the theoretical ground, the apparent weights of container cargo with consideration given only to the three different directions of the container cargo vehicle (namely front/rear direction, horizontal direction, vertical direction). In addition, as will be described hereinafter, the present derivation method is characterized in that it employs these apparent weights to theoretically derive the net weight of the container cargo by means of geometrical average.

What is first described here is a method of obtaining input values (pieces of initial information) necessary for deriving the weight of container cargo.

Such input values include p (the length, extending in the travel direction (front/rear direction) of the container cargo vehicle, of the container 11 (see FIG. 18)), b (the length, extending in the width direction (horizontal direction) of the container cargo vehicle, of the container 11 (see FIG. 19)), $m_0$ (the unloaded weight of the container cargo vehicle without container cargo in the container 11 (hereinafter abbreviated just as the weight $m_0$ as required)), and z (the length from the axle position line 202 to the upper end of the container 11 (see FIG. 20)).

It is easy to determine the container's 11 lengths p, b, z and the weight $m_0$ from suitable materials such as the vehicle inspection certificate, manufacture specification document et cetera of the trailer truck 50.

In addition, the aforesaid input values also include the location of the center of gravity W, in three-dimensional space, of the container cargo vehicle with the container cargo loaded in the container 11 (hereinafter abbreviated just as the center of gravity W as required) and the location of the center of gravity $W_0$, in three-dimensional space, of the container cargo vehicle without the container cargo in the container 11 (hereinafter abbreviated just as the center of gravity $W_0$ as required).

As to the location of the center of gravity W, it may be derived with high accuracy by means of the method of deriving the 3D center-of-gravity location of the container cargo vehicle described in the first embodiment.

In addition, as to the location of the center of gravity $W_0$, it may be found in vehicle inspection facilities by making full use of suitable analytic and measurement technologies if the models of the container 11 and the container chassis 12 are specified. However, here, a description will be made about a technique capable of deriving, in simple and high-accuracy manner, the location of the center of gravity $W_0$ by use of the method of the first embodiment for deriving the 3D center-of-gravity location of the container cargo vehicle.

As described above, the method of deriving the 3D center-of-gravity location of the container cargo vehicle described in the first embodiment is applicable, regardless of whether the container 11 is loaded with container cargo. Thus, if the container chassis 11 carrying various empty dummy containers of different container models (for example, 40-feet container, reefer container et cetera) one at a time is towed by the tractor 10 of standard type, the locations of the centers of gravity $W_0$ for various types of containers are obtained by the foregoing derivation method. Therefore, by making and pre-storing a database of the locations of the centers of gravity $W_0$ of the containers for each container model in the storage part 15b, this makes it possible for the arithmetic unit 15 to retrieve, as needed, data about the location of the center-of-gravity $W_0$ of a certain container of the same model as the container loaded with container cargo from the storage part 15b and use the retrieved data as an input value.

Next, with reference to FIG. 18, a description will be made about a method of geometrically deriving the apparent weight of container cargo with consideration given only to the front/rear direction (travel direction) of the container cargo vehicle.

Figure 18:
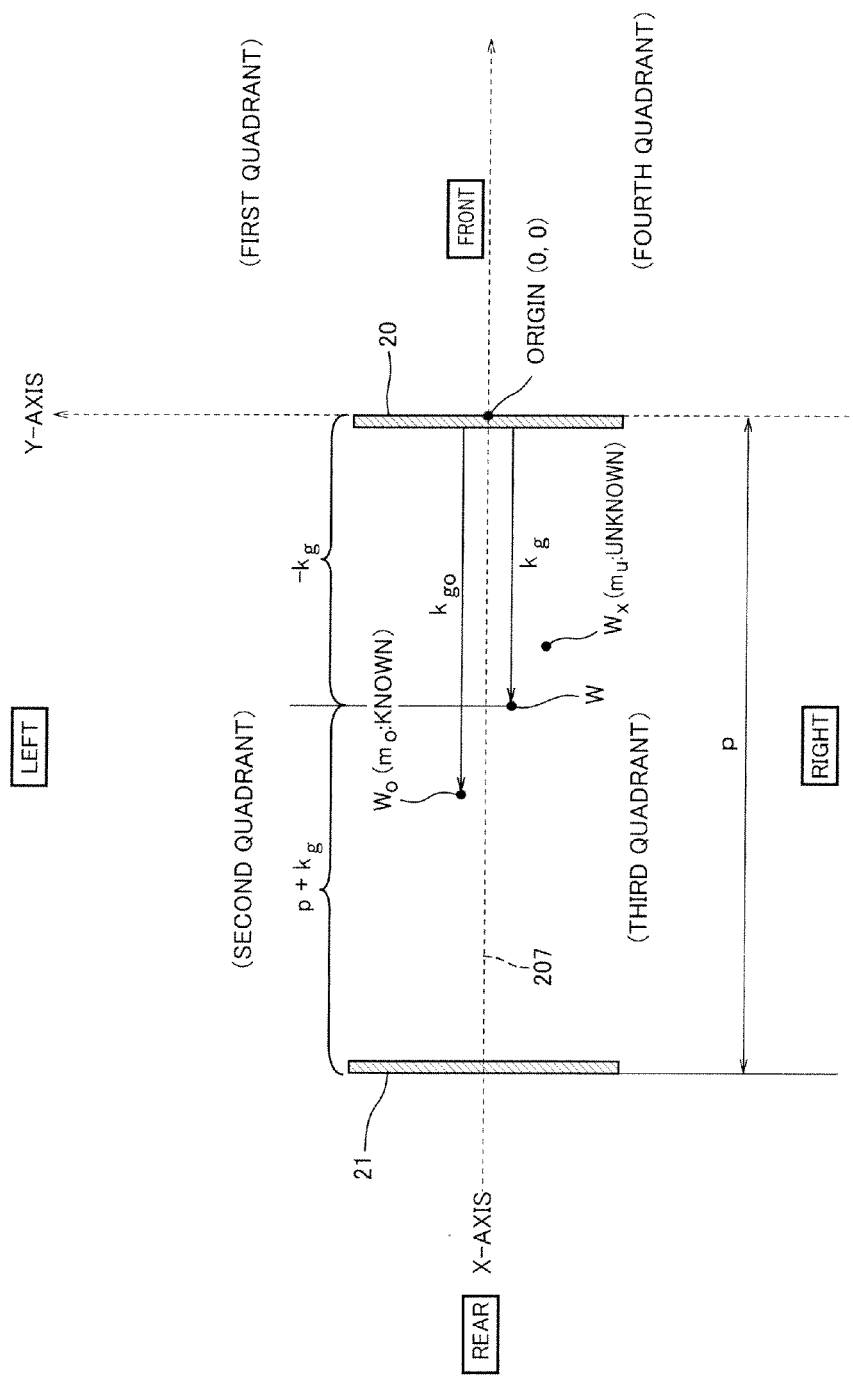
FIG. 18 is a schematic diagram for the purpose of explaining a method of deriving the apparent weight of container cargo with consideration given only to the front/rear direction of a container cargo vehicle by means of the cargo weight estimation system of the third embodiment.

FIG. 18 is a schematic illustration for the purpose of explaining a method of deriving the apparent weight $m_u$ (hereinafter, abbreviated just as the weight $m_u$ as required) of container cargo with consideration given only to the front/rear direction of the container cargo vehicle by means of the cargo weight estimation system of the present embodiment. FIG. 18 also schematically shows the state of each of the center-of-gravity locations when viewing the container cargo vehicle from the vertical direction (to be exact, from above the container cargo vehicle).

In FIG. 18 (same also in FIG. 19), the width direction of the container cargo vehicle is referred to as the horizontal direction. The travel direction of the container cargo vehicle is referred to as the front/rear direction.

Referring to FIG. 18, there is also depicted the location of the center of gravity $W_x$, in three-dimensional space, of the cargo loaded in the container 11 (hereinafter, abbreviated just as the location of the center of gravity $W_x$), in addition to the location of the center of gravity $W_0$ and the location of the center of gravity W.

Incidentally, as an inevitable consequence from the mechanics of mass point, the center of gravity W lies between the center of gravity $W_0$ and the center of gravity $W_x$, as shown in see FIG. 18, and these three are arrayed on the same straight line. At this point, the center of gravity $W_x$ is so located as to be opposite across the center of gravity W on both the rear/front sides and the right/left sides of the center of gravity $W_0$. And, the inventor of the present application has found that the positional relationship between the center of gravity W, the center of gravity $W_0$, and the center of gravity $W_x$ is useful for geometrically deriving the unknown weight $m_u$ from the known weight $m_0$.

That is to say, even when the loading condition of a respective piece of container cargo inside the container 11 is unknown, it is possible to grasp, by use of the weight $m_u$ and the weight $m_0$, the distribution of weight in the front/rear direction loaded throughout the entire bottom of the container and, as a result, the weight $m_u$ is geometrically formulated as shown below.

$$m_u = m_o \frac{-k_g}{p + k_g} (k_g \le k_{go}) \quad (1)$$

$$m_u = m_o \frac{p + k_g}{-k_g} (k_g > k_{go}) \quad (2)$$

In expressions (1) and (2), p is the front/rear-directional length of the container 11, $m_0$ is the unloaded weight of the container cargo vehicle without container cargo in the container 11, and $m_u$ is the apparent weight of the container cargo with consideration given only to the front/rear direction of the container cargo vehicle. Besides, $k_g$ is the value that describes the location of the center of gravity W based on the front section (the front cross beam 20) of the container 11 in front/rear-directional length by use of the after-mentioned coordinate system while $k_{go}$ is the value that describes the location of the center of gravity $W_0$ based on the front section (the front cross beam 20) of the container 11 in front/rear-directional length by use of the after-mentioned coordinate system.

In addition, unlike the first embodiment in which the value $k_g$ is dealt with as a simple length (positive value) from the front section of the container 11 to the location of the center of gravity W, the value $k_g$ in the present embodiment assumes a positive or negative value depending upon the way the coordinate system is defined.

According to the coordinate system shown in FIG. 18, by placing the origin (0, 0) of the coordinate axes in the horizontal center of the front cross beam 20, it becomes possible to draw the X-axis in parallel with the front/rear direction and the Y-axis in parallel with the horizontal direction such that they are orthogonal to each other at the origin. The use of such a coordinate system provides convenience that the weight $m_u$ can be dealt with by a minimum mathematical expression, regardless of any change in the positional relationship, relative to the front/rear direction, between the center of gravity W, the center of gravity $W_0$, and the center of gravity $W_x$. Such a way of coordinate system definition is just only one example, and it can be determined discretionarily.

In the case where the coordinate system is defined in this way, since the center of gravity $W_0$ lies in the second quadrant, $k_{g0}$ has a negative value accordingly. Additionally, since the center of gravity W lies in the third quadrant, $k_g$, too, has a negative value. In this case, the length between the front section of the container 11 and the center of gravity W is described as "$-k_g$", and the length between the rear section (the rear cross beam 21) of the container 11 and the center of gravity W is described as "$p+k_g$", as shown in FIG. 18. Now, therefore, if the bottom surface of the container 11 is evenly loaded by the container cargo, this makes it possible to formulate, based upon the location of the center of gravity $W_0$, the location of the center of gravity W, the length p, and the weight $m_0$, the apparent weight $m_u$ of the container cargo with consideration given only to the front/rear direction of the container cargo vehicle by the concept of the front/rear-directional distribution of weight, as in the foregoing expressions (1) and (2).

Next, with reference to FIG. 19, a description will be made about a method of geometrically deriving the apparent weight of container cargo with consideration given only to the horizontal direction (width direction) of the container cargo vehicle.

Figure 19:
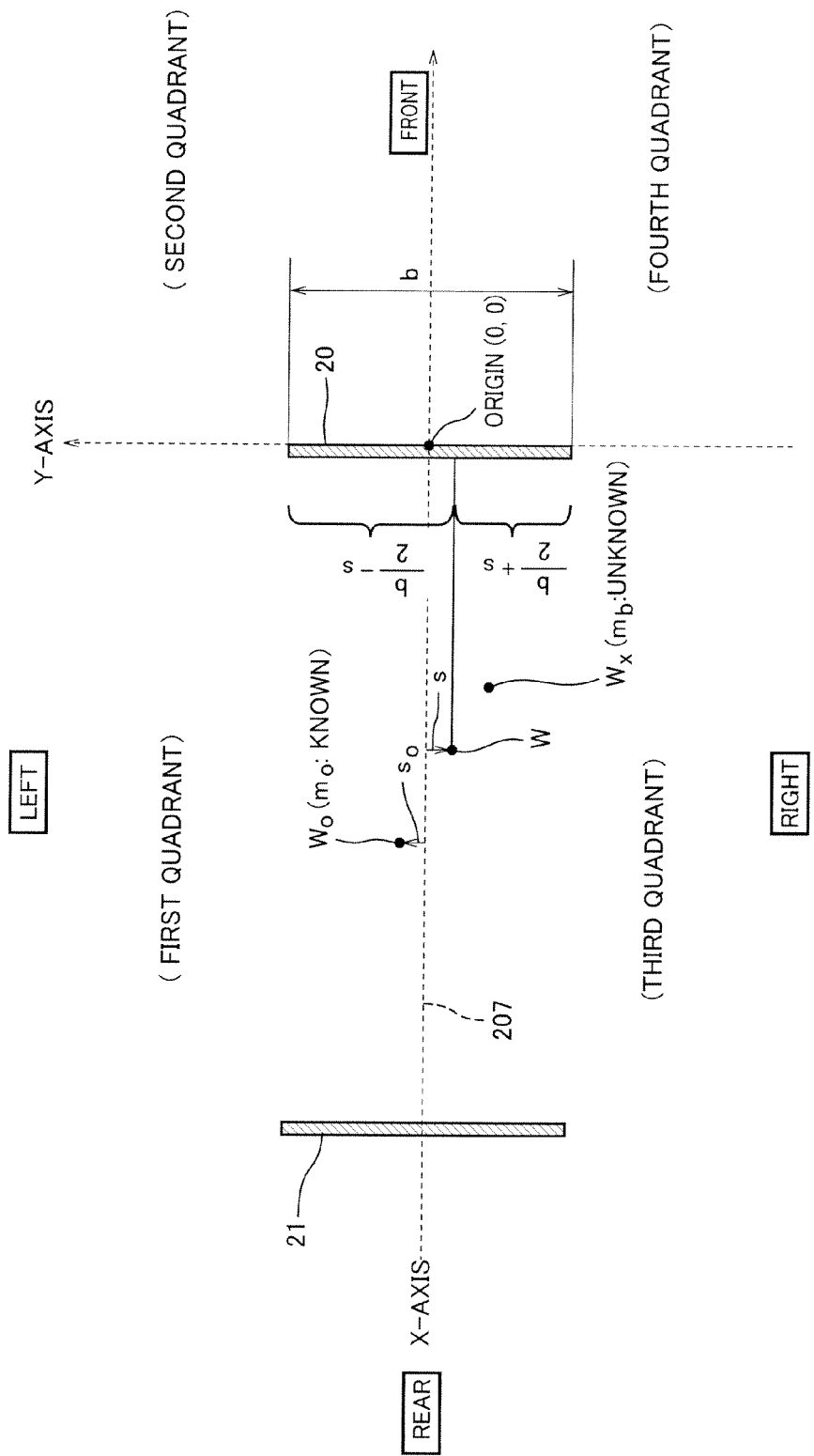
FIG. 19 is a schematic diagram for the purpose of explaining a method of deriving the apparent weight of container cargo with consideration given only to the horizontal direction of a container cargo vehicle by means of the cargo weight estimation system of the third embodiment.

FIG. 19 is a schematic illustration for the purpose of explaining a method of deriving the apparent weight $m_b$ (hereinafter, abbreviated just as the weight $m_b$ as required) of container cargo with consideration given only to the horizontal direction of the container cargo vehicle by means of the cargo weight estimation system of the present embodiment. FIG. 19 also schematically shows the state of each of the center-of-gravity locations when viewing the container cargo vehicle from the vertical direction (to be exact, from above the container cargo vehicle).

Also in FIG. 19, there is depicted the location of the center of gravity $W_x$, in addition to the location of the center of gravity $W_0$ and the location of the center of gravity W. And, the fact that the positional relationship between the center of gravity W, the center of gravity $W_0$, and the center of gravity $W_x$ is useful for geometrically deriving the unknown weight $m_b$ from the known weight $m_0$ is the same as in the case of geometrically deriving the weight $m_u$.

That is to say, even when the loading condition of a respective piece of container cargo inside the container 11 is unknown, it is possible to grasp, by use of the weight $m_b$ and the weight $m_0$, the distribution of weight in the horizontal direction loaded throughout the entire bottom of the container and, as a result, the weight $m_b$ is geometrically formulated as shown below.

$$m_b = m_0 \frac{\frac{b}{2} - s}{\frac{b}{2} + s} (s \leq s_o) \quad (3)$$

-continued $$m_b = m_0 \frac{\frac{b}{2} + s}{\frac{b}{2} - s} (s > s_o) \quad (4)$$

In expressions (3) and (4), b is the horizontal length of the section (cross beam) which supports the container 11, $m_0$ is the unloaded weight of the container cargo vehicle without container cargo in the container 11, and $m_b$ is the apparent weight of the container cargo with consideration given only to the horizontal direction of the container cargo vehicle. Besides, s is the value that describes the location of the center of gravity W based on the horizontal central line 207 in horizontal directional-length by use of the after-mentioned coordinate system while $s_0$ is the value that describes the location of the center of gravity $W_0$ based on the horizontal central line 207 in horizontal-directional length by use of the after-mentioned coordinate system.

In addition, unlike the first embodiment in which the value s is dealt with as a horizontal simple length (positive value) from the axle center (the horizontal central line 207) to the location of the center of gravity W of the container cargo vehicle, the value s in the present embodiment assumes a positive or negative value depending upon the way the coordinate system is defined.

According to the coordinate system shown in FIG. 19, by placing the origin (0, 0) of the coordinate axes in the horizontal center of the front cross beam 20, it becomes possible to draw the X-axis in parallel with the front/rear direction and the Y-axis in parallel with the horizontal direction such that they are orthogonal to each other at the origin, as in the coordinate system shown in FIG. 18. The use of such a coordinate system provides convenience that the weight $m_b$ can be dealt with by a minimum mathematical expression, regardless of any change in the positional relationship, relative to the horizontal direction, between the center of gravity W, the center of gravity $W_0$, and the center of gravity $W_x$. Such a way of coordinate system definition is just only one example, and it can be determined discretionarily.

In the case where the coordinate system is defined in this way, since the center of gravity $W_0$ lies in the second quadrant, $s_0$ has a positive value accordingly. Additionally, since the center of gravity W lies in the third quadrant, s has a negative value. In this case, the length between the left-hand end of the container 11 and the center of gravity W is described as "b/2−s" while the length between the right-hand end of the container 11 and the center of gravity W is described as "b/2+s", as shown in FIG. 19. Now, therefore, if the bottom surface of the container 11 is evenly loaded by the container cargo, this makes it possible to formulate, based upon the location of the center of gravity $W_0$, the location of the center of gravity W, the length b, and the weight $m_0$, the apparent weight $m_b$ of the container cargo with consideration given only to the horizontal direction of the container cargo vehicle by the concept of the horizontal distribution of weight, as in the foregoing expression (3) and (4).

Next, with reference to FIG. 20, a description will be made about a method of geometrically deriving the apparent weight of container cargo with consideration given only to the vertical direction (unloaded direction) of the container cargo vehicle.

Figure 20:
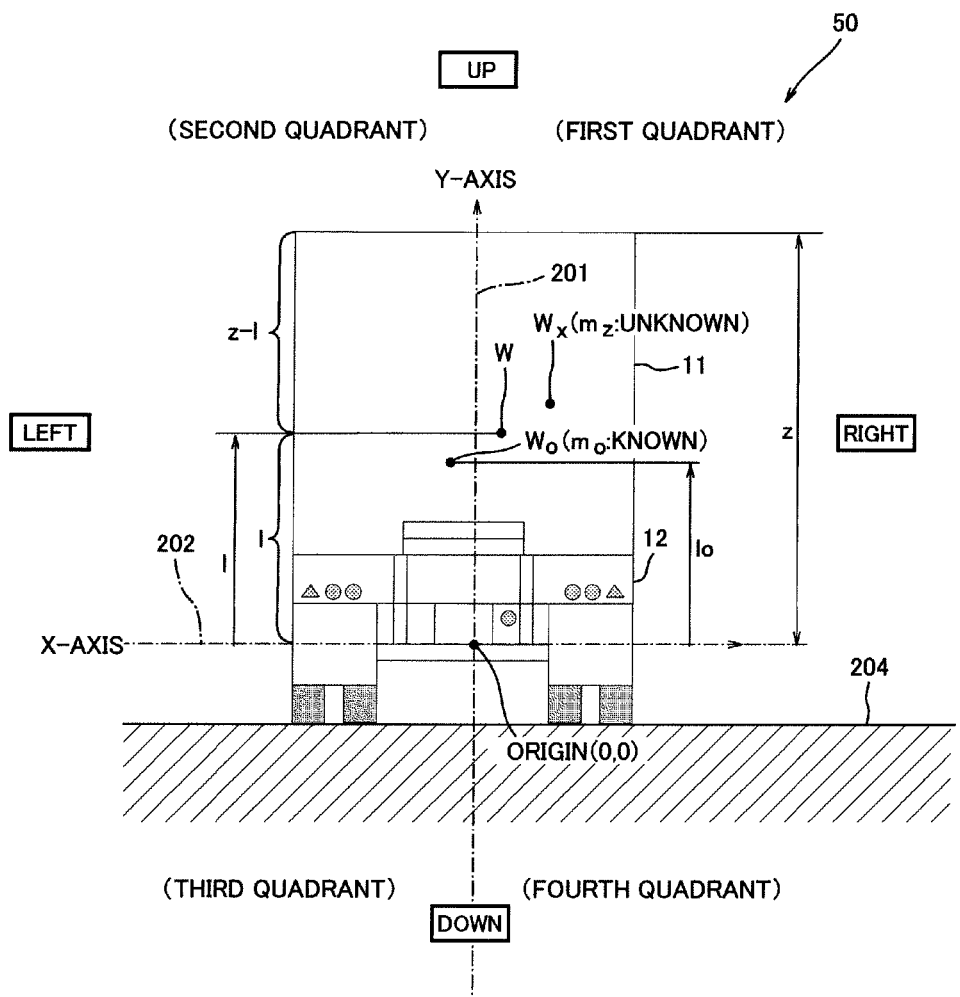
FIG. 20 is a schematic diagram for the purpose of explaining a method of deriving the apparent weight of container cargo with consideration given only to the vertical direction of a container cargo vehicle by means of the cargo weight estimation system of the third embodiment.

FIG. 20 is a schematic illustration for the purpose of explaining a method of deriving the apparent weight $m_z$ (hereinafter, abbreviated just as the weight $m_z$ as required) of container cargo with consideration given only to the vertical direction of a container cargo vehicle by means of the cargo weight estimation system of the present embodiment. FIG. 20 schematically shows the state of each of the center-of-gravity locations when viewing the container cargo vehicle from the front/rear direction of the container cargo vehicle (to be exact, from behind the container cargo vehicle).

In addition, referring to FIG. 20, the direction in which the self-weight of the container cargo vehicle is applied is defined as the "vertical direction" while the width direction of the container cargo vehicle is defined as the "horizontal direction".

Likewise, also in FIG. 20, the location of the center of gravity $W_x$ is depicted, in addition to the location of the center of gravity $W_0$ and the location of the center of gravity W. And, the fact that the positional relationship between these center-of-gravity locations W, $W_0$, $W_x$ is useful for geometrically deriving the unknown weight $m_z$ from the known weight $m_0$ is the same as in the case of geometrically deriving the weights $m_u$, $m_b$.

That is to say, even when the loading condition of a respective piece of container cargo inside the container 11 is unknown, it is possible to grasp, by use of the weights $m_z$ and $m_0$, the distribution of weight in the vertical direction loaded throughout the entire bottom surface of the container 11 and, as a result, the weight $m_z$ is geometrically formulated as shown below.

$$m_z = m_o \frac{l}{z-l} (l \geq l_o) \quad (5)$$

$$m_z = m_o \frac{z-l}{l} (l < l_o) \quad (6)$$

In expressions (5) and (6), z is the length from the axle position line 202 to the upper end of the container 11, $m_0$ is the unloaded weight of the container cargo vehicle without container cargo in the container 11, and $m_z$ is the apparent weight of the container cargo with consideration given only to the vertical direction of the container cargo vehicle. Besides, l is the value that describes the location of the center of gravity W based on the axle position line 202 in vertical length by use of the after-mentioned coordinate system while $l_0$ is the value that describes the location of the center of gravity $W_0$ based on the axle position line 202 in vertical length by use of the after-mentioned coordinate system.

In addition, unlike the first embodiment in which the value l is dealt with as a vertical simple length (positive value) from the axle (the axle position line 202) to the location of the center of gravity W of the container cargo vehicle, the value l in the present embodiment assumes a positive or negative value depending upon the way the coordinate system is defined.

According to the coordinate system shown in FIG. 20, by placing the origin (0, 0) of the coordinate axes at the intersecting point of the axle position line 202 and the vertical central line 201, it becomes possible to draw the X-axis in parallel with the horizontal direction (corresponding to the axle position line 202) and the Y-axis in parallel with the vertical direction (corresponding to the vertical central line 201) such that they are orthogonal to each other at the origin. The use of such a coordinate system provides convenience that the weight $m_z$ can be dealt with by a minimum mathematical expression, regardless of any change in the positional relationship, relative to the horizontal direction, between the centers of gravity W, $W_0$, $W_x$. In addition, such a way of coordinate system definition is just only one example, and it can be determined discretionarily.

In the case where the coordinate system is defined in this way, since the center of gravity $W_0$ lies in the second quadrant, $l_0$ has a positive value accordingly. Additionally, since the center of gravity W lies in the first quadrant, l, too, has a positive value. In this case, the length between the axle position line 202 and the center of gravity W is described as l, and the length between the upper end of the container 11 and the center of gravity W is described as "z–l", as shown in FIG. 20. Now, therefore, if the bottom surface of the container 11 is evenly loaded by the container cargo, this makes it possible to formulate, based upon the location of the center of gravity $W_0$, the location of the center of gravity W, the length z, and the weight $m_0$, the apparent weight $m_z$ of the container cargo with consideration given only to the vertical direction of the container cargo vehicle by the concept of the vertical distribution of weight, as in the foregoing expressions (5) and (6).

Next, a description will be made about a method of deriving, by use of the aforesaid weights $m_u$, $m_b$, $m_z$, the net weight of container cargo, M, (hereinafter, abbreviated just as the weight M as required).

It is conceivable that each weight $m_u$, $m_b$, $m_z$ becomes describable by adding to the net weight of the container cargo an error mutually depending upon each direction.

Hence, the weights $m_u$, $m_b$, and $m_z$ are expressed by the following expressions, respectively.

$$m_u = M + \alpha$$

$$m_b = M + \beta$$

$$m_z = M + \gamma$$

In these three expressions, α is the error that intervenes in the weight $m_u$, β is the error that intervenes in the weight $m_b$, and γ is the error that intervenes in the weight $m_z$. Although these errors α, β, γ are all unknown, it is conceivable that each has a respective property that has an effect on the other (in other words, they have a positive or negative sign).

Here, if the both sides of the aforesaid three expressions are multiplied together for expansion, the following expression is obtained.

$$m_u m_b m_z = (M + \alpha)(M + \beta)(M + \gamma)$$
$$= M^3 + (\alpha + \beta + \gamma)M^2 + (\alpha\beta + \alpha\gamma + \beta\gamma)M + \alpha\beta\gamma$$

Further, if the both sides of the above expression are divided by $m_u m_b m_z$, then the following expression is given.

$$1 = \frac{M^3}{m_u m_b m_z} + \frac{\alpha + \beta + \gamma}{m_u m_b m_z}M^2 + \frac{\alpha\beta + \alpha\gamma + \beta\gamma}{m_u m_b m_z}M + \frac{\alpha\beta\gamma}{m_u m_b m_z}$$

Here, since it is conceivable that the errors α, β, and γ are values that are sufficiently small relative to $m_u m_b m_z$, there is no objection if approximated as in the following expression.

$$\frac{\alpha + \beta + \gamma}{m_u m_b m_z} \cong 0$$

$$\frac{\alpha\beta + \alpha\gamma + \beta\gamma}{m_u m_b m_z} \cong 0$$

-continued $$\frac{\alpha\beta\gamma}{m_u m_b m_z} \cong 0$$

In this way, M (the net weight of the container cargo) may be formulated by the concept of the geometrical average of the apparent weights $m_u$, $m_b$, and $m_z$ with consideration given only to the three different directions, as in the following expression (7).

$$1 \cong \frac{M^3}{m_u m_b m_z} \quad (7)$$

$$M^3 = m_u m_b m_z$$

$$\therefore M = \sqrt[3]{m_u m_b m_z}$$

As described above, in the present embodiment, the location of the center of gravity W and the location of the center of gravity $W_0$ are used as input values (pieces of initial information), thereby to theoretically derive the net weight M of the container cargo) by approaches, i.e., geometrical weight distribution and geometrical average.

Next, by making reference to the drawings, a description will be made about an example of the operation of estimating the weight of container cargo by means of the cargo weight estimation system 100A of the present embodiment.

Figure 21:
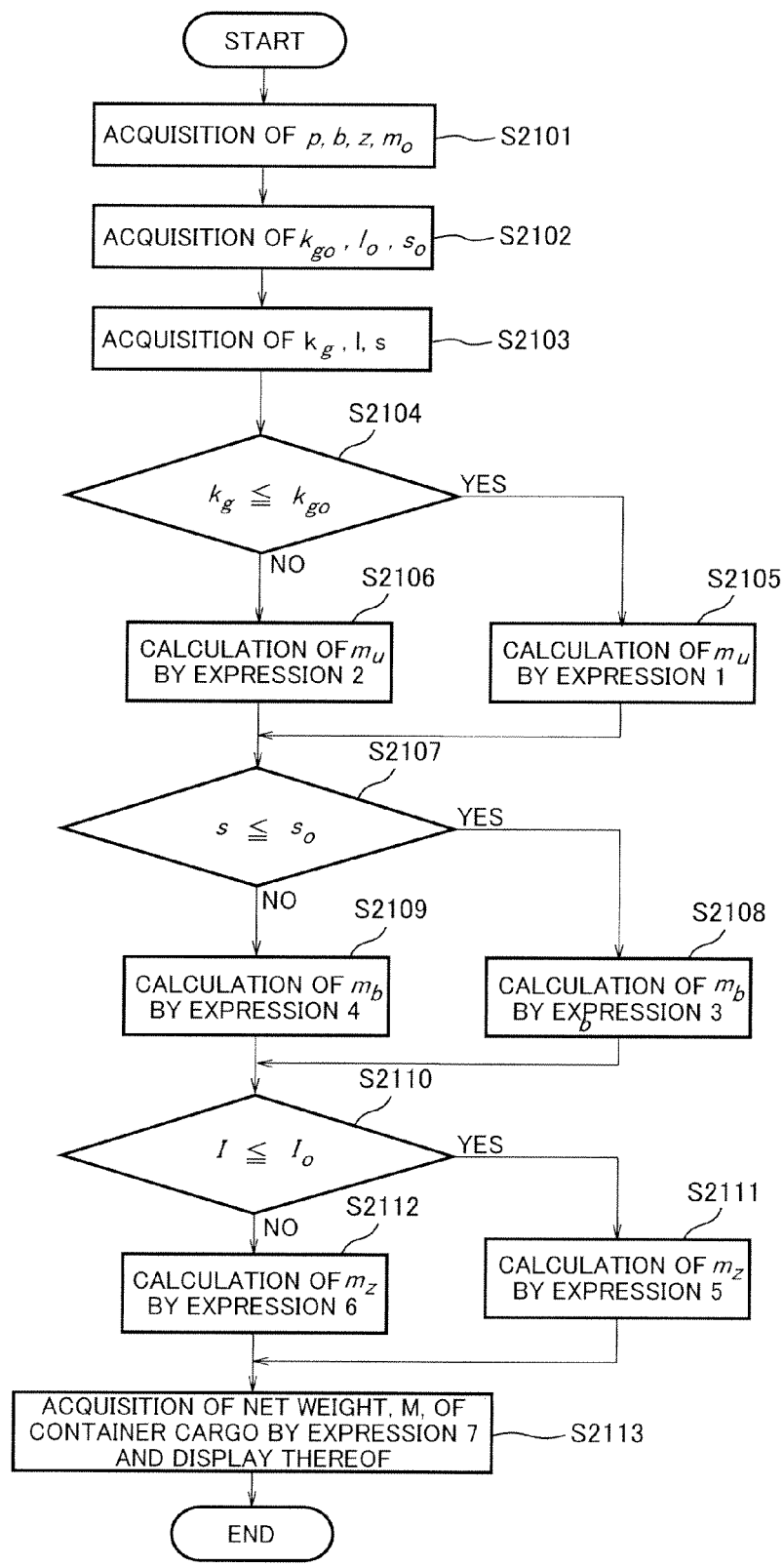
FIG. 21 is a flow chart showing an operation of estimating the weight of container cargo by means of the cargo weight estimation system of the third embodiment.

FIG. 21 is a flow chart showing the operation of estimating the weight of container cargo by means of the cargo weight estimation system of the present embodiment.

Upon depression of the power supply switch of the operation setting/display part 15c of the arithmetic unit 15, a plurality of menus are displayed on the display screen (not shown) of the operation setting/display part 15c. And, by suitable manipulation of buttons of the operation setting/display part 15c, it becomes possible to start the following operation of estimating the net weight M of the container cargo during travel of the trailer truck 50. In addition, in executing this estimation operation in the following way, the contents of instructions that the operator (for example, the driver of the tractor 10 or a fellow passenger) is required to make are displayed in the form of a message on the display screen of the operation setting/display part 15c. Upon selection of an arithmetic operation for the net weight M of the container cargo, the arithmetic part 15a of the arithmetic unit 15 retrieves from the storage part 15b an arithmetic program for use in cargo weight estimation and suitable prestored constants, and this arithmetic program executes the following processing while controlling the arithmetic part 15a, the storage part 15b, and the operation setting/display part 15c.

In addition, the constants include the length p (in the travel direction (front/rear direction) of the container cargo vehicle) of the container 11, the length b (in the width direction (horizontal direction) of the container cargo vehicle) of the container 11, the length z from the axle position line 202 to the upper end of the container 11, and the unloaded weight $m_0$ of the container cargo vehicle without container cargo in the container 11.

Since all the aforesaid constants are characteristic values of the trailer truck 50, the constants in question are input to the storage part 15b for each model of the trailer truck 50 (for each type of the container 11), as in the hereinafter described operation. In addition, once the constants are input to the storage part 15b, they can be used as they are without reentry of them, unless there is made a change in the model of the trailer truck 50.

In the first place, the operator (driver or fellow passenger) specifies the aforesaid constants p, b, z, and $m_0$ with reference to suitable materials such as the vehicle inspection certificate or manufacture specification document of the trailer truck 50. And, by manipulation of the operation setting/display part 15c by the operator, these constants p, b, z, and $m_0$ are input to the storage part 15b of the arithmetic unit 15. By doing this, the arithmetic unit 15 obtains these constants p, b, z, and $m_0$ (step S2101).

Next, the arithmetic part 15a obtains data related to the center of gravity $W_0$ by employing either one of the following methods. More specifically, the arithmetic part 15a obtains: $k_{g0}$ (the value that describes the location of the center of gravity $W_0$ based on the front section (the front cross beam 20) of the container 11 in front/rear-directional length by use of the aforesaid coordinate system), $s_0$ (the value the describes the location of the center of gravity $W_0$ based on the horizontal central line 207 in horizontal length by use of the aforesaid coordinate system), and $l_0$ (the value that describes the location of the center of gravity $W_0$ based on the axle position line 202 in vertical length by use of the aforesaid coordinate system) (step S2102).

As a first method, it may be arranged such that, as described above, these center-of-gravity related data $k_{g0}$, $s_0$, and $l_0$ are previously databased for each container model and stored in the storage part 15b. In this case, the arithmetic part 15a retrieves data for $k_{g0}$, $s_0$, and $l_0$ corresponding to the same model as the container 11, thereby to obtain these numeric values $k_{g0}$, $s_0$, and $l_0$ as center-of-gravity related data.

As a second method, it may be arranged such that the operator of the trailer truck 50 conducts actual measurements of the center-of-gravity related data $k_{g0}$, $s_0$, and $l_0$ in the case where the operator of the trailer truck 50 loads the container 11 with container cargo, as when transporting general cargo in the domestic distribution. This enables the arithmetic part 15a to obtain the center-of-gravity related data $k_{g0}$, $s_0$, and $l_0$ by the operator inputting the center-of-gravity related data $k_{g0}$, $s_0$, and $l_0$ through the operation setting/display part 15c. However, there is the possibility that the accuracy of the 3D center-of-gravity location of the container cargo vehicle in the second method may be lower than that in the first method because of the measurement error of the center-of-gravity related data $k_{g0}$, $s_0$, and $l_0$.

Next, the arithmetic part 15a obtains data related to the center of gravity W by employing either one of the following methods. More specifically, the arithmetic part 15a obtains $k_g$ (the value that describes the location of the center of gravity W based on the front section (the front cross beam 20) of the container 11 in front/rear-directional length by use of the aforesaid coordinate system), s (the value that describes the location of the center of gravity W based on the horizontal central line 207 in horizontal length by use of the aforesaid coordinate system, and l (the value that describes the location of the center of gravity W based on the axle position line 202 in vertical length by use of the aforesaid coordinate system) (step S2103).

As a first method, it may be arranged such that, for example, when the cargo is transported without having checked its condition of loading in the container 11, the arithmetic part 15a operates according to the arithmetic program for use in 3D center-of-gravity location detection prestored in the storage part 15b and then obtains, based upon the digital signal output from the angular velocity sensor 14a (the A/D converter 14b) described in the first embodiment, data for $k_g$, l, and s (the data related to the center of gravity W of the container cargo vehicle). This is preferable because it allows the arithmetic part 15a to automatically obtain data of high accuracy from the 3D center-of-gravity location of the container cargo vehicle derived based upon the logical theory of dynamics. In addition, the method of deriving the 3D center-of-gravity location of the container cargo vehicle has been already described in detail in the first embodiment, and, therefore, its description is omitted here.

As a second method, it may be arranged such that, in the case where the operator of the trailer truck 50 loads the container 11 with container cargo, as when transporting general cargo in the domestic distribution, the operator conducts actual measurements of the center-of-gravity related data $k_g$, l, and s. This enables the arithmetic part 15a to obtain the center-of-gravity related data $k_g$, l, and s by the operator inputting the center-of-gravity related data $k_g$, l, and s through the operation setting/display part 15c. However, there is the possibility that the accuracy of the 3D center-of-gravity location of the container cargo vehicle in the second method may be lower than that in the first method because of the measurement errors of the center-of-gravity related data $k_g$, l, and s.

Next, the arithmetic part 15a retrieves the center-of-gravity related data $k_g$ and $k_{g0}$ stored in the storage part 15b and makes a decision as to whether or not the center-of-gravity related data $k_{g0}$ is equal to or larger than center-of-gravity related data $k_g$ (step S2104).

If the center-of-gravity related data $k_{g0}$ is decided to be equal to or larger than center-of-gravity related data $k_g$ (in the case of "Yes" in step S2104), then the arithmetic part 15a retrieves the constants p and $m_0$ prestored in the storage part 15b and uses the center-of-gravity related data $k_g$ and the constants p and $m_0$ to perform arithmetic to calculate, from expression (1), the apparent weight $m_u$ of the container cargo with consideration given only to the front/rear direction of the container cargo vehicle (step S2105).

$$m_u = m_o \frac{-k_g}{p + k_g}(k_g \leq k_{go}) \qquad (1)$$

On the other hand, if the center-of-gravity related data $k_{g0}$ is decided to be less than the center-of-gravity related data $k_g$ (in the case of "No" in step S2104), then the arithmetic part 15a retrieves the constants p and $m_0$ prestored in the storage part 15b and uses the center-of-gravity related data $k_g$ and the constants p and $m_0$ to perform arithmetic to calculate, from expression (2), the apparent weight $m_u$ of the container cargo with consideration given only to the front/rear direction of the container cargo vehicle (step S2106).

$$m_u = m_o \frac{p + k_g}{-k_g}(k_g > k_{go}) \qquad (2)$$

Next, the arithmetic part 15a retrieves the center-of-gravity related data s and $s_0$ stored in the storage part 15b and makes a decision of whether or not the center-of-gravity related data $s_0$ is equal to or larger than center-of-gravity related data s (step S2107).

If the center-of-gravity related data $s_0$ is decided to be equal to or larger than center-of-gravity related data s (in the case of "Yes" in step S2107), then the arithmetic part 15a retrieves the constants b and $m_0$ prestored in the storage part 15b and uses the center-of-gravity related data s and the constants b and $m_0$ to perform arithmetic to calculate, from expression (3), the apparent weight $m_b$ of the container cargo with consideration given only to the horizontal direction of the container cargo vehicle (step S2108).

$$m_b = m_o \frac{\frac{b}{2} - s}{\frac{b}{2} + s}(s \leq s_o) \qquad (3)$$

On the other hand, if the center-of-gravity related data $s_0$ is decided to be less than the center-of-gravity related data s (in the case of "No" in step S2107), then the arithmetic part 15a retrieves the constants b and $m_0$ prestored in the storage part 15b and uses the center-of-gravity related data s and the constants b and $m_0$ to perform arithmetic to calculate, from expression (4), the apparent weight $m_b$ of the container cargo with consideration given only to the horizontal direction of the container cargo vehicle (step S2109).

$$m_b = m_o \frac{\frac{b}{2} + s}{\frac{b}{2} - s}(s > s_o) \qquad (4)$$

Next, the arithmetic part 15a retrieves the center-of-gravity related data l and $l_0$ stored in the storage part 15b and makes a decision of whether or not the center-of-gravity related data $l_0$ is equal to or less than center-of-gravity related data l (step S2110).

If the center-of-gravity related data $l_0$ is decided to be equal to or less than the center-of-gravity related data l (in the case of "Yes" in step S2110), then the arithmetic part 15a retrieves the constants z and $m_0$ prestored in the storage part 15b and uses the center-of-gravity related data l and the constants z and $m_0$ to perform arithmetic to calculate, from expression (5), the apparent weight $m_z$ of the container cargo with consideration given only to the vertical direction of the container cargo vehicle (step S2111).

$$m_z = m_o \frac{l}{z - l}(l \geq l_o) \qquad (5)$$

If the center-of-gravity related data $l_0$ is decided to be in excess of the center-of-gravity related data l (in the case of "No" in step S2110), then the arithmetic part 15a retrieves the constants z and $m_0$ prestored in the storage part 15b and uses the center-of-gravity related data l and the constants z and $m_0$ to perform arithmetic to calculate, from expression (6), the apparent weight $m_z$ of the container cargo with consideration given only to the vertical direction of the container cargo vehicle (step S2112).

$$m_z = m_o \frac{z - l}{l}(l < l_o) \qquad (6)$$

Next, the arithmetic part 15a uses the weight $m_u$ obtained in step S2105 or S2106, the weight $m_b$ obtained in step S2108 or S2109, and the weight $m_z$ obtained in step S2111 or S2112 to perform arithmetic to calculate, from expression (7), the net weight M of the container cargo. And, this calculated weight M is displayed on the display screen of the operation setting/display part 15c by the arithmetic part 15a (step S2113). In this way, the arithmetic part 15a completes a series of routines for the estimation of the net weight M of the container cargo.

$$M = \sqrt[3]{m_u m_b m_z} \quad (7)$$

As described above, the cargo weight estimation system 100A of the present embodiment includes the trailer truck 50 having the container 11 capable of carrying cargo, the container chassis 12 carrying thereon the container 11, and the tractor 10 for towing the container chassis 12, and the arithmetic unit 15.

And, the cargo weight estimation system 100A is configured such that the arithmetic unit 15 obtains both the location of the center of gravity W, in three-dimensional space, of the container cargo vehicle loaded with the container cargo and the location of the center of gravity $W_0$, in three-dimensional space, of the container cargo vehicle without the container cargo and then uses the locations of the two centers of gravity W and $W_0$ to derive the apparent weights $m_u$, $m_b$, and $m_z$ and the net weight M of the container cargo.

By obtaining these container cargo weights, it becomes possible to properly determine whether the container cargo is overloaded or not, thereby making it possible to contribute to preventing the trailer truck 50 from unstable travel motion and the cargo from pile collapse/falling when the door of the container 11 is opened.

More specifically, based upon the locations of the centers of gravity $W_0$ and W, the length p (in the travel direction of the container cargo vehicle) of the container 11, and the weight $m_0$ of the container cargo vehicle without the container cargo, the arithmetic unit 15 is able to derive, from the concept of the geometrical distribution of weight in the travel direction, the apparent weight $m_u$ of the container cargo with consideration given only to the travel direction of the container cargo vehicle.

In addition, based upon the locations of the centers of gravity $W_0$ and W, the length b (in the width direction of the container cargo vehicle) of the container 11, and the weight $m_0$ of the container cargo vehicle without the container cargo, the arithmetic unit 15 is able to derive, from the concept of the geometrical distribution of weight in the width direction, the apparent weight $m_b$ of the container cargo with consideration given only to the width direction of the container cargo vehicle.

Furthermore, based upon the locations of the centers of gravity $W_0$ and W, the length z (in the unloaded direction of the container cargo vehicle) of the container 11, and the weight $m_0$ of the container cargo vehicle without the container cargo, the arithmetic unit 15 is able to derive, from the concept of the geometrical distribution of weight in the unloaded direction of the container cargo vehicle, the apparent weight $m_z$ of the container cargo with consideration given only to the unloaded direction.

As a result, the arithmetic unit 15 is able to derive, based upon each of the apparent weights $m_u$, $m_b$, and $m_z$ of the container cargo with respect to these three different directions, the net weight M of the container cargo from the concept of geometrical average.

Because of this, it becomes possible to derive, based upon the logical theory of mass system dynamics, the net weight M of the container cargo without having to introduce data that lack theoretical ground (e.g., correction coefficient or the like), and the weight arithmetic operation is extremely high in reliability. And, this is backed up by the results of a third verification experiment (to be hereinafter described) conducted using an actual car.

In addition, in accordance with the cargo weight estimation system 100A of the present embodiment, it is possible to derive, by use of the 3D center-of-gravity location of the container cargo vehicle derived by means of the center-of-gravity detection system 100 of the first embodiment, various types of center-of-gravity related data, i.e., $k_{g0}$, $s_0$, $l_0$, $k_g$, l, and s. In this case, not only the trouble of having to measure the center-of-gravity related data $k_{g0}$, $s_0$, $l_0$, $k_g$, l, and s is saved, but also it becomes possible to obtain the center-of-gravity related data $k_{g0}$, $s_0$, $l_0$, $k_g$, l, and s of high accuracy. Furthermore, even when the cargo is transported without having checked its condition of loading in the container 11, (for example, commercial transaction container cargo that is internationally exported or imported), it is still possible to obtain the center-of-gravity related data $k_{g0}$, $s_0$, $l_0$, $k_g$, l, and s.

Example 3

The validity of the method of deriving the weight of container cargo by means of the cargo weight estimation system 100A of the third embodiment was tested in an experiment using an actual car (third verification experiment).

Here, since the numeric values of the center-of-gravity related data ($k_{g0}$, $s_0$, $l_0$, $k_g$, l, s), the numeric values of the constants (p, h, z, $m_0$), and the numeric value of the weight of dummy cargo (sandbags for disaster prevention) all employed in the actual car experiment were recorded in the foregoing first verification experiment, the validity of the method of deriving the weight M was tested using the data recorded in the first verification experiment.

The concrete recorded values for the center-of-gravity related data $k_{g0}$, $s_0$, $l_0$, $k_g$, l, and s and the constants p, b, z, and $m_0$ were as follows. $k_{g0}$=−6.09 m (based on actual measurement on container cargo vehicle)

$s_0$=0 m (according to container cargo vehicle's specifications)

$l_0$=1.28 m (according to container cargo vehicle's specifications)

kg=−6.17 m (based on arithmetic result for 3D center-of-gravity location in first verification experiment)

l=1.90 m (based on arithmetic result for 3D center-of-gravity location in first verification experiment)

s=−0.07 m (based on arithmetic result for 3D center-of-gravity location in first verification experiment)

p=12.19 m (according to container cargo vehicle's specifications)

b=2.44 m (according to container cargo vehicle's specifications)

z=3.34 m (according to container cargo vehicle's specifications)

$m_0$=7.5 tons (according to container cargo vehicle's specifications)

By entry of each of these recorded values into a personal computer containing an arithmetic program for cargo weight estimation, the weight of the container cargo was calculated by the arithmetic program. The calculated value of the net weight M of the container cargo by geometrical average is about 8.6 tons and this value is almost identical with the weight of the dummy cargo of about 9.5 tons. Therefore, the validity of the method of deriving the weight of container cargo by means of the cargo weight estimation system 100A of the third embodiment was backed up by the present testing.

Incidentally, in the arithmetic calculation of the weight of container cargo in the present embodiment, the assumption is that the locations of the centers of gravity W and $W_0$ as initial information (input value) are essentially accurate, although the detailed description of the result of the study is omitted here. Otherwise, there is the possibility that the foregoing errors $\alpha$, $\beta$, $\gamma$ may become extreme numeric values, and, in this case, it is impossible to correctly find the weight of container cargo. This makes it possible to readily understand the importance and benefit of the aforesaid high-accuracy detection of the 3D center-of-gravity location of the container cargo vehicle.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The center-of-gravity detection system of the present invention properly derives the 3D center-of-gravity location of a vehicle capable of carrying cargo and adapted to be towed by a towing vehicle. In addition, the lateral rollover limit velocity estimation system of the present invention properly derives the lateral rollover limit velocity of a vehicle adapted to be towed by a towing vehicle. In addition, the cargo weight estimation system of the present invention properly derives the weight of cargo loaded in a vehicle adapted to be towed by a towing vehicle. Thus, for example, these aspects of the present inventions are applicable for transport by a trailer truck including a container chassis carrying a container and a tractor by which the container chassis is towed.

What is claimed is:

1. A center-of-gravity detection system comprising:
a container cargo vehicle comprising a container capable of carrying cargo and a container chassis upon which the container is placed, the container cargo vehicle adapted to be towed by a towing vehicle;
a shake detector configured to detect shakes in the directions of the self-weight and width of said towed container cargo vehicle during travel of said towed container cargo vehicle; and
an arithmetic unit;
wherein
when the shake in the self-weight direction corresponds to a vertical reciprocation motion in which a center of gravity of said container cargo vehicle is a mass point and the shake in a width direction corresponds to a horizontal simple pendulum motion in which an axle center of said container cargo vehicle is a support point and a center of gravity of said container cargo vehicle is a mass point;
said arithmetic unit is configured to derive, based upon the frequency of the simple pendulum motion, the location of the center of gravity of said container cargo vehicle with respect to the travel direction of said container, and to further derive, based upon the frequency of the reciprocation motion, the frequency of the simple pendulum motion, and the central angle of the simple pendulum motion, the location of the center of gravity of said container cargo vehicle with respect to a cross-section surface perpendicular to the travel direction of said container.

2. The center-of-gravity detection system according to claim 1, further comprising:
a disc-shaped coupling member configured to connect, at between the proximity of a front section of said container chassis relative to the travel direction thereof and said towing vehicle, the both together in a widthwisely swing-movable manner;
wherein said container chassis includes a cross beam which extends in the width direction of said container and supports the proximity of a rear section of said container relative to the travel direction thereof;
wherein said arithmetic unit is configured to convert output data of said shake detector into rolling data representative of a correlation between the frequency and the amplitude of the simple pendulum motion and to obtain, based upon the rolling data, a first frequency of the simple pendulum motion corresponding to the peak amplitude of the simple pendulum motion originated from said cross beam, a second frequency of the simple pendulum motion corresponding to the peak amplitude of the simple pendulum motion originated from said coupling member, and a third frequency of the simple pendulum motion corresponding to the peak amplitude of the simple pendulum motion originated from the center of gravity of said container cargo vehicle; and
wherein, based upon the first, second, and third frequencies of the simple pendulum motion, said arithmetic unit is configured to derive the location of the center of gravity of said container cargo vehicle relative to the travel direction of said container.

3. The center-of-gravity detection system according to claim 1,
wherein said arithmetic unit is configured to convert output data of said shake detector into rolling data representative of a correlation between the frequency and the amplitude of the simple pendulum motion and to obtain, based upon the rolling data, the frequency of the simple pendulum motion corresponding to the peak amplitude of the simple pendulum motion originated from the center of gravity of said container cargo vehicle;
wherein said arithmetic unit is configured to convert output data of said shake detector into pitching data representative of a correlation between the frequency and the amplitude of the reciprocation motion and to obtain, based upon the pitching data, the frequency of the reciprocation motion corresponding to the maximum amplitude of the reciprocation motion;
wherein said arithmetic unit is configured to sample temporal data of the amplitude of the simple pendulum motion from output data of said shake detector and to obtain the average value of the temporal data as the central angle of the simple pendulum motion; and
wherein, based upon the frequency of the simple pendulum motion, the frequency of the reciprocation motion, and the central angle of the simple pendulum motion, said arithmetic unit is configured to derive the location of the center of gravity of said container cargo vehicle relative to the cross-section surface perpendicular to the travel direction of said container.

4. The center-of-gravity detection system according to claim 1, wherein the shakes in the self-weight and width directions of said container cargo vehicle are motions resulting from external disturbances imparted, during straight travel of said container cargo vehicle on a road surface, to said container cargo vehicle in response to irregularities of the road surface.

5. The center-of-gravity detection system according to claim 1, wherein said shake detector includes an angular velocity sensor which is mounted in said towing vehicle and whose angular velocity sensitive axes are aligned in the self-weight and width directions of said container cargo vehicle.

6. A lateral rollover limit velocity estimation system comprising:
the center-of-gravity detection system of claim 1;
and further comprising:
wherein the arithmetic unit is configured to obtain the location of the center of gravity, in three-dimensional space, of said towed container cargo vehicle derived based upon physical quantities that correlate with the shakes and the curvature radius of a curved road section along which said towed container cargo vehicle travels and to derive a lateral rollover limit velocity for the curved road section in response to the obtained curvature radius with the use of the obtained location of the center of gravity.

7. The lateral rollover limit velocity estimation system according to claim 6, further comprising:
a receiver configured to receive and provide radio intelligence about the curvature radius to said arithmetic unit.

8. A lateral rollover limit velocity estimation system, comprising:
a vehicle capable of carrying cargo and adapted to be towed by a towing vehicle; and
an arithmetic unit;
wherein the arithmetic unit is configured to obtain the location of the center of gravity, in three-dimensional space, of said towed vehicle and the curvature radius of a curved road section along which said towed vehicle travels and to derive a lateral rollover limit velocity for the curved road section in response to the obtained curvature radius with the use of the obtained location of the center of gravity; and
wherein said arithmetic unit is configured to derive the lateral rollover limit velocity on the basis of:
a first expression which represents, by means of the center-of-gravity location of said towed vehicle relative to the cross-section surface perpendicular to the travel direction of said towed vehicle, a relationship between the velocity of said towed vehicle and the curvature radius in the event that said towed vehicle is brought into rotation centered on a turning outer wheel of said towed vehicle; and
a second expression which represents, by means of the center-of-gravity location of said towed vehicle relative to the travel direction of said towed vehicle, a relationship between the velocity of said towed vehicle and the curvature radius in the event that said towed vehicle is brought into rotation centered on a point of connection between said towing vehicle and said towed vehicle.

9. The lateral rollover limit velocity estimation system according to claim 8, wherein said towed vehicle is a container cargo vehicle comprising a container capable of carrying the cargo and a container chassis on which to place said container.

10. The lateral rollover limit velocity estimation system according to claim 8, further comprising:
a shake detector configured to detect shakes in the directions of the self-weight and width of said towed vehicle during travel of said towed vehicle; and
wherein, based upon physical quantities that correlate with the shakes, said arithmetic unit is configured to derive the location of the center of gravity.

11. A cargo weight estimation system comprising:
a vehicle capable of carrying cargo and adapted to be towed by a towing vehicle; and
an arithmetic unit;
wherein said arithmetic unit is configured to obtain the location of the center of gravity, in three-dimensional space, of said towed vehicle loaded with the cargo and the location of center of gravity, in three-dimensional space, of said towed vehicle without the cargo and to derive the weight of the cargo with the use of the obtained two center-of-gravity locations.

12. The cargo weight estimation system according to claim 11, wherein said towed vehicle is a container cargo vehicle comprising a container capable of carrying the cargo and a container chassis on which said container is placed.

13. The cargo weight estimation system according to claim 12,
wherein, based upon the two center-of-gravity locations, the length, in the travel direction of said container cargo vehicle, of said container, and the weight of said container cargo vehicle without the cargo, the arithmetic unit is configured to derive the apparent weight of the cargo with consideration given only to the travel direction;
wherein, based upon the two center-of-gravity locations, the length, in the width direction of said container cargo vehicle, of said container, and the weight of said container cargo vehicle without the cargo, the arithmetic unit is configured to derive the apparent weight of the cargo with consideration given only to the width direction;
wherein, based upon the two center-of-gravity locations, the length, in the self-weight direction of said container cargo vehicle, of said container, and the weight of said container cargo vehicle without the cargo, the arithmetic unit is configured to derive the apparent weight of the cargo with consideration given only to the self-weight direction; and
wherein, based upon the three directional apparent weights of the cargo, said arithmetic unit is configured to derive the net weight of the cargo.

14. The cargo weight estimation system according to claim 11, further comprising:
a shake detector configured to detect shakes in the directions of the self-weight and width of said towed vehicle during travel of said towed vehicle;
wherein, based upon physical quantities that correlate with the shakes of said towed vehicle loaded with the cargo, the arithmetic unit is configured to derive the location of the center of gravity, in three-dimensional space, of said towed vehicle loaded with the cargo; and
wherein, based upon physical quantities that correlate with the shakes of said towed vehicle without the cargo, the arithmetic unit is configured to derive the location of the center of gravity, in three-dimensional space, of said towed vehicle without the cargo.

15. A computer-readable storage medium storing a program for causing a computer to execute a method comprising steps of:
receiving information on shake in the self-weight direction of a container cargo vehicle during travel of the container cargo vehicle from a shake detector, the container cargo vehicle comprising a container capable of carrying the cargo and a container chassis on which said container is placed and being adapted to be towed by a towing vehicle, and the shake in the self-weight direction corresponding to a vertical reciprocation motion in which the center of gravity of said container cargo vehicle is a mass point;

receiving information on shake in the width direction of said towed container cargo vehicle during travel of said towed container cargo vehicle from the shake detector, the shake of the width direction corresponding to a horizontal simple pendulum motion in which the axle center of said container cargo vehicle is a support point and the center of gravity of said container cargo vehicle is a mass point;

deriving, based upon the frequency of the simple pendulum motion, the location of the center of gravity of said container cargo vehicle with respect to the travel direction of said container; and deriving, based upon the frequency of the reciprocation motion, the frequency of the simple pendulum motion, and the central angle of the simple pendulum motion, the location of the center of gravity of said container cargo vehicle with respect to a cross-section surface perpendicular to the travel direction of said container.

\* \* \* \* \*